US012395996B2

(12) United States Patent
Yi et al.

(10) Patent No.: US 12,395,996 B2
(45) Date of Patent: Aug. 19, 2025

(54) CONTROL CHANNEL REPETITION USING MULTIPLE CORESETS

(71) Applicant: Comcast Cable Communications, LLC, Philadelphia, PA (US)

(72) Inventors: Yunjung Yi, Vienna, VA (US); Esmael Dinan, McLean, VA (US); Ali Cirik, Herndon, VA (US); Hua Zhou, Herndon, VA (US); Jonghyun Park, Vienna, VA (US); Hyoungsuk Jeon, Centreville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 193 days.

(21) Appl. No.: 17/387,772

(22) Filed: Jul. 28, 2021

(65) Prior Publication Data

US 2022/0039140 A1 Feb. 3, 2022

Related U.S. Application Data

(60) Provisional application No. 63/057,698, filed on Jul. 28, 2020.

(51) Int. Cl.
| | |
|---|---|
| *H04L 5/00* | (2006.01) |
| *H04L 1/08* | (2006.01) |
| *H04W 24/08* | (2009.01) |
| *H04W 72/23* | (2023.01) |
| *H04W 76/20* | (2018.01) |

(52) U.S. Cl.
CPC ............... *H04W 72/23* (2023.01); *H04L 1/08* (2013.01)

(58) Field of Classification Search
None
See application file for complete search history.

(56) References Cited

U.S. PATENT DOCUMENTS

| | | | |
|---|---|---|---|
| 9,295,043 B2 | 3/2016 | Papasakellariou et al. | |
| 10,615,842 B2 | 4/2020 | Yi | |
| 11,272,531 B2 * | 3/2022 | Chen | H04B 1/7143 |

(Continued)

FOREIGN PATENT DOCUMENTS

| | | | |
|---|---|---|---|
| KR | 20190111307 A | 10/2019 | |
| WO | WO-2018230139 A1 * | 12/2018 | H04L 5/001 |

(Continued)

OTHER PUBLICATIONS

R1-2000754, CMCC"Maintenance for multi-TRP/Panel transmission" - 3GPP TSG RAN WG1 #100 e-Meeting, Feb. 24-Mar. 6, 2020.

(Continued)

*Primary Examiner* — Sithu Ko
(74) *Attorney, Agent, or Firm* — Banner & Witcoff, Ltd.

(57) ABSTRACT

Control channel repetition may be used in wireless communications. A base station may send repeated downlink control information (DCI) or physical downlink control channel (PDCCH) to a wireless device. The base station may send configuration parameters to the wireless device to indicate a plurality of coresets and indicate whether a particular DCI field, such as a transmission configuration indicator (TCI) field, will be present in the repeated DCI. Wireless resources may be determined by the wireless device based on a candidate of the last configured repetition.

20 Claims, 32 Drawing Sheets

(56) References Cited

U.S. PATENT DOCUMENTS

| | | | | |
|---|---|---|---|---|
| 11,711,832 | B2* | 7/2023 | Khoshnevisan | H04W 8/24 370/329 |
| 11,889,526 | B2* | 1/2024 | Chen | H04L 5/0048 |
| 12,150,152 | B2* | 11/2024 | Park | H04L 1/08 |
| 12,256,407 | B2* | 3/2025 | Svedman | H04W 72/23 |
| 2020/0029310 | A1 | 1/2020 | Lee et al. | |
| 2020/0045676 | A1 | 2/2020 | Ryu et al. | |
| 2020/0053580 | A1* | 2/2020 | Bagheri | H04L 5/006 |
| 2020/0100223 | A1 | 3/2020 | Park et al. | |
| 2020/0153572 | A1 | 5/2020 | Tsai et al. | |
| 2020/0154467 | A1 | 5/2020 | Gong et al. | |
| 2020/0187094 | A1* | 6/2020 | Horiuchi | H04L 5/001 |
| 2020/0196346 | A1 | 6/2020 | Khoshnevisan et al. | |
| 2020/0221428 | A1 | 7/2020 | Moon et al. | |
| 2020/0351840 | A1 | 11/2020 | Zhou et al. | |
| 2020/0404669 | A1* | 12/2020 | Seo | H04L 25/0238 |
| 2021/0345342 | A1* | 11/2021 | Sakhnini | H04L 5/0094 |
| 2023/0224865 | A1* | 7/2023 | Liu | H04L 5/0053 370/329 |
| 2023/0327808 | A1* | 10/2023 | Mu | H04L 1/08 714/748 |
| 2023/0337288 | A1* | 10/2023 | Zhou | H04L 1/08 |

FOREIGN PATENT DOCUMENTS

| | | | | |
|---|---|---|---|---|
| WO | | 2020142734 | A1 | 7/2020 |
| WO | WO-2020164568 | A1 * | 8/2020 | H04L 1/08 |
| WO | WO-2021156790 | A1 * | 8/2021 | H04L 5/0053 |
| WO | WO-2021163408 | A1 * | 8/2021 | |

OTHER PUBLICATIONS

R1-2106686, Spreadtrum Communications "Discussion on Enhancements on Multi-TRP for PDCCH, PUCCH and PUSCH", 3GPP TSG RAN WG1 #106-e; e-Metting Aug. 16-27, 2021.
Dec. 1, 2021—European Search Report—EP 21188207.1.
R1-2004495 3GPP TSG RAN WG1 Meeting #101-e, eMeeting, May 25-Jun. 5, 2020, Source: Qualcomm Incorporated, Title: Considerations for coverage recovery of RedCap devices.
R1-2004423 3GPP TSG RAN WG1 Meeting #101, e-Meeting, May 25-Jun. 5, 2020, Source: NTT Docomo, Inc., Title: Functionality for coverage recovery for RedCap.
R1- 2004354 3GPP TSG-RAN WG1 Meeting #101, e-Meeting, May 25-Jun. 5, 2020, Source: Ericsson, Title: Potential areas for coverage enhancement.
R1-2004109 3GPP TSG RAN WG1 Meeting #101-e, eMeeting, May 25-Jun. 5, 2020, Source: OPPO, Title: The potential solutions to enhance NR coverage.
R1-2003936 3GPP TSG RAN WG1 Meeting #101, e-Meeting, May 25-Jun. 5, 2020, Source: Nokia, Nokia Shanghai Bell, Title: Functionality for coverage recovery.
R1-2003912 3GPP TSG RAN WG1 Meeting #101-e, e-Meeting, May 25-Jun. 5, 2020, Source: Samsung, Title: Coverage recovery for low capability device.
R1-2003772 3GPP TSG RAN WG1 Meeting #101-e, eMeeting, May 25-Jun. 5, 2020, Source: Intel Corporation, Title: On coverage recovery for RedCap NR Ues.
R1-2003437 3GPP TSG RAN WG1 Meeting #101, e-Meeting, May 25-Jun. 5, 2020, Source: vivo, Title: Discussion on potential techniques for coverage enhancements.
R1-2003340 3GPP TSG RAN WG1 Meeting #101, e-Meeting, May 25-Jun. 5, 2020, Source: ZTE Corporation, Title: Discussion on potential techniques for coverage enhancements.
R1-2003300 3GPP Tsg Ran WG1 Meeting #101-e, E-meeting, May 25-Jun. 5, 2020, Source: Huawei, HiSilicon, Title: Discussion on potential solutions for coverage enhancement.
R1-2003291 3GPP TSG RAN WG1 Meeting #101-e, eMeeting, May 25-Jun. 5, 2020, Source: Ericsson, Title: Functionality for coverage recovery for RedCap.
R1-2003282 3GPP TSG RAN WG1 Meeting #101-e, eMeeting, May 25-Jun. 5, 2020, Source: FUTUREWEI, Title: Coverage recovery for RedCap.
R1-1903541 3GPP TSG RAN WG1 Meeting #96, Athens, Greece, Feb. 25-Mar. 1, 2019, Source: Huawei, HiSilicon, Title: Summary of AI: 7.2.8.2 Enhancements on Multi-TRP/Panel Transmission of Offline Discussion.
R1-1901634 3GPP TSG RAN WG1 #96, Athens, Greece, Feb. 25-Mar. 1, 2019, Source: ZTE, Title: Enhancements on multi-TRP/Panel transmission.
R1-1901567 3GPP TSG RAN WG1 Meeting #96, Athens, Greece, Feb. 25-Mar. 1, 2019, Source: Huawei, HiSilicon, Title: Enhancements on Multi-TRP/panel transmission.
R1-1814003 3GPP TSG RAN WG1 Meeting #95, Spokane, USA, Nov. 12-16, 2018, Source: Huawei, HiSilicon, Title: Summary of AI: 7.2.8.2 Enhancements on Multi-TRP/Panel Transmission of Offline Discussion.
R1-1814002 3GPP TSG RAN WG1 Meeting #95, Spokane, USA, Nov. 12-16, 2018, Source: Huawei, HiSilicon, Title: Summary of AI: 7.2.8.2 Enhancements on Multi-TRP/Panel Transmission.
R1-1813510 3GPP TSG RAN WG1 Meeting #95, Spokane, USA, Nov. 12-16, 2018, Source: KDDI, Title: Discussion on multi-TRP/panel transmission.
R1-1813489 3GPP TSG RAN WG1 Meeting #95, Spokane, USA, Nov. 12-16, 2018, Source: Nokia, Nokia Shanghai Bell, Title: Enhancements on Multi-TRP/Panel Transmission.
R1-1813442 3GPP TSG RAN WG1 Meeting #95, Spokane, USA, Nov. 12-16, 2018, Source: Qualcomm Incorporated, Title: Multi-TRP Enhancements.
R1-1813333 3GPP TSG RAN WG1 Meeting #95, Spokane, USA, Nov. 12-16, 2018, Source: NTT Docomo, Inc., Title: Enhancements on multi-TRP/panel transmission.
R1-1813003 3GPP TSG RAN WG1 Meeting #95, Spokane, USA, Nov. 12-16, 2018, Source: Samsung, Title: Enhancements on Multi-TRP/Panel Transmission.
R1-18102807 3GPP TSG RAN WG1 Meeting #95, Spokane, USA, Nov. 12-16, 2018, Source: OPPO, Title: Enhancements on multi-TRP and multi-panel transmission.
R1-1812635 3GPP TSG RAN WG1 Meeting #95, Spokane, USA, Nov. 12-16, 2018, Source: CATT, Title: Multi-TRP/panel transmission enhancement for Rel-16.
R1-1812349 3GPP TSG RAN WG1 Meeting #95, Spokane, USA, Nov. 12-16, 2018, Source: MediaTek Inc., Title: Enhancements on multi-TRP/panel transmission.
R1-1812256 3GPP TSG RAN WG1 Meeting #95, Spokane, USA, Nov. 12-16, 2018, ZTE, Title: Enhancements on multi-TRP/Panel transmission.
R1-1901482 3GPP TSG RAN WG1 Meeting #96, Athens, Greece, Feb. 25-Mar. 1, 2019, Source: MCC Support, Title: Final Report of 3GPP TSG RAN WG1 #95 v1.0.0 (Spokane, USA, Nov. 12-16, 2018).
3GPP TS 38.331 V16.0.0 (Mar. 2020) 3rd Generation Partnership Project; Technical Specification Group Radio Access Network; NR; Radio Resource Control (RRC) protocol specification (Release 16).
3GPP TS 38.321 V16.0.0 (Mar. 2020) 3rd Generation Partnership Project; Technical Specification Group Radio Access Network; NR; Medium Access Control (MAC) protocol specification (Release 16).
3GPP TS 38.214 V16.1.0 (Mar. 2020) 3rd Generation Partnership Project; Technical Specification Group Radio Access Network; NR; Physical layer procedures for data (Release 16).
3GPP TS 38.213 V16.1.0 (Mar. 2020) 3rd Generation Partnership Project; Technical Specification Group Radio Access Network; NR; Physical layer procedures for control (Release 16).
3GPP TS 38.212 V16.0.0 (Dec. 2019), 3rd Generation Partnership Project; Technical Specification Group Radio Access Network; NR; Multiplexing and channel coding (Release 16).
3GPP TS 38.211 V16.2.0 (Jun. 2020), Technical Specification, 3rd Generation Partnership Project; Technical Specification Group Radio Access Network; NR; Physical channels and modulation (Release 16).

* cited by examiner

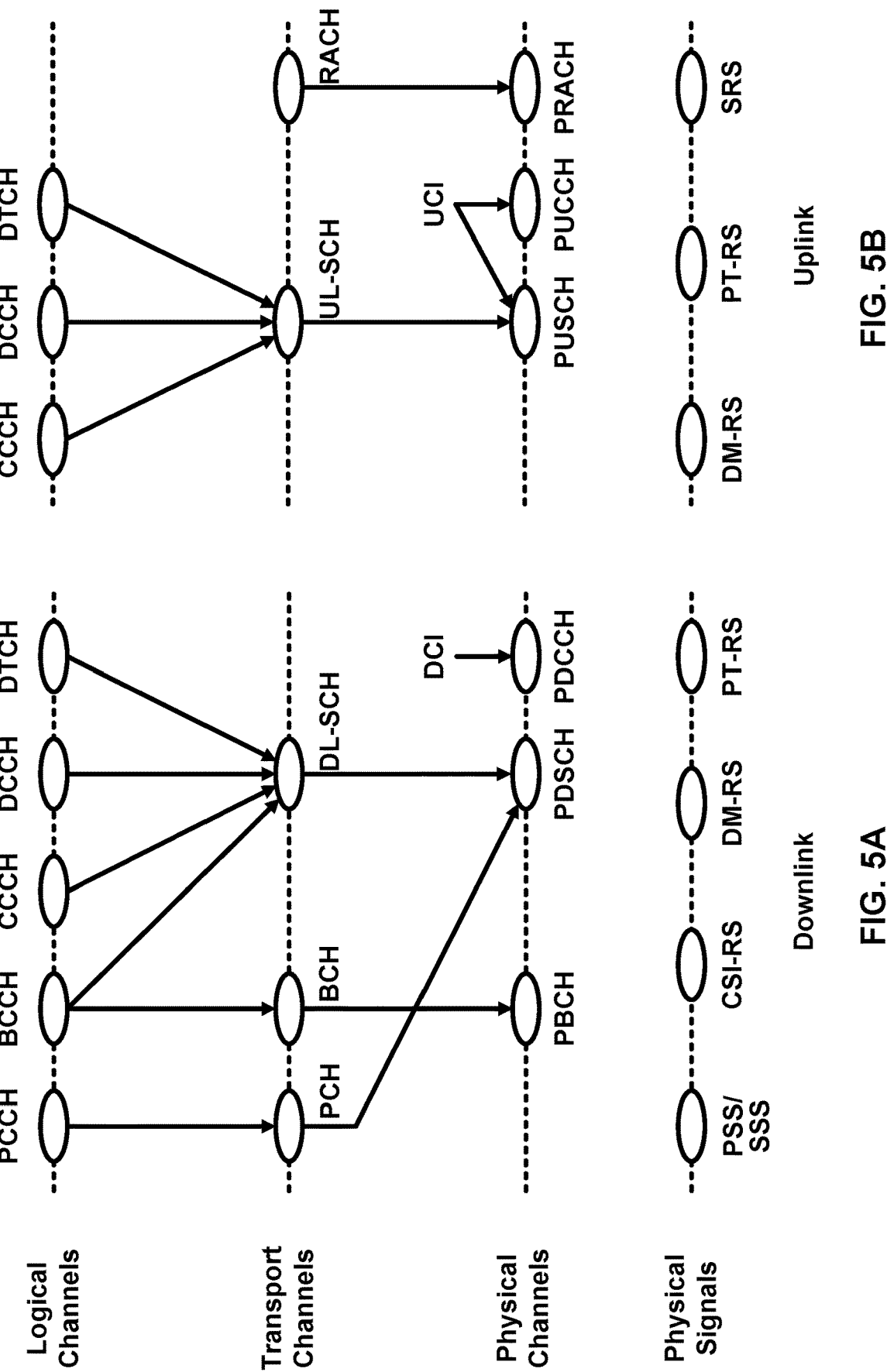

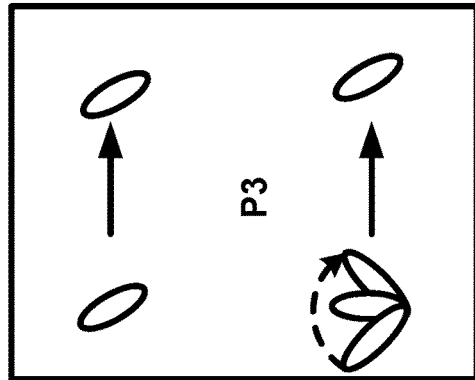
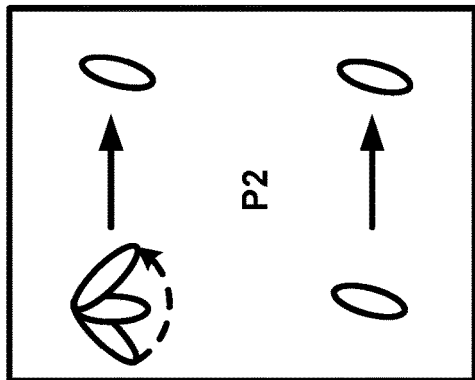
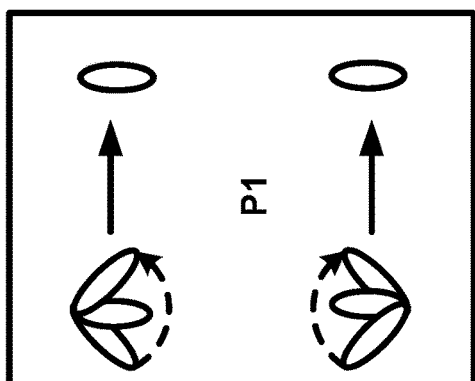
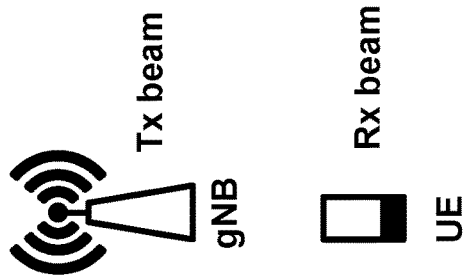
FIG. 12A
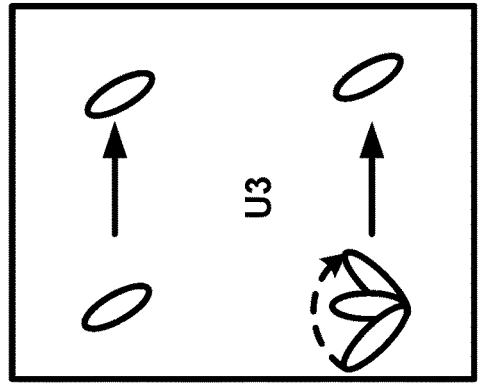
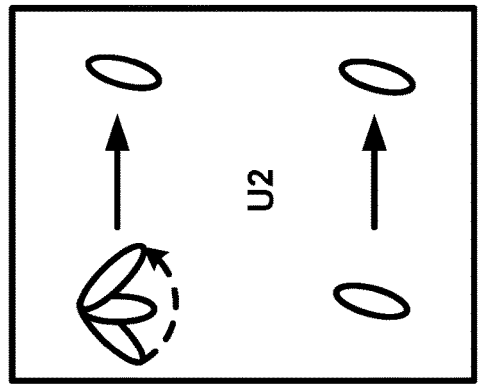
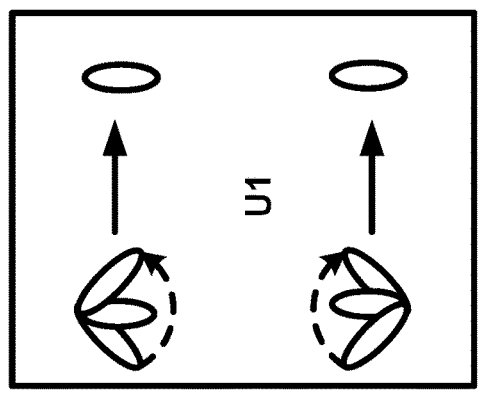
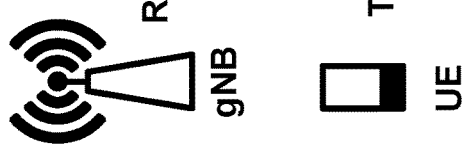
FIG. 12B

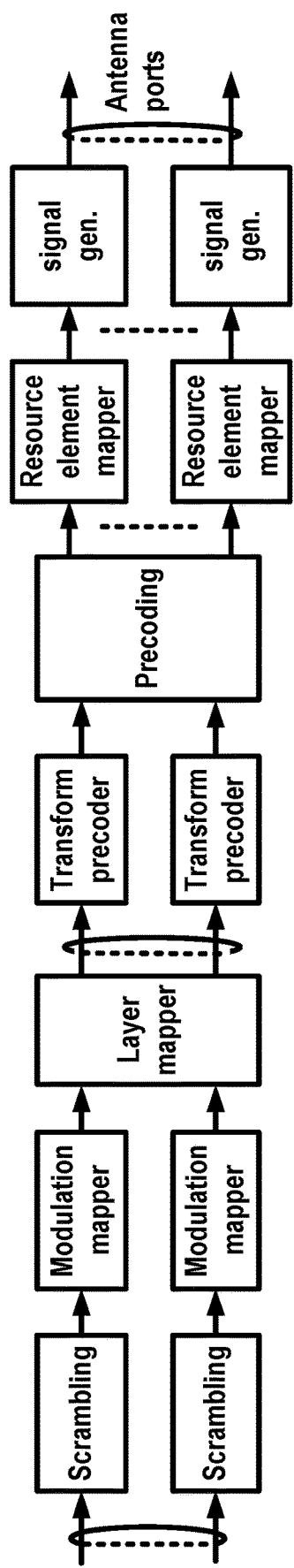
FIG. 16A
FIG. 16B
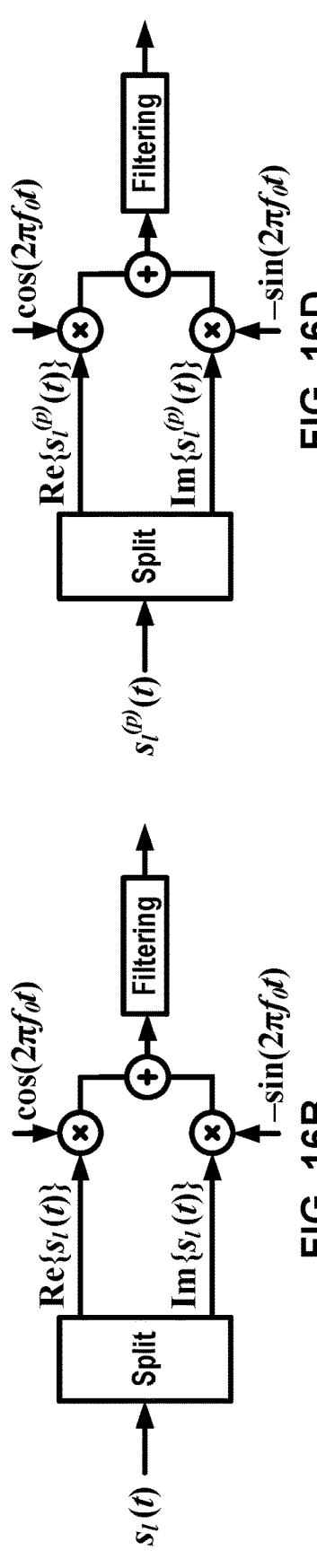
FIG. 16D
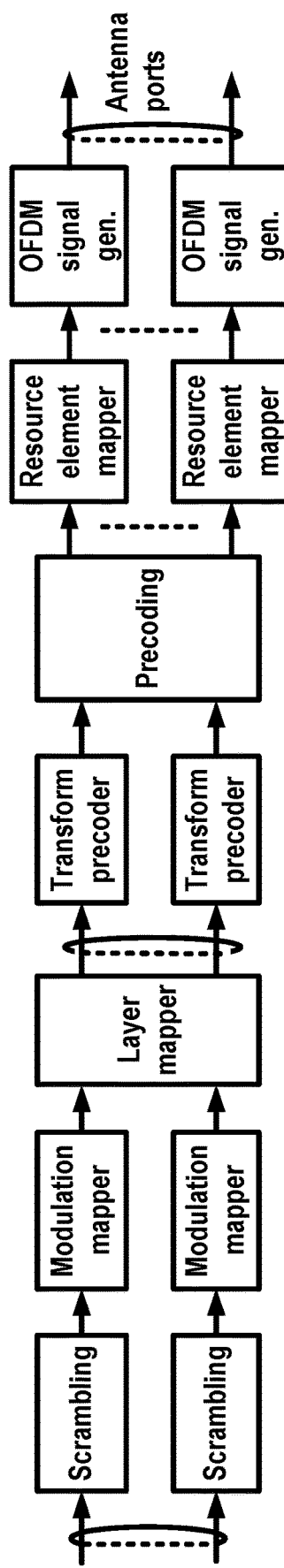
FIG. 16C

```
ControlResourceSet ::=            SEQUENCE {
  controlResourceSetId              ControlResourceSetId,
  frequencyDomainResources          BIT STRING (SIZE (45)),
  duration                          INTEGER (1..maxCoReSetDuration),
  cce-REG-MappingType CHOICE {
    interleaved          SEQUENCE {
      reg-BundleSize          ENUMERATED {n2, n3, n6},
      interleaverSize         ENUMERATED {n2, n3, n6},
      shiftIndex              INTEGER(0..maxNrofPhysicalResourceBlocks-1)
                                                                        },
    nonInterleaved       NULL
                                },
  precoderGranularity               ENUMERATED {sameAsREG-
bundle,allContiguousRBs},
  tci-StatesPDCCH-ToAddList         SEQUENCE(SIZE (1..maxNrofTCI-StatesPDCCH))
OF TCI-StateId
  tci-StatesPDCCH-ToReleaseList     SEQUENCE(SIZE (1..maxNrofTCI-StatesPDCCH))
OF TCI-StateId
  tci-PresentInDCI                  ENUMERATED {enabled}
  pdcch-DMRS-ScramblingID           INTEGER (0..65535)
...,
[[
  rb-Offset-r16                     INTEGER (0..5)
  tci-PresentInDCI-Format1-2-r16    INTEGER (1..3)
  coresetPoolIndex-r16              INTEGER (0..1)
  controlResourceSetId-v16xy        ControlResourceSetId-v16xy]]}
```

FIG. 18

CONTROL CHANNEL REPETITION USING MULTIPLE CORESETS

CROSS-REFERENCE TO RELATED APPLICATIONS

This application claims the benefit of U.S. Provisional Application No. 63/057,698, filed on Jul. 28, 2020. The above-referenced application is hereby incorporated by reference in its entirety.

BACKGROUND

A base station many send downlink control signals, such as downlink control information (DCI), to a wireless device. Downlink control may be repeated via one or more search spaces associated with one or more control resource sets (coresets).

SUMMARY

The following summary presents a simplified summary of certain features. The summary is not an extensive overview and is not intended to identify key or critical elements.

A base station and/or a wireless device may send one or more messages to the other. A base station may, for example, send multiple repeated control signals (e.g., repetitions of DCI) to the wireless device. The base station may send configuration parameters to inform the wireless device of one or more coresets that will be used for repetitions of the DCI, and the configuration parameters may indicate whether an element of the control signals will be included in the repetitions. The base station may indicate to the wireless device presence of one or more fields in the DCI. The wireless device may determine a scheduling offset and/or a time slot for radio resources based on a candidate of the latest repetition, even if the actual latest repetition is not successfully received.

These and other features and advantages are described in greater detail below.

BRIEF DESCRIPTION OF THE DRAWINGS

Some features are shown by way of example, and not by limitation, in the accompanying drawings. In the drawings, like numerals reference similar elements

FIG. 5A shows an example mapping for downlink channels.

FIG. 5B shows an example mapping for uplink channels.

FIG. 12A shows examples of downlink beam management procedures.

FIG. 12B shows examples of uplink beam management procedures.

FIG. 16A, FIG. 16B, FIG. 16C, and FIG. 16D show examples of uplink and downlink signal transmission.

FIG. 18 shows example configuration parameters of a coreset.

DETAILED DESCRIPTION

Figure 1A:
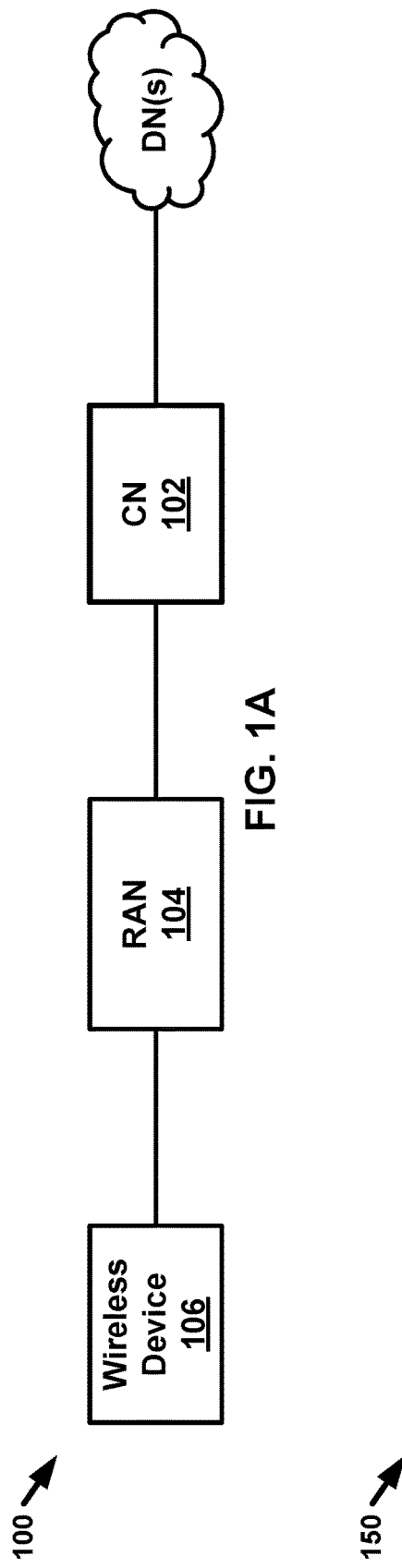
FIG. 1A and FIG. 1B show example mobile communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to transmission and/or reception configuration and signaling for wireless communication.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to communication via multiple carriers using a plurality of wireless resources.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/ unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/ configured by other base stations (e.g., macrocell base stations). The small coverage areas may be provided/con- figured in areas with high data traffic (or so-called "hot- spots") or in areas with a weak macrocell coverage. Examples of small cell base stations may comprise, in order of decreasing coverage area, microcell base stations, pico- cell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communica- tions in accordance with Institute of Electrical and Electron- ics Engineers (IEEE), communications in accordance with International Telecommunication Union (ITU), communica- tions in accordance with International Organization for Standardization (ISO), etc. The 3GPP has produced speci- fications for multiple generations of mobile networks: a 3G network known as UMTS, a 4G network known as Long- Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next- generation RAN (NG-RAN), or any other communication network, such as a 3GPP network and/or a non-3GPP network. Examples described herein may be applicable to other communication networks, such as 3G and/or 4G networks, and communication networks that might not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

Figure 1B:
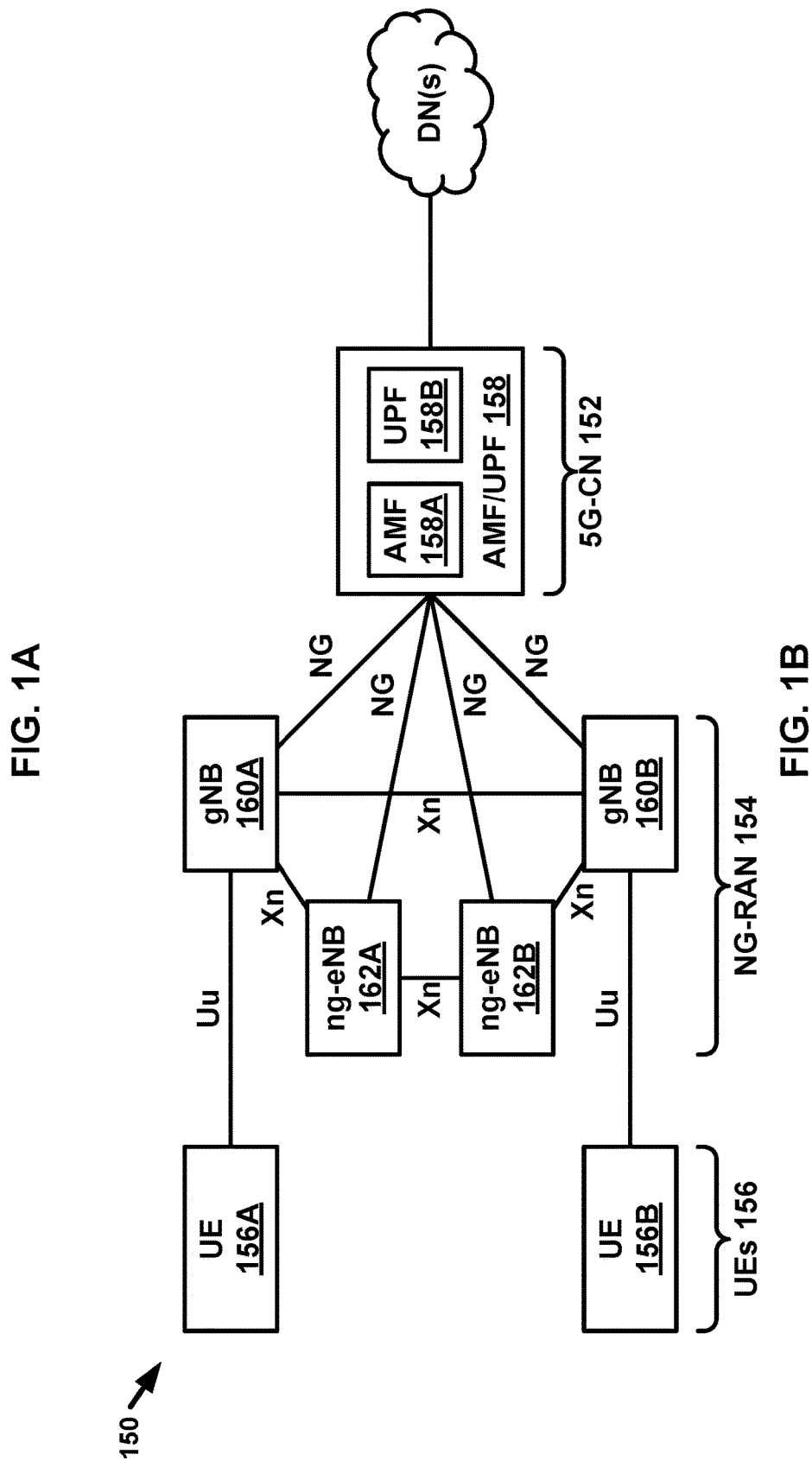

FIG. 1B shows an example communication network 150. The communication network may comprise a mobile com- munication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/ or a device within the communication network 150 may communicate with (e.g., via CN 152), one or more data networks (DN(s)) 170. These components may be imple- mented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architec- ture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification trigger- ing. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access net- works (e.g., 3GPP access networks and/or non-3GPP net- works), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and poli- cies), network slicing support, and/or session management function (SMF) selection. NAS may refer to the function- ality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
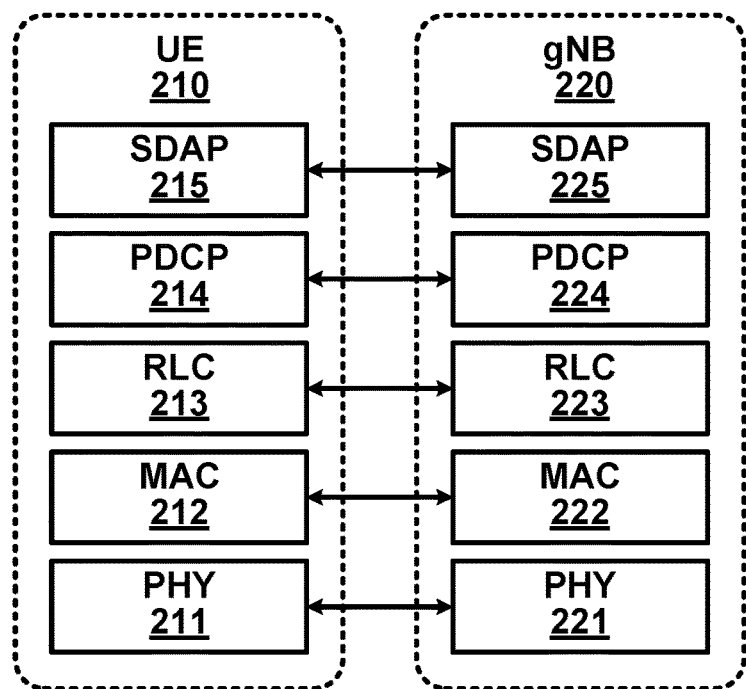
FIG. 2A shows an example user plane configuration.
Figure 2B:
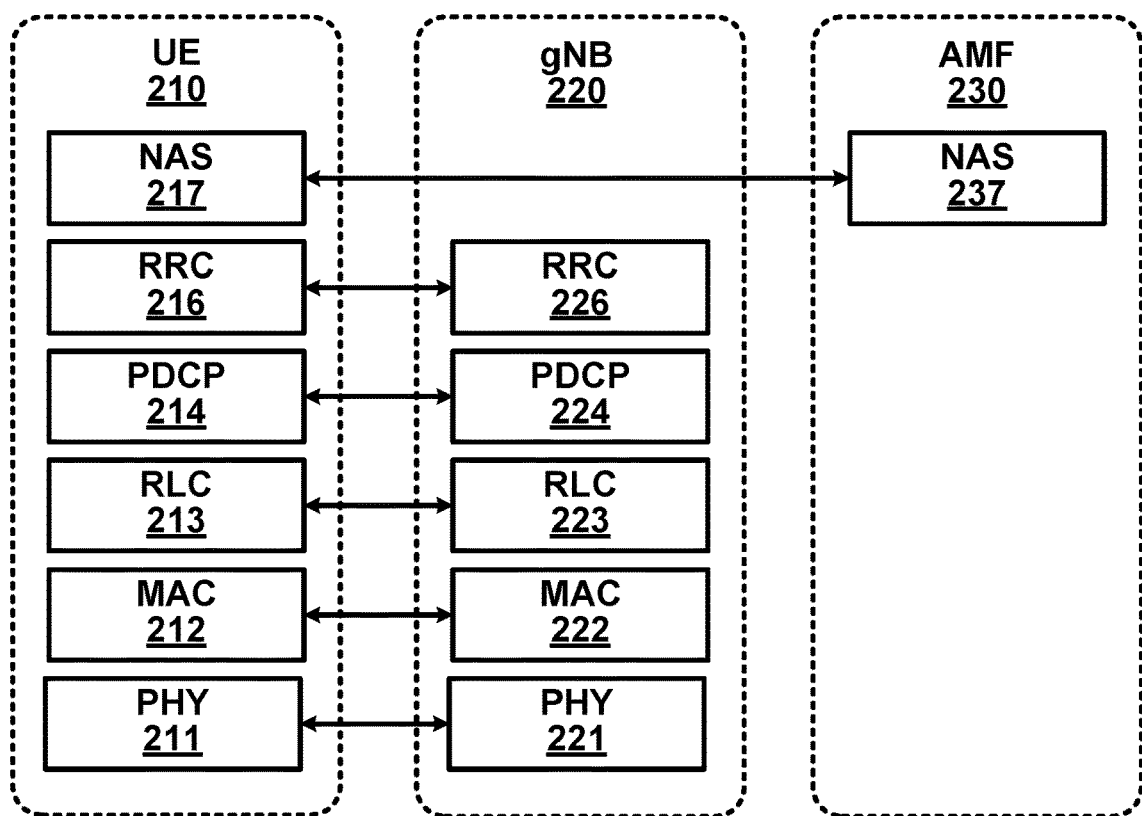
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
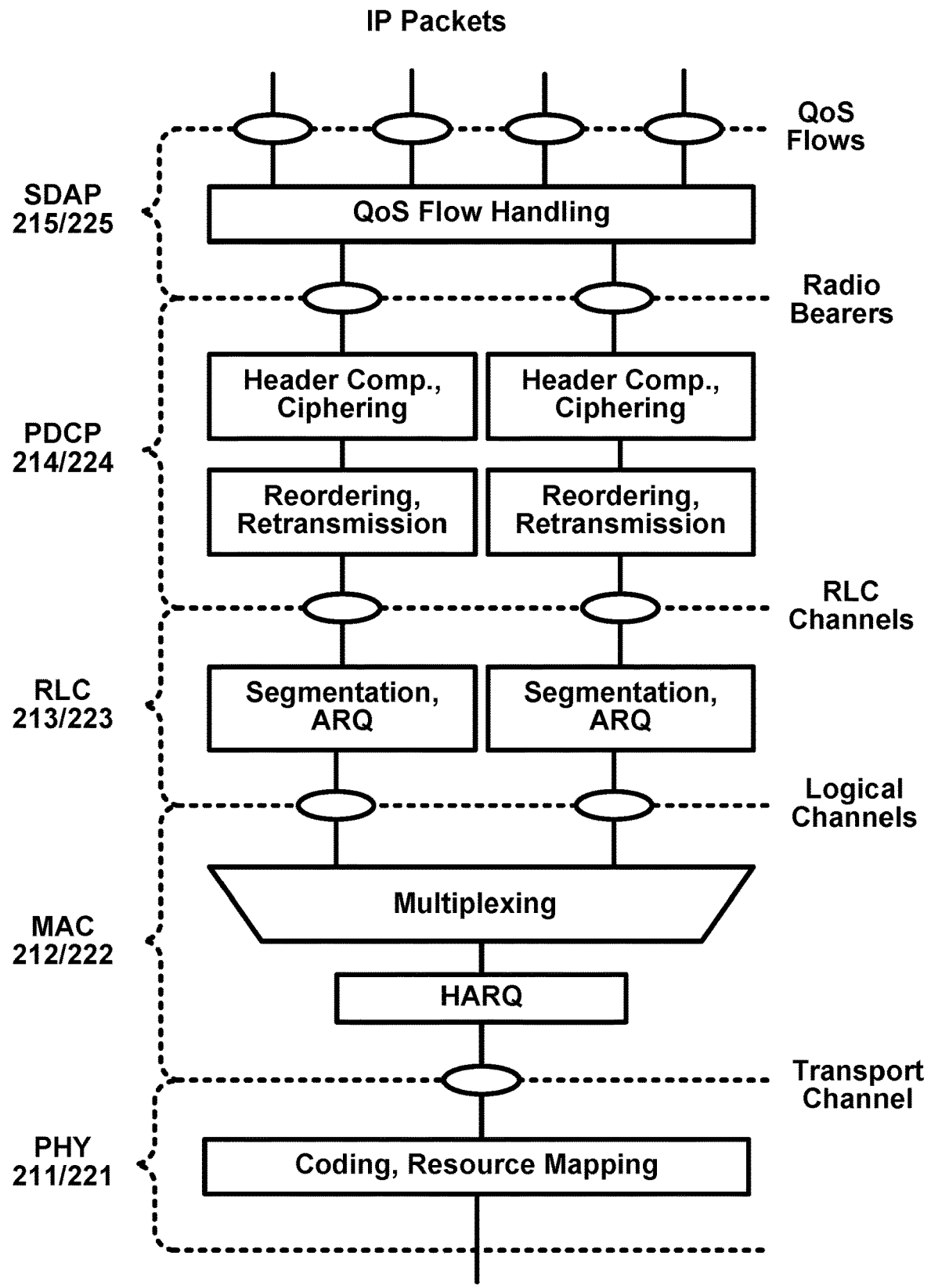
FIG. 3 shows an example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration might not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier for Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively). Various operations described herein with reference to communication devices (e.g., base stations, wireless devices, etc.) may be performed by one or more entities in the communication device (e.g., a PHY layer entity, a MAC layer entity, and/or one or more other entities corresponding to any other layer in the communication device).

Figure 4A:
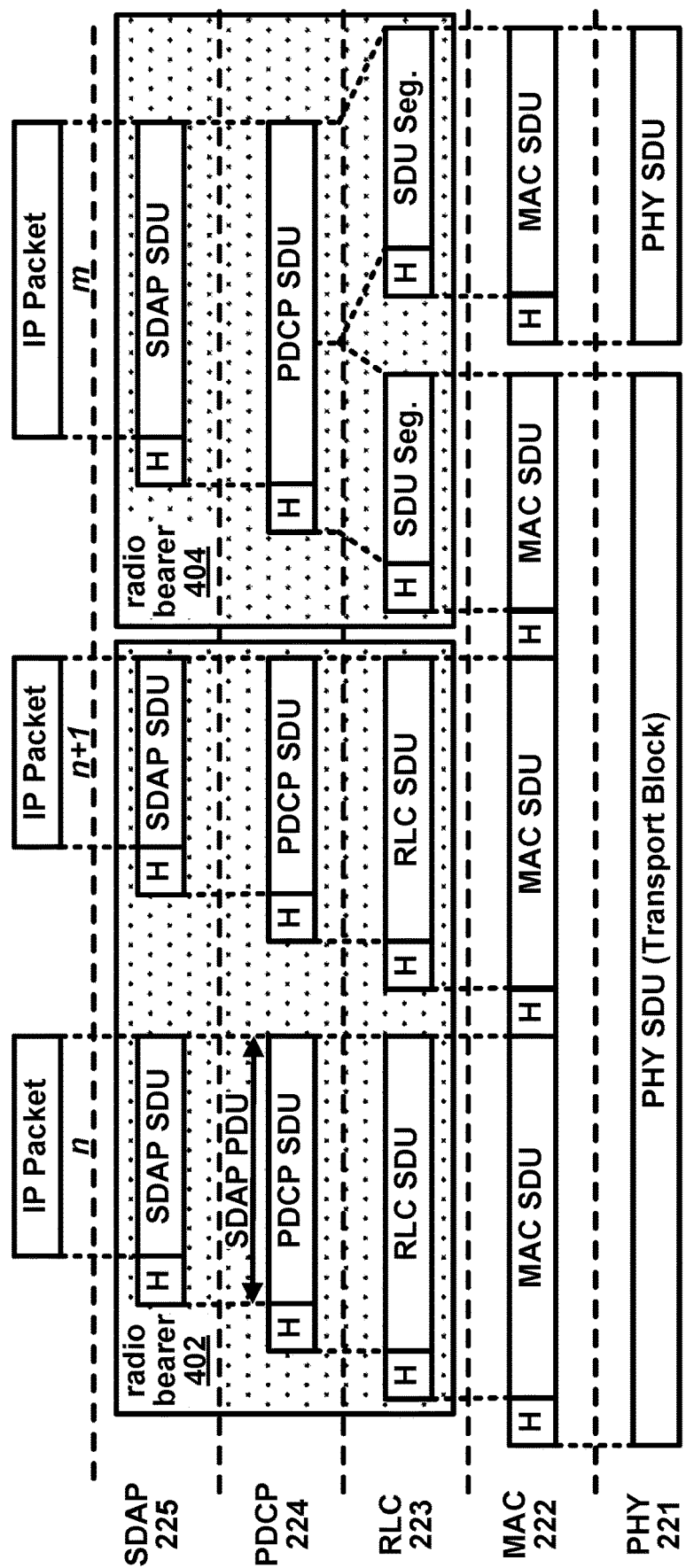
FIG. 4A shows an example downlink data flow for a user plane configuration.

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

Figure 4B:
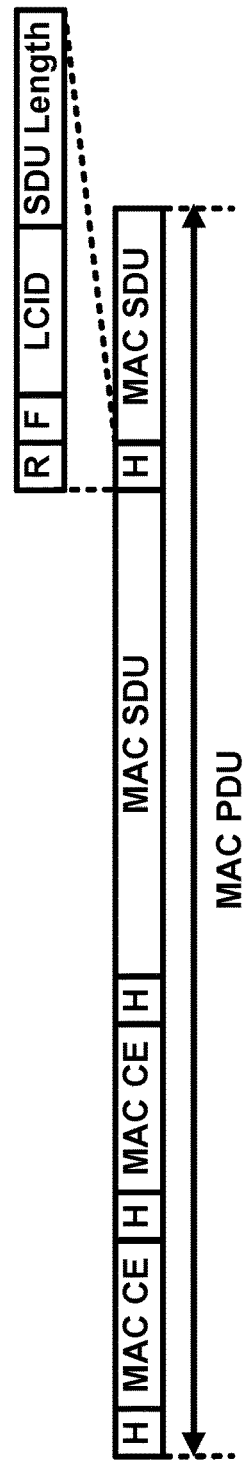
FIG. 4B shows an example format of a Medium Access Control (MAC) subheader in a MAC Protocol Data Unit (PDU).

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless devices).

A logical channel may be defined by the type of information it carries. The set of logical channels
(e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell.

A common control channel (CCCH) may comprise/carry control messages together with random access A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
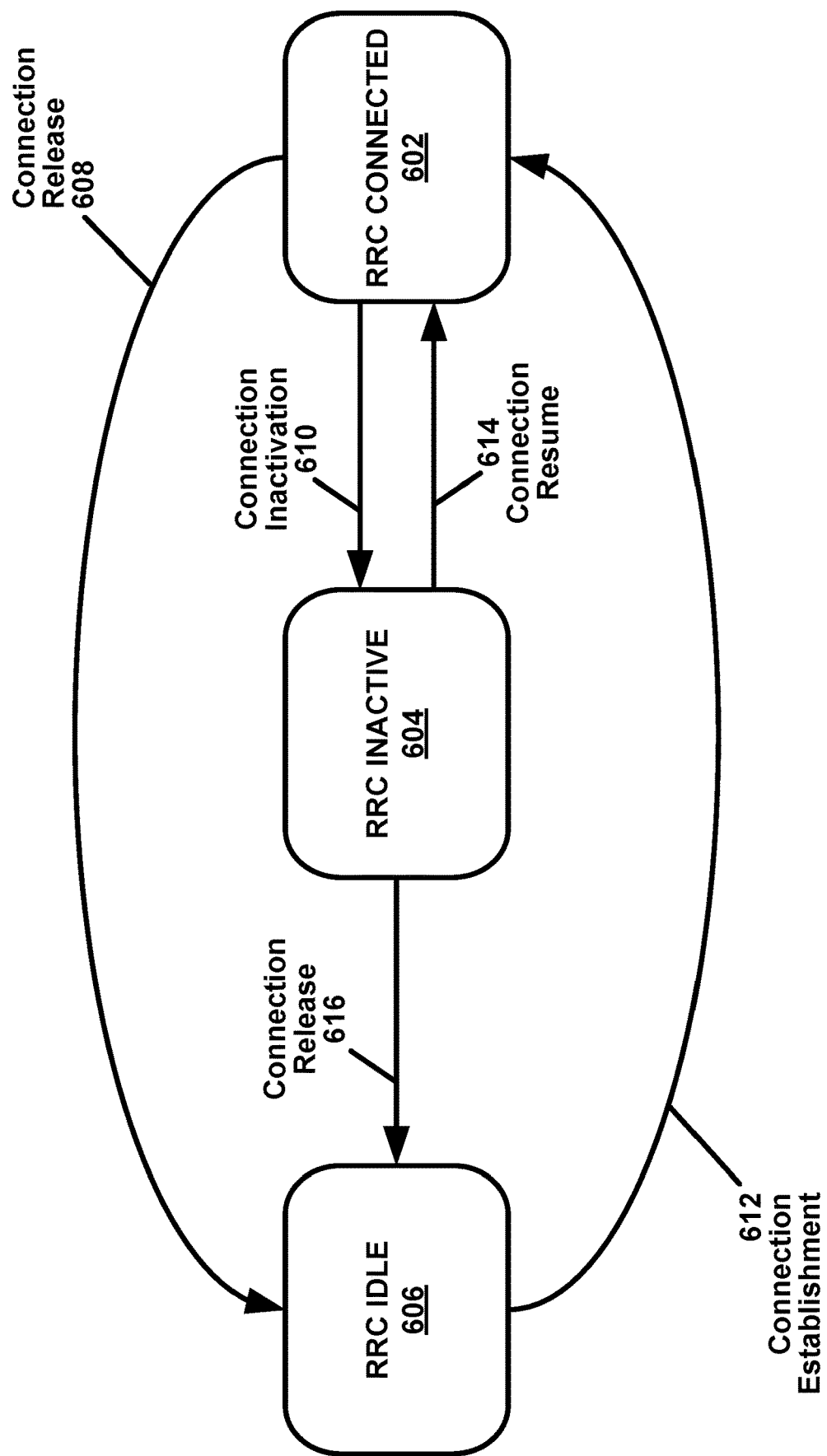
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE).

The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by a RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., each discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
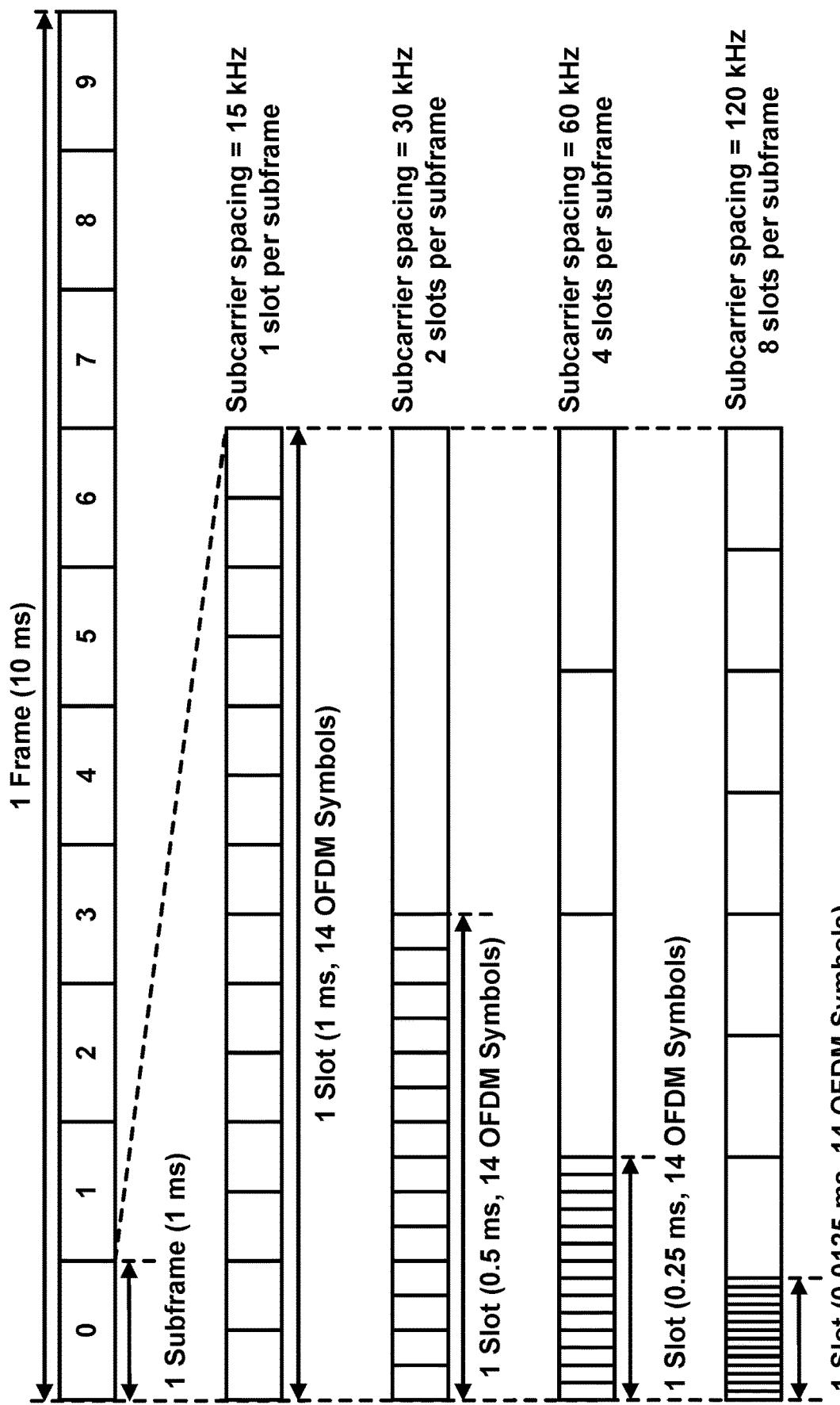
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
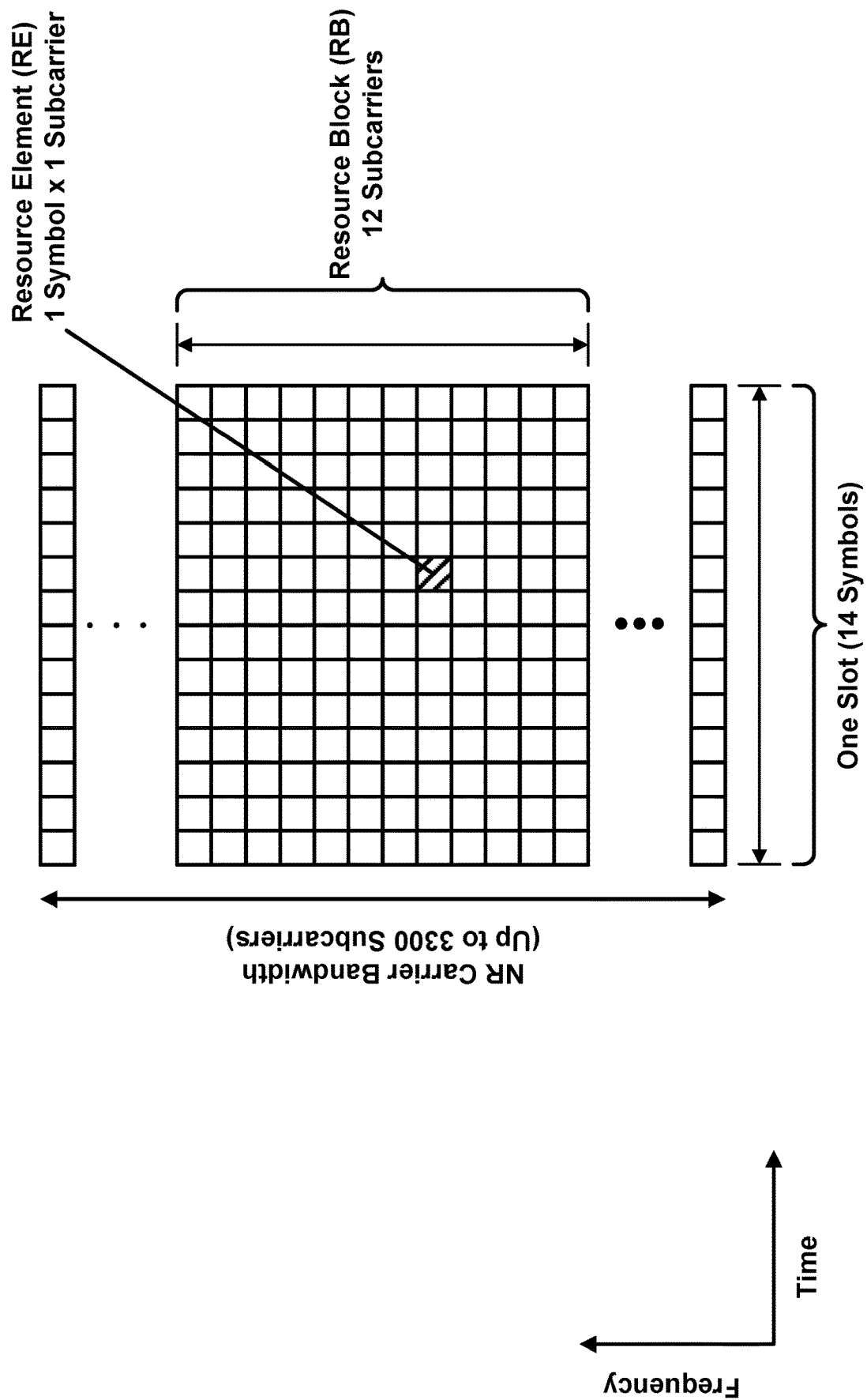
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE)

may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after (e.g., based on or in response to) receiving DCI indicating the second BWP as an active BWP. A wireless device may switch an active BWP from a first BWP to a second BWP, for example, after (e.g., based on or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
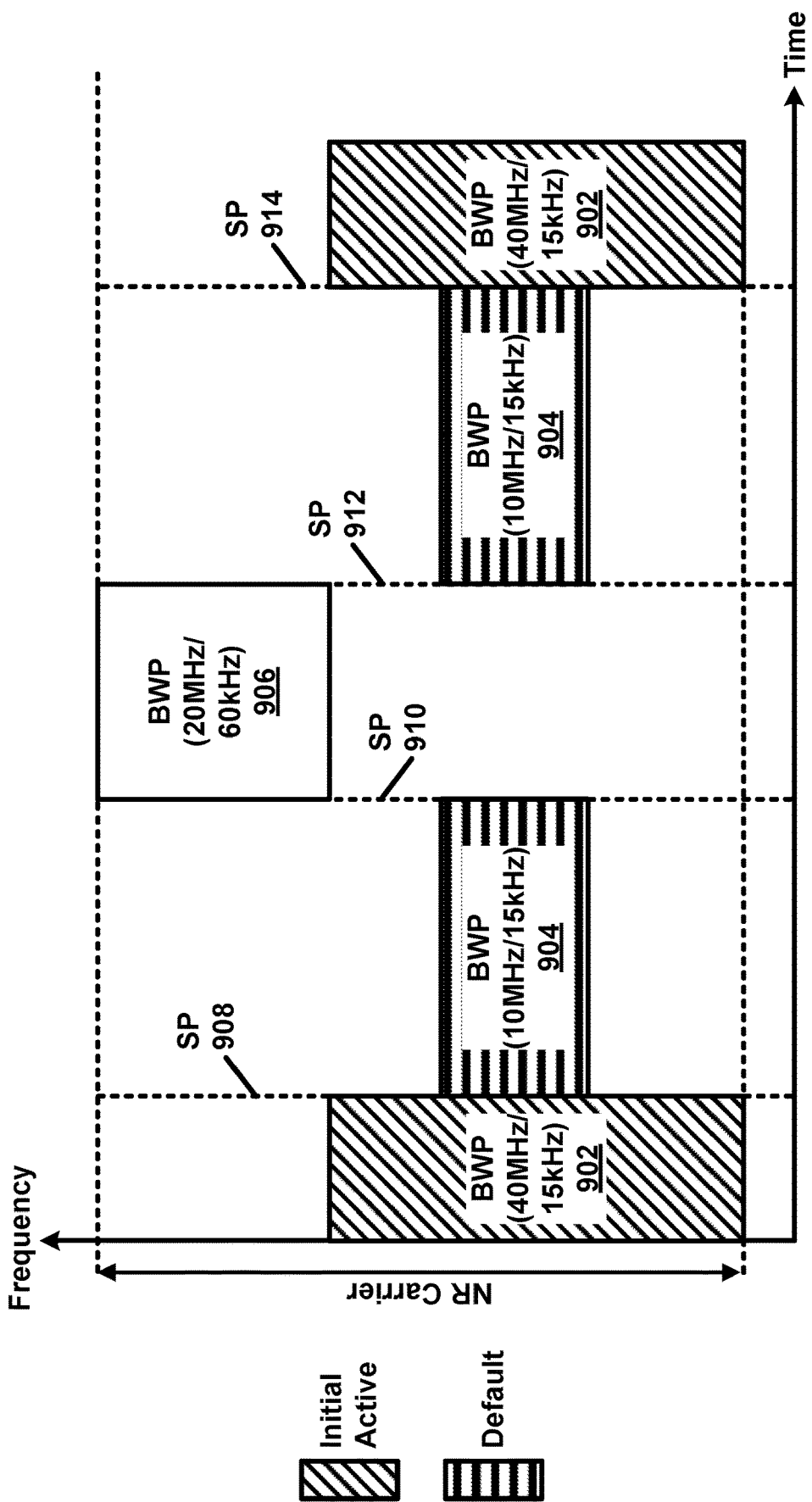
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after (e.g., based on or in response to) an expiry of a BWP inactivity timer (e.g., indicating switching to the default BWP). The switching at the switching point 908 may occur, for example, after (e.g., based on or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after (e.g., based on or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
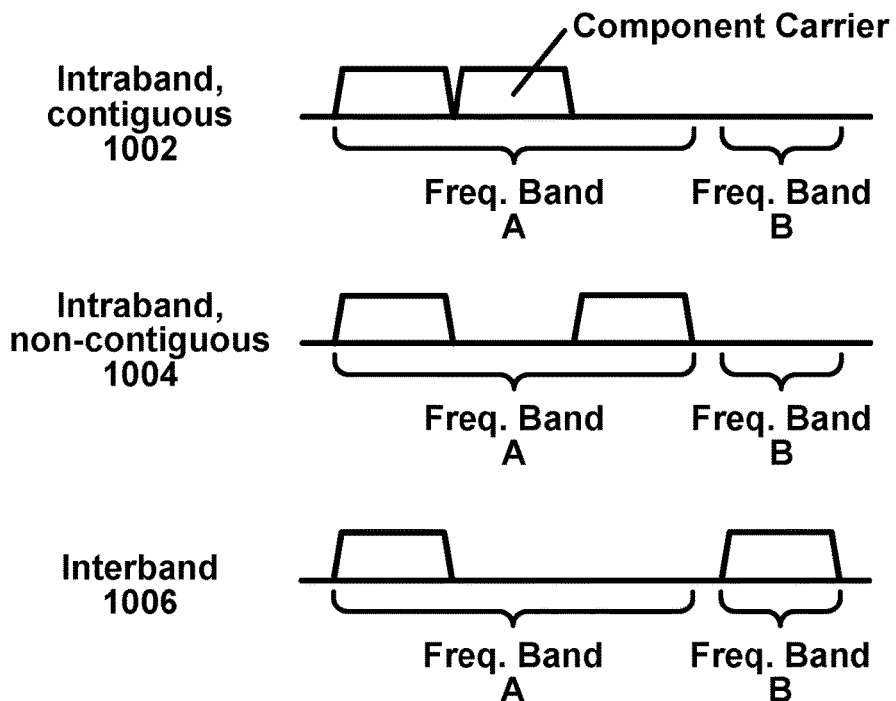
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after (e.g., based on or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number/quantity of aggregated downlink CCs, the PUCCH of the PCell may become overloaded. Cells may be divided into multiple PUCCH groups.

Figure 10B:
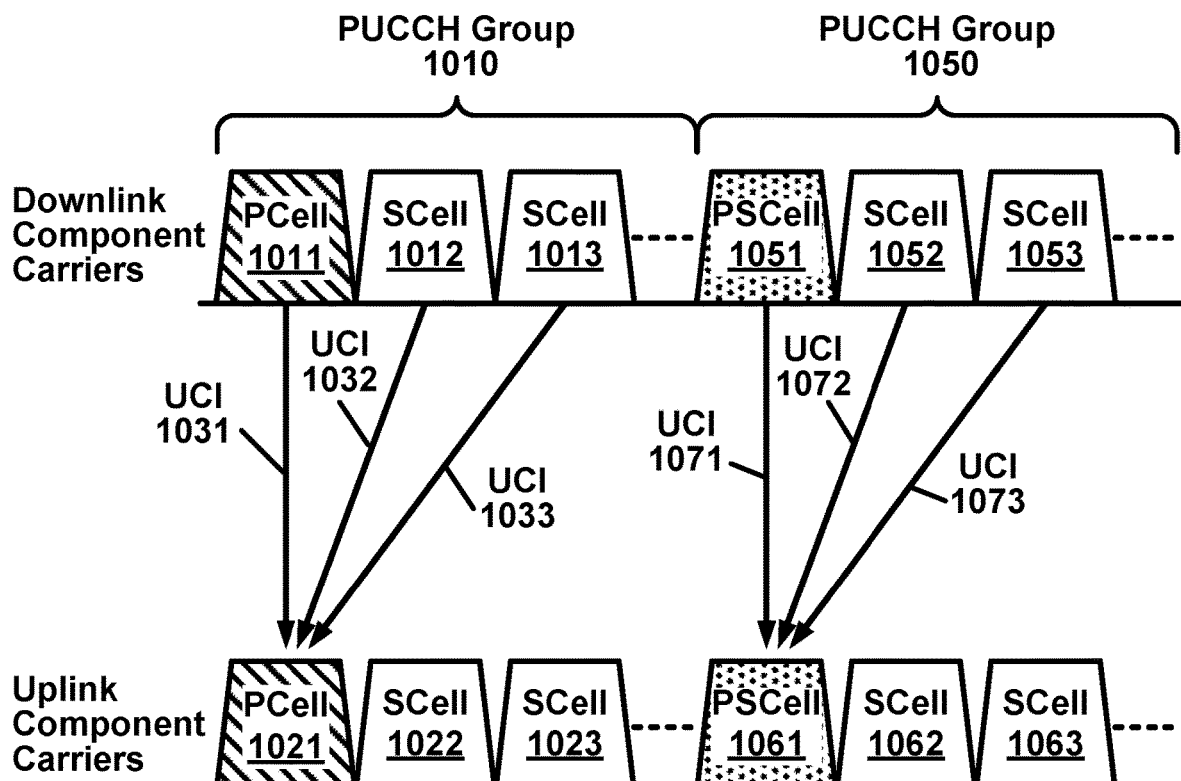
FIG. 10B shows an example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
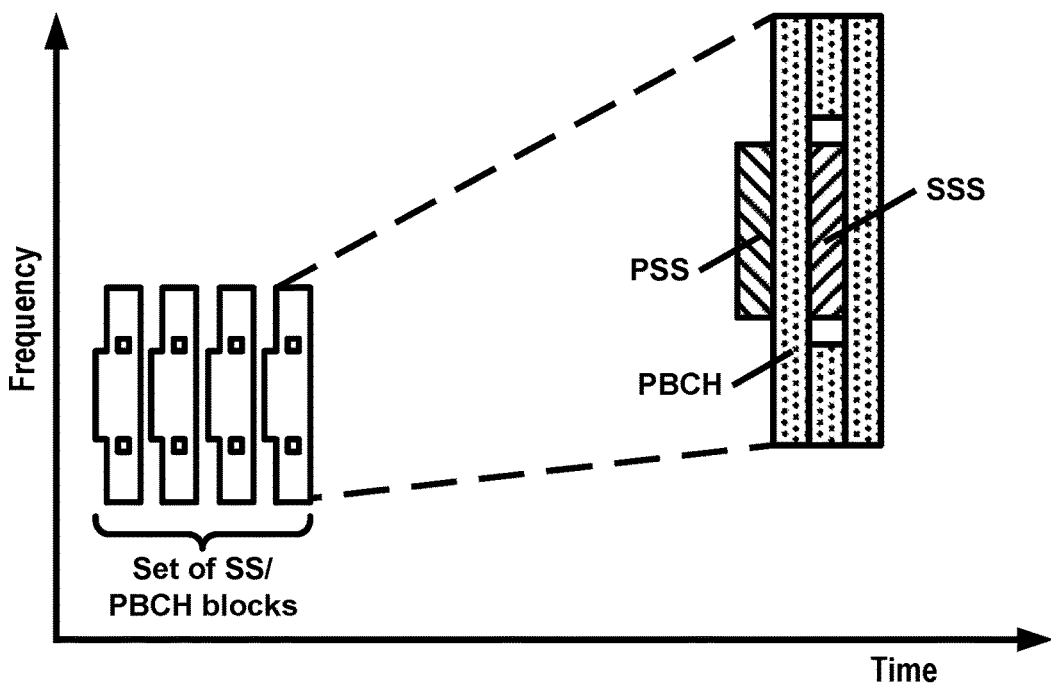
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number/quantity of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices.

SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g. the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number/quantity of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number/quantity of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
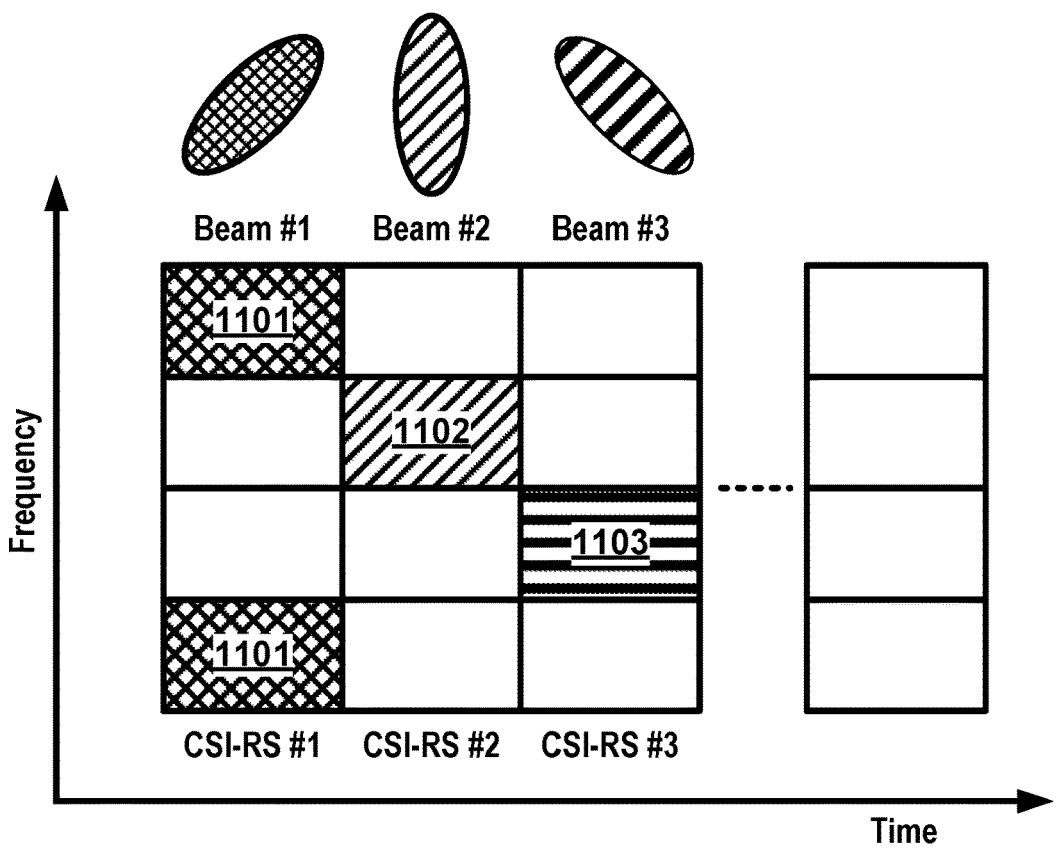
FIG. 11B shows an example of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more parameters may be configured by higher layer signaling (e.g., RRC and/or MAC signaling) for a CSI-RS resource configuration. The one or more of the parameters may comprise at least one of: a CSI-RS resource configuration identity, a number/quantity of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number/quantity of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

Figure 13C:
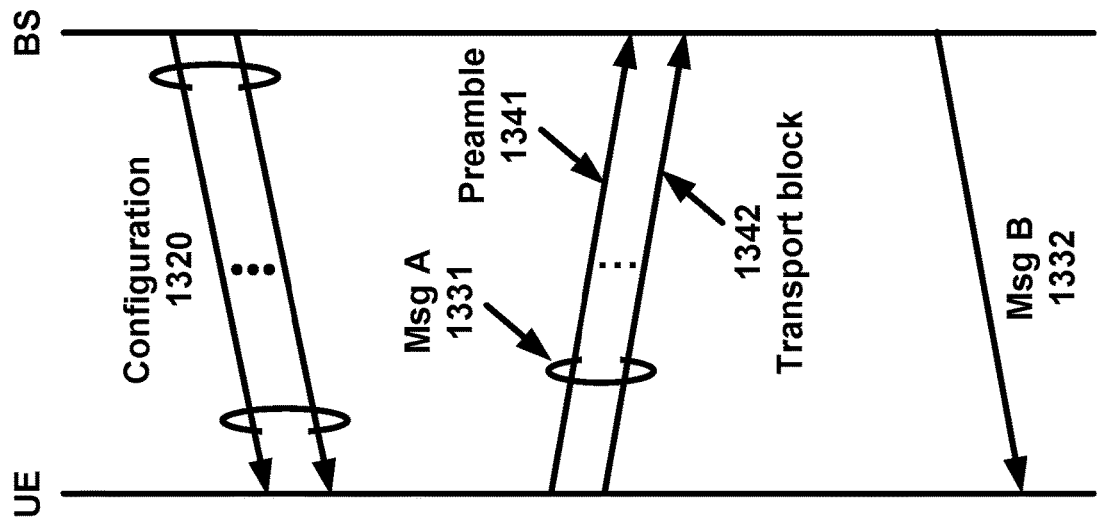
FIG. 13C shows an example two-step random access procedure.
Figure 13B:
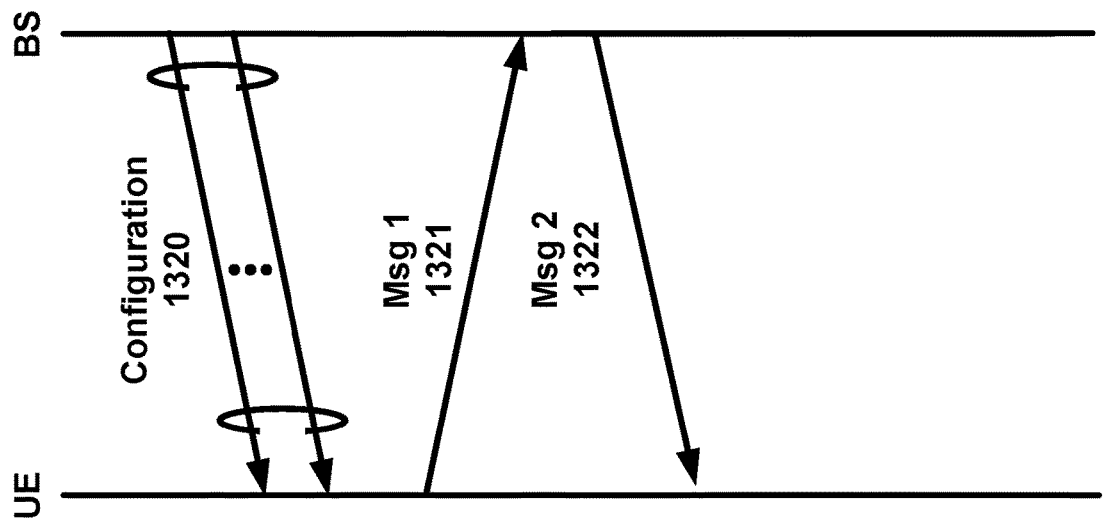
FIG. 13B shows an example two-step random access procedure.
Figure 13A:
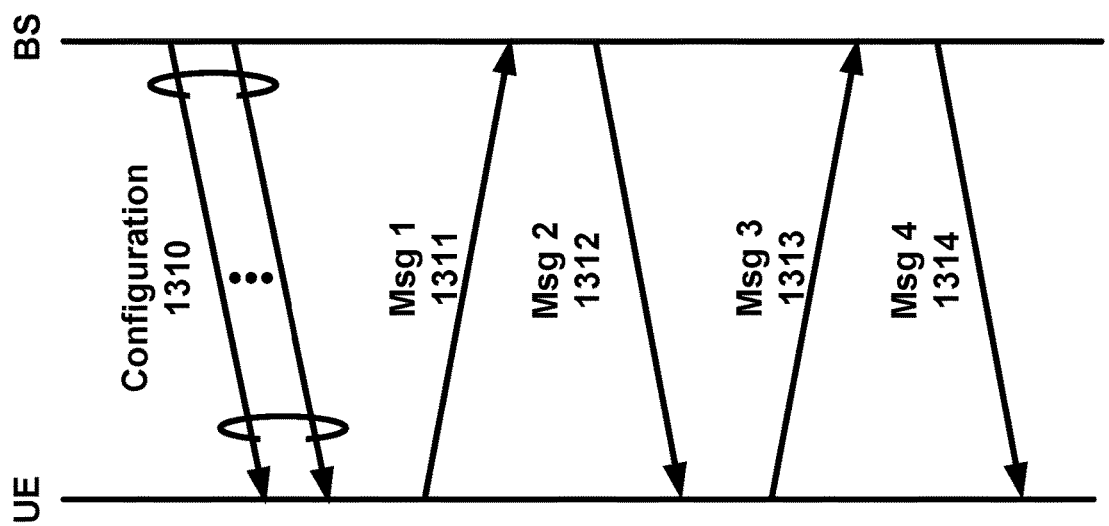
FIG. 13A shows an example four-step random access procedure.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after (e.g., based on or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after (e.g., based on or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$\text{RA-RNTI}=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., $0 \leq s\_id < 14$), t_id may be an index of a first slot of the PRACH occasion in a system frame (e.g., $0 \leq t\_id < 80$), f_id may be an index of the PRACH occasion in the frequency domain (e.g., $0 \leq f\_id < 8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after (e.g., based on or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after (e.g., based on or in response to) the sending/transmitting of the third message (e.g., Msg 3 1313). The base station may address the wireless device on the PDCCH (e.g., the base station may send the PDCCH to the wireless device) using a C-RNTI, for example, if the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). Fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after (e.g., based on or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after (e.g., based on or in response to) transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after (e.g., based on or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 10 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number/quantity of contiguous control channel elements (CCEs), for example, based on a payload size of the DCI and/or a coverage of the base station. The number/quantity of the contiguous CCEs (referred to as aggregation level) may be 1, 2, 4, 8, 16, and/or any other suitable number/quantity. A CCE may comprise a number/quantity (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
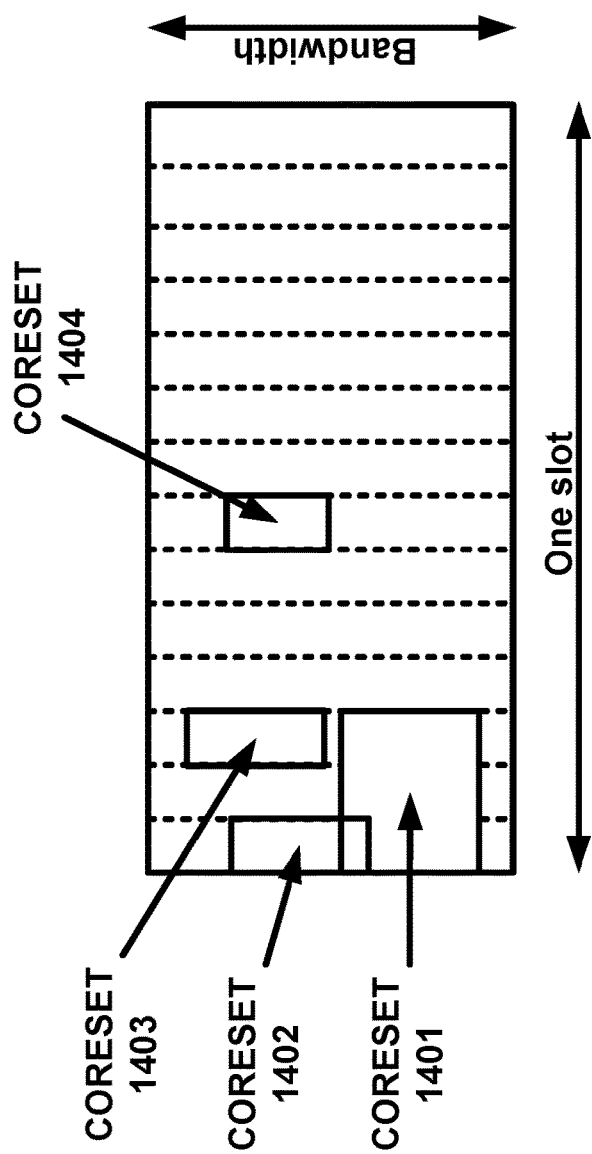
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number/quantity of resource blocks in frequency domain.

Figure 14B:
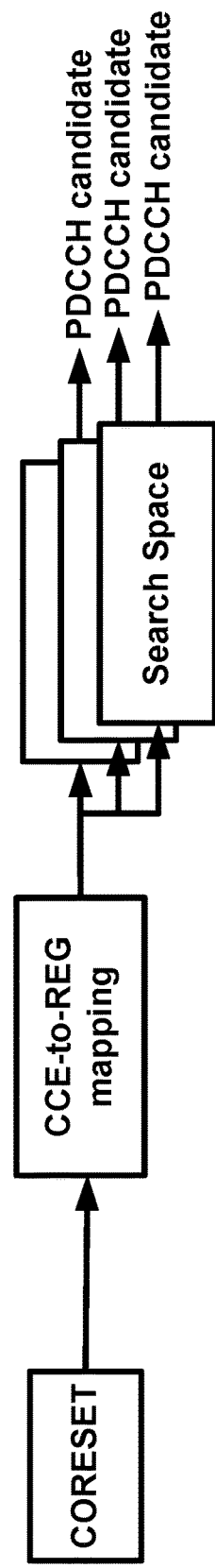
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number/quantity of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number/quantity (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number/quantity of CCEs, the number/quantity of PDCCH candidates in common search spaces, and/or the number/quantity of PDCCH candidates in the wireless device-specific search spaces) and possible (or configured) DCI formats. The decoding may be referred to as blind decoding. The wireless device may determine DCI as valid for the wireless device, for example, after (e.g., based on or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The wireless device may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after (e.g., based on or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number/quantity of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number/quantity of OFDM symbols (e.g., between four and fourteen OFDM symbols) and may comprise two or fewer bits. The wireless device may use PUCCH format 1, for example, if the transmission is over/via four or more symbols and the number/quantity of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number/quantity of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number/quantity of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number/quantity) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
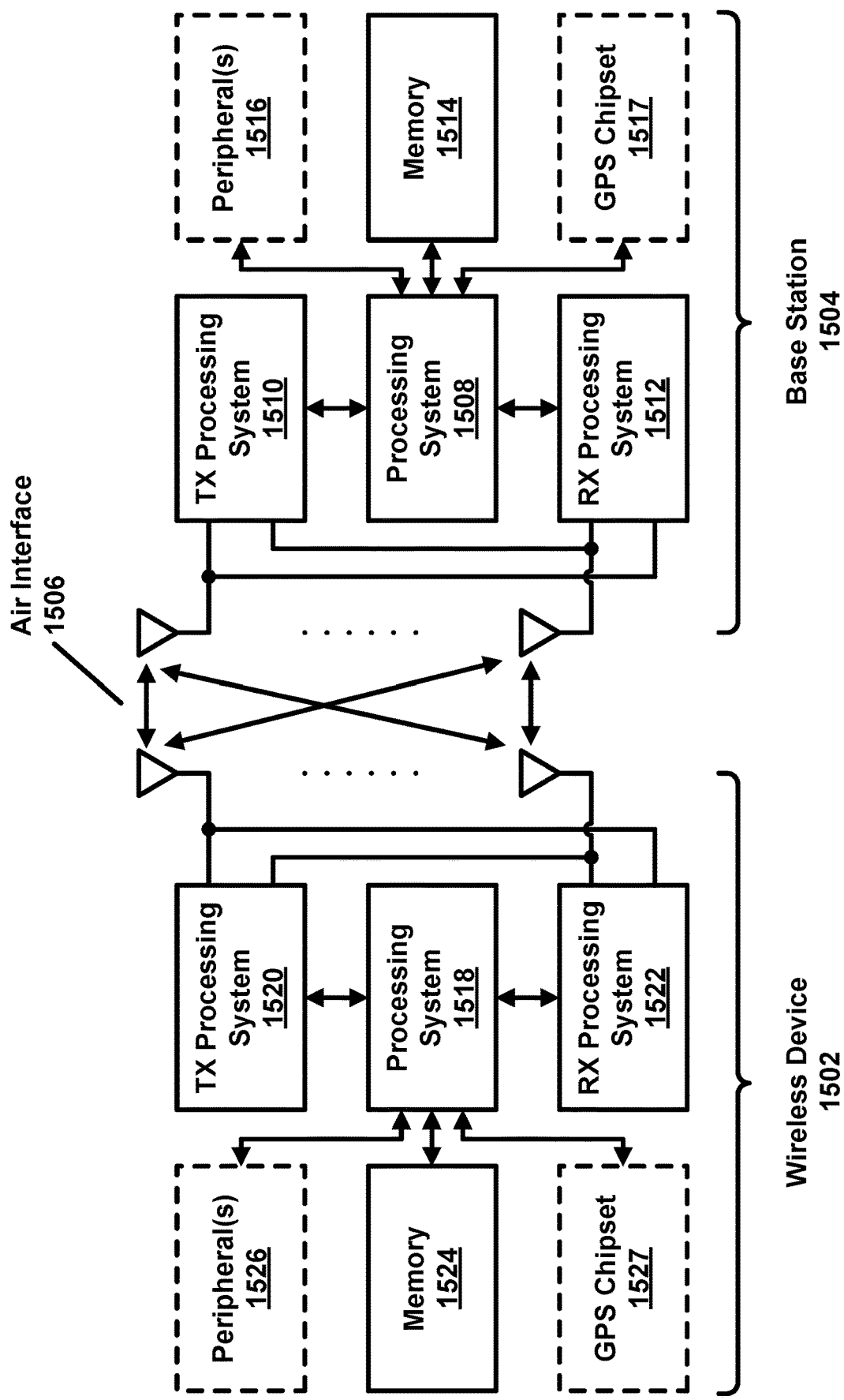
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For sending/transmission processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
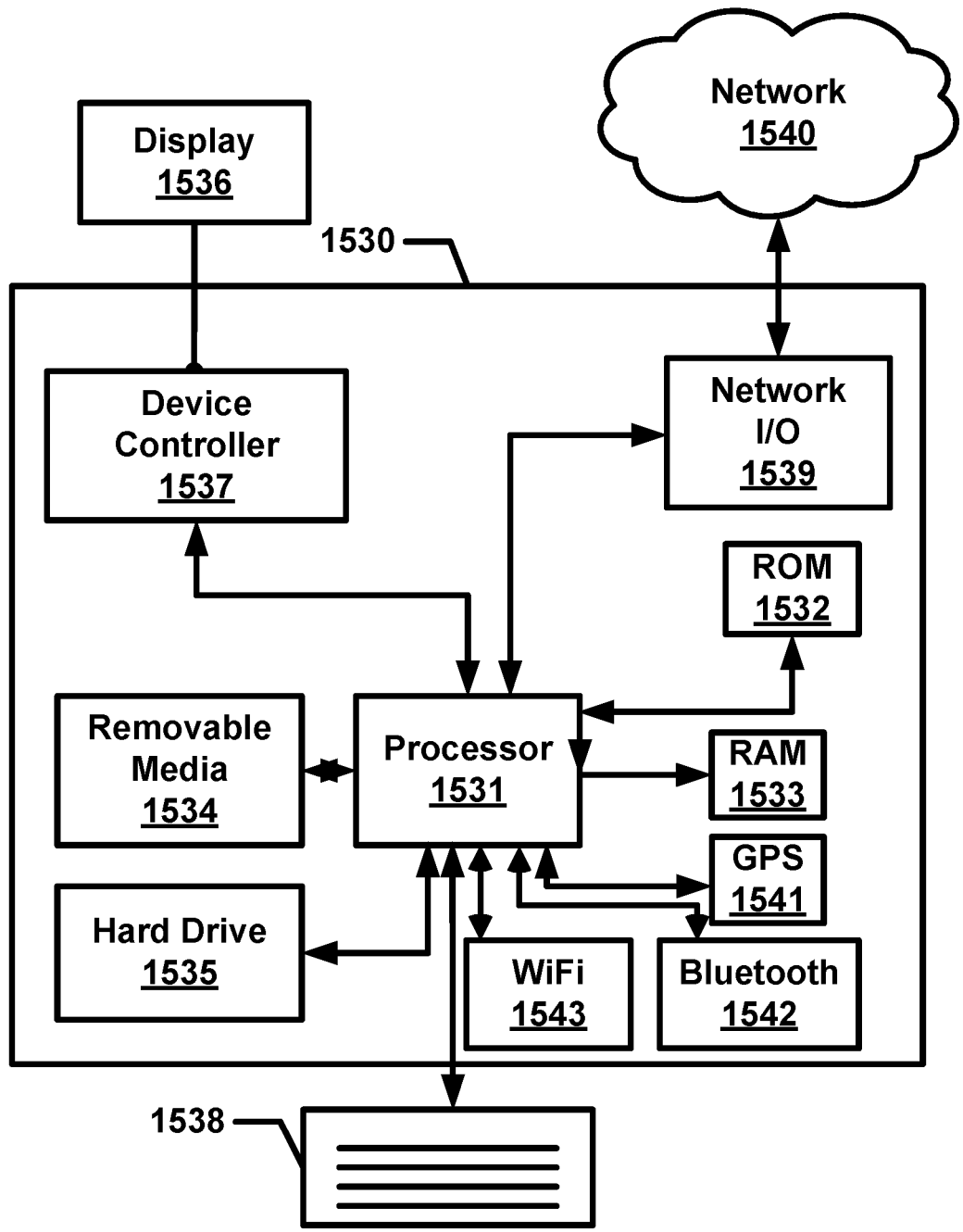
FIG. 15B shows example elements of a computing device that may be used to implement any of the various devices described herein.

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a Wi-Fi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started, and continue running until it is stopped or until it expires. A timer may be started, for example, if it is not running or restarted if it is running. A timer may be associated with a value (e.g., the timer may be started or restarted from a value or may be started from zero and expire if it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Wireless communications may use control channel repetition to provide redundancy for control signals and improve reliability. Control channel repetition may be achieved based on a single coreset. For example, a plurality of search spaces may be associated with a single coreset, and each search space of the plurality of search spaces may be configured with a respective TCI state. For example, a first repetition may be sent (e.g., transmitted) via a first search space associated with the coreset, and a second repetition may be sent (e.g., transmitted) via a second search space associated with the coreset. Because the coreset is shared, the first repetition and the second repetition may be sent (e.g., transmitted) based on one or more common parameters, for example, a set of resource blocks, a CCE-to-REG mapping, a DM-RS scrambling sequence, etc. Control channel repetition across a plurality of TRPs may be achieved by aggregating a first PDCCH via a first coreset and a second PDCCH via a second coreset. The wireless device may determine the first PDCCH that has a candidate index. The wireless device may determine the second PDCCH that has the candidate index. A first number/quantity of CCEs of the first coreset may be the same as a second number/quantity of CCEs of the second coreset, for example, by having the same number/quantity of resource blocks and a duration between the first coreset and the second coreset, but this can limit flexible configurations of the first and second coresets. For example, having the same first number/quantity of CCEs of the first coreset as the second number/quantity of CCEs of the second coreset may limit flexible configurations of control channel repetitions under different conditions (e.g., multi-TRP with ideal/non-ideal backhaul). This approach may limit flexible configuration of control channel repetition based on FDM (e.g., two repetitions occurring in the same time duration with different frequency locations or multiple carriers), and may not effectively handle control channel repetition across different numerologies. Having the same first number/quantity of CCEs of the first coreset as the second number/quantity of CCEs of the second coreset may not effectively support the first coreset with a first duration (e.g., 1 symbol) and the second coreset with a second duration (e.g., 3 symbols).

A base station may indicate a first coreset and a second coreset for downlink control repetition, where parameters of the first coreset and the second coreset are independently configured. For example, the first coreset may be configured with presence of a field (e.g., TCI field) in a first repetition (e.g., first PDCCH) of DCI, and the second coreset may be configured without the presence of a field (e.g., TCI field) in a second repetition (e.g., second PDCCH) of the DCI. For example, based on the presence of the field, the wireless device may determine that the field in a first DCI format is to be used for the first repetition (e.g., the first PDCCH). Based on a lack of presence (e.g., absence) of the field, the wireless device may determine that a second DCI format with no field is to be used for the second repetition (e.g., the second PDCCH). This may lead to ambiguity for the wireless device to determine the correct DCI format and to identify presence of a particular field (e.g., TCI) in the DCI. The wireless device may fail to decode the DCI correctly because of the potentially different assumptions made by the base station and the wireless device, respectively, with regard to the presence of the field (e.g., TCI).

To help the wireless device avoid the ambiguity above, configuration parameters may indicate presence of a field (e.g., TCI, coreset pool index) in repetitions (e.g., first repetition/PDCCH/DCI and second repetition/PDCCH/DCI). The configuration parameters may indicate absence of a field (e.g., TCI, coreset pool index) in repetitions (e.g., first PDCCH/DCI and second PDCCH/DCI). The base station may determine configuration parameters (e.g., a coreset pool index, presence of a field (e.g., TCI, coreset pool index) in DCI) common to both coresets and independently configure other parameters (e.g., resource blocks, number/quantity of CCEs). A first repetition of the DCI may be an initial transmission of the DCI. A second repetition of the DCI may be a subsequent transmission of the DCI after the first repetition.

The wireless device may receive one or more repetitions of DCI scheduling a transport block via one or more monitoring occasions based on one or more search spaces, based on the first TCI state and the second TCI state. For example, the wireless device may receive a repetition (e.g., first PDCCH/DCI) via the first coreset. The first PDCCH/DCI may indicate/comprise a first resource for a transport block and a hybrid automatic repeat request (HARQ) process identifier for the transport block. The wireless device may receive second PDCCH/DCI via the second coreset of the second carrier. The second PDCCH/DCI may indicate/comprise the first resource and the HARQ process identifier. For example, the first resource may comprise resource blocks of the first carrier and/or resource blocks of the second carrier. The first resource may comprise resource blocks of a third carrier. A number/quantity of CCEs of the first coreset may be the same as a second number/quantity of CCEs of the second coreset. For example, the first carrier may be the same as or different from the second carrier. The wireless device may receive the transport block via the first resource. This may enhance reliability of repetitions (e.g., control channel/DCI).

DCI may be repeated via a first coreset and a second coreset, where one or more first parameters (e.g., fields) of the first coreset and the second coreset are configured with the same value(s) and one or more second parameters (e.g., fields) of the first coreset and the second coreset may be configured with different value(s). For example, a base station may need to ensure that the one or more first parameters are configured with the same value(s) between the first coreset and the second coreset. This may allow simpler processing at the wireless device. For example, the one or more first parameters may indicate presence of a TCI field in a repetition (e.g., DCI). For example, a wireless device may determine (e.g., expect) a TCI field in DCI if a coreset is configured with the presence of a TCI field in the DCI. The wireless device might not expect the TCI field in the DCI or may expect no presence of the TCI field in the DCI, for example, if the coreset is not configured with the presence of a TCI field in the DCI. The base station may ensure that the same value is indicated for both the first coreset and the second coreset for presence of a TCI field in the repetitions (e.g., DCI). The wireless device may determine the presence of a TCI field based on an assumption that the first coreset and the second coreset indicate a same value (e.g., either presence for both or no presence for both). The base station may send configuration parameters indicating presence of a field (e.g., TCI) in the DCI to enhance flexibility in configuring multiple coresets for control repetitions. This approach may reduce complexity of the wireless device's decoding DCI by ensuring that some parameters are common across the multiple coresets.

The above approach may permit lower complexity of the wireless device and may reduce or eliminate ambiguity between the base station and the wireless device with regard to the format of the DCI that is supported for control channel repetition.

A base station may send (e.g., transmit) a plurality of repetitions of DCI when resources (e.g., downlink resources) of the plurality of repetitions are available. Otherwise, the base station may determine not to send (e.g., transmit) the plurality of repetitions. This may reduce opportunities for the base station to send DCI (e.g., in TDD or with reserved resources). For example, a base station may decide not to send a repetition that was originally scheduled for transmission, and even if the base station tries to inform the wireless device that the repetition will not be sent, sometimes the wireless device might not receive that message and proceed on the assumption that the scheduled repetition was never sent, while the base station may proceed on the assumption that the scheduled repetition was canceled. These conflicting assumptions may lead to errors and DCI overhead, for example, if certain resource timing is scheduled based on the information in the DCI repetitions.

A base station may send (e.g., transmit) a number/quantity of repetitions of a downlink control. For example, the number/quantity of repetitions may be configured by RRC signaling. The base station may skip transmission of repetitions of a downlink control if there is insufficient resources to send (e.g., transmit) the number/quantity of repetitions. For example, when the number/quantity of repetitions is two and resources of a second repetition may overlap with uplink resources, the base station may skip transmission of a first repetition and the second repetition. In another example, the second repetition may be dropped due to a dynamic slot formation indication (SFI), where the wireless device might not receive the dynamic SFI. In another example, the second repetition may be dropped due to reserved resources by the base station. Repetitions of downlink control may be skipped, for example, in a TDD, or in a case resources have been reserved. The base station may need to indicate a number/quantity of repetitions (e.g., via a field in the DCI). For example, the base station may need to indicate a repetition number/quantity of 1 based on (e.g., after, in response to) sending (e.g., transmitting) the first repetition but determining to not send (e.g., transmit) the second repetition. A requirement for the base station to indicate the number/quantity of repetitions via a field in the DCI may increase DCI overhead.

To improve efficiency of downlink control repetition and/or reduce DCI overhead, a base station may send (e.g., transmit) one or more of the repetitions (e.g., DCI) based on resource availability. To align the base station and the wireless device in terms of resources (e.g., resources for data, HARQ feedback) and/or scheduling information, the wireless device may determine (scheduled) resources based on a candidate (e.g., a search space candidate) of the last configured repetition even if the last configured repetition was not sent by the base station and/or received by the wireless device. The scheduling offset may be determined based on the last candidate (e.g., last repetition opportunity) regardless of its transmission. The wireless device may determine the timing (e.g., scheduling offset), for example, based on the scheduled but unsent and/or unreceived DCI.

A number/quantity of repetitions of DCI may be configured (e.g., preconfigured). For example, the number/quantity of repetitions may be 2. A base station may send (e.g., transmit) only one of a first repetition or a second repetition when one of the two scheduled repetitions may overlap with uplink resources or reserved resources. The base station may send (e.g., transmit) both repetitions when both repetitions may overlap with downlink resources. For example, the base station may send (e.g., transmit) the first repetition and may skip the second repetition. The base station may determine to skip the second repetition based on slot formation indication (e.g., the second repetition overlaps with uplink resources), a rate matching pattern (e.g., the second repetition overlaps with unavailable/reserved resources), and/or the like. The DCI may comprise a scheduling offset between reception of the DCI and resources of a transport block scheduled by the DCI. A wireless device may determine a time domain resource of resources of the transport block based on a timing (e.g., monitoring occasion, which may be a time that the second repetition is scheduled to be sent) of the second repetition when the second repetition has not been sent (e.g., transmitted) and/or not been received. This may reduce ambiguity between the base station and the wireless device because the wireless device's behavior for when the second repetition is not received is more clearly defined. Determining timing based on the monitoring occasions may reduce complexity of the wireless device because the wireless device may determine a scheduling offset in the same manner when the wireless device receives all repetitions, as when the wireless device receives only a subset of the repetitions. This approach may permit more flexible transmissions of one or more repetitions and reduced ambiguity in terms of interpretation of DCI fields.

Figure 17:
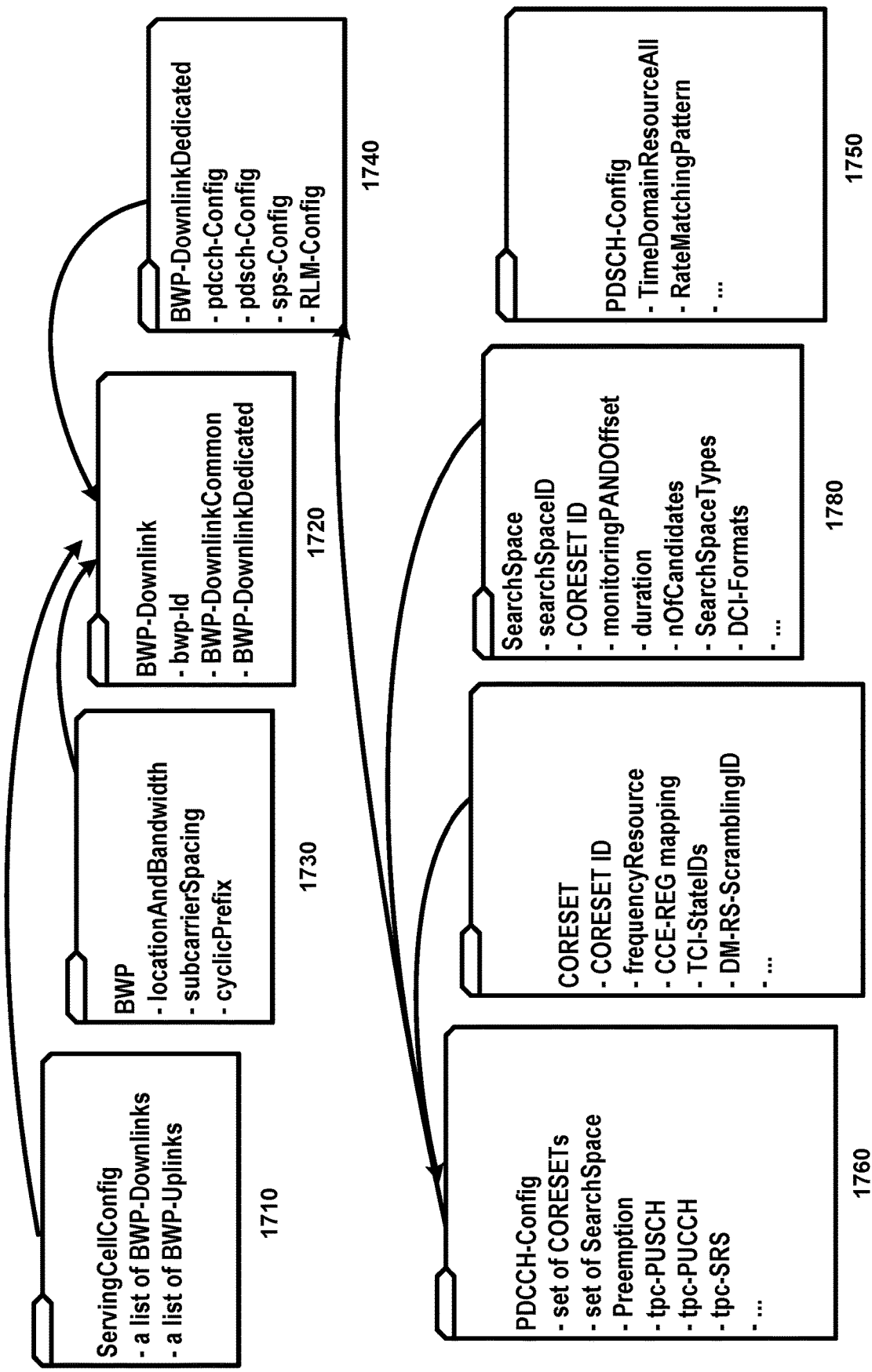
FIG. 17 shows example configuration parameters for a wireless device to receive control and/or data from a base station.

FIG. 17 shows example configuration parameters for a wireless device to receive control and/or data from a base station. A wireless device may receive one or more radio resource control (RRC) messages comprising configuration parameters of a cell. The configuration parameters may indicate/comprise one or more parameters of a serving cell configuration 1710 (e.g., ServingCellConfig). The one or more parameters of the serving cell configuration 1710 may comprise one or more downlink bandwidth parts (e.g., a list of BWP-Downlinks). The one or more parameters of the serving cell configuration 1710 may comprise one or more uplink bandwidth parts (e.g., a list of BWP-Uplinks). A downlink bandwidth part configuration 1720 (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon), and/or a wireless device-specific downlink bandwidth part (e.g., BWP-DownlinkDedicated). For example, the bandwidth part index (bwp-Id) may indicate a bandwidth part configuration, wherein an index of the bandwidth part is the bandwidth part index. The bandwidth part configuration 1730 may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration 1730 may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and/or 960 kHz. For example, the cyclic prefix may be one of a normal cyclic prefix and/or an extended cyclic prefix.

Configuration parameters of the cell-specific downlink bandwidth (e.g., BWP-DownlinkCommon) may comprise genericParameters, pdcch-ConfigCommon, and/or pdsch-ConfigCommon. For example, pdcch-ConfigCommon may comprise cell-specific parameters for receiving downlink control information (DCIs) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the wireless device-specific downlink bandwidth part 1740 (e.g., BWP-DownlinkDedicated) may comprise pdcch-Config, pdsch-Config, sps-Config, and/or radioLinkMonitoringConfig (e.g., RLM-Config). The configuration parameters may indicate/comprise sps-ConfigList and/or beamFailureRecoverySCellConfig. For example, beamFailureRecoverySCellConfig may comprise reference signal parameters for beam failure recovery for secondary cells. For example, pdcch-Config may comprise parameters for receiving DCIs for the wireless device-specific downlink bandwidth part. For example, pdsch-Config 1750 may comprise parameters for receiving PDSCHs of TBs for the wireless device-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config 1760 may comprise at least one of a set of coresets 1770, a set of search spaces 1780, a downlink preemption (e.g., downlinkPreemption), a transmission power control (TPC) for PUSCH (e.g. tpc-PUSCH), a TPC for PUCCH and/or a TPC for SRS. The configuration parameters may indicate/comprise a list of search space switching groups (e.g., searchSpaceSwitchingGroup), a search space switching timer (e.g., searchSpaceSwitchingTimer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) coresets for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS, respectively. The uplink cancellation may indicate to monitor uplink cancellation for the cell.

Configuration parameters of pdcch-ConfigCommon may comprise a control resource set zero (e.g., controlResourceSetZero), a common control resource set (e.g., commonControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first coreset with an index value zero. The coreset zero may be configured for an initial bandwidth part of the cell. The wireless device may use the control resource set zero in a BWP of the cell, wherein the BWP is not the initial BWP of the cell based on one or more conditions. For example, a numerology of the BWP may be the same as the numerology of the initial BWP. For example, the BWP may comprise the initial BWP. For example, the BWP may comprise the control resource set zero. The common control resource set may be an additional common coreset that may be used for a common search space (CSS) or a UE-specific search space (USS). The base station may configure a bandwidth of the common control resource set is smaller than or equal to a bandwidth of the control resource set zero. The base station may configure the common control resource set such that it is contained within the control resource set zero (e.g., CORESET #0). The list of common search space may comprise one or more CSSs. The list of common search space might not comprise a search space with index zero (e.g., SS #0). The first PDCCH monitoring occasion may indicate a monitoring occasion for a paging occasion. The base station may configure a search space for monitoring DCIs for paging (e.g., pagingSearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the corset #0, the SS #0 may be used in the BWP of the cell based on the one or more conditions.

FIG. 18 shows example configuration parameters of a coreset. A ControlResourceSet (coreset) may comprise a coreset index (e.g., ControlResourceSetId), frequency domain resources (e.g., frequencyDomainResources), a duration of the coreset (e.g., a number/quantity of OFDM symbols between [1, maxCoReSetDuration], where, for example, maxCoReSetDuration=3) and a CCE to REG mapping type (e.g., between interleaved and nonInterleaved). The base station may also configure a bundle size of REG (e.g., reg-BundleSize) and an interleaver size (e.g., interleaverSize), for example, if the CCE-REG mapping type is configured as interleaved. The coreset may also comprise a precoder granularity (e.g., between same as REG bundle (e.g., sameAsREG-bundle) and across all contiguous RBs (e.g., allContiguousRBs)). The wireless device may assume that a same precoder is used across REGs in a bundle, for example, if the precoder granularity is configured as 'same as REG bundle.' The wireless device may assume that a same precoder is used across RBs in contiguous RBs of the coreset, for example, if the precoder granularity is configured as 'across all contiguous RBs.' The coreset may comprise a list of TCI states, wherein the coreset is not a coreset #0. The coreset may comprise a parameter of a TCI presence in DCI. The wireless device may expect that a DCI format comprises a TCI indication in DCI based on the DCI format (e.g., a DCI format 1_1 and/or a DCI format 0_1) scheduled via a search space associated with the coreset, for example, if the DCI indicates/comprises the TCI field for the coreset. The coreset may optionally comprise one or more of a DMRS scrambling identity, a coreset pool index, an enhanced coreset index (e.g., ControlResourceSetId-v16xy), a TCI present in DCI for a DCI format 1_2, and an RB offset. The wireless device may ignore the coreset index, for example, if the enhanced coreset index is present in the coreset configuration. The enhanced coreset index may indicate a value between [0, . . . , 15] whereas the coreset index may indicate a value between [0, . . . , 11].

A coreset may be associated with a search space, and the wireless device may determine search space candidates and/or monitoring occasions of the search space based on configuration of the search space and the coreset. A search space may be associated with a coreset, and the wireless device may determine search space candidates and/or monitoring occasions of the search space based on configuration of the search space and the coreset. Parameters of the search space may comprise an index of the coreset, for example, if the search space is associated with the coreset or the coreset is associated with the search space.

A search space may comprise an index of the search space (e.g., searchSpaceId), an index for the associated coreset (e.g., controlResourceSetId), a monitoring periodicity and offset (e.g., periodicity in terms of a number/quantity of slots and an offset in terms of a number/quantity of slots, between [1, 2560] slots for periodicity, an offset between [0, . . . , P−1] where the P is the periodicity). The search space may comprise a duration, wherein the wireless device may monitor the search space in consecutive slots starting from the monitoring occasion based on the duration. The base station might not configure the duration for a search space scheduling a DCI format 2_0. A maximum duration value may be the periodicity −1 (e.g., repeated in each slot within an interval/periodicity). The search space may comprise monitoring symbols within a slot (e.g., a bitmap of size of OFDM symbols in a slot (e.g., 12 for extended cyclic prefix (CP), 14 for normal CP)). The search space may comprise a set of a number/quantity of candidates of each aggregation level (e.g., a first candidate number/quantity for an aggregation level L=1, a second candidate number/quantity of an aggregation level L=2, and so on). The search space may comprise a search space type (e.g., between CSS and USS). Each CSS or USS may comprise one or more DCI formats monitored in the search space. For example, for CSS, one or more of a DCI format 0_0/10, a DCI format 20, a DCI format 2_1, a DCI format 2_2 and a DCI format 2_3 may be configured. For USS, the base station may configure a list of search space group index (if configured). For USS, the base station may configure a frequency monitoring occasion/location for a wideband operation of unlicensed spectrum or licensed spectrum. In the specification, DCI format 0_0/1_0 may be interchangeably used with DCI format 0-0/1-0 or fallback DCI format. DCI format 0_1/1_1 may be interchangeably used with DCI format 0-1/1-1 or non-fallback DCI format. DCI format 0_2/1_2 may be interchangeably used with DCI format 0-2/1-2 or non-fallback DCI format.

Configuration parameters of the pdsch-Config may comprise parameters for receiving transport blocks. For example, the configuration parameters may indicate/comprise a data scrambling identify for PDSCH, a DM-RS mapping type (e.g., between mapping type A and mapping type B), a list of transmission configuration indicator (TCI) states, a parameter of (virtual RB) VRB-to-(physical RB) PRB interleaver, a resource allocation type (e.g., resource allocation type 0, resource allocation type 1 or a dynamic switch between two), a list of time domain allocation, a aggregation factor, a list of rate matching patterns, an RBG (resource block group) size, an MCS table (e.g., between QAM 256 and a QAM64LowSE, between high MCSs or low MCSs), a maximum codeword (e.g., 1 or 2), parameter(s) related to a PRB bundling, maximum MIMO layer, a minimum scheduling offset related to a power saving technique, and/or one or more parameters related to a DCI format 1_2 (e.g., a compact DCI or small sized DCI format).

Figure 19:
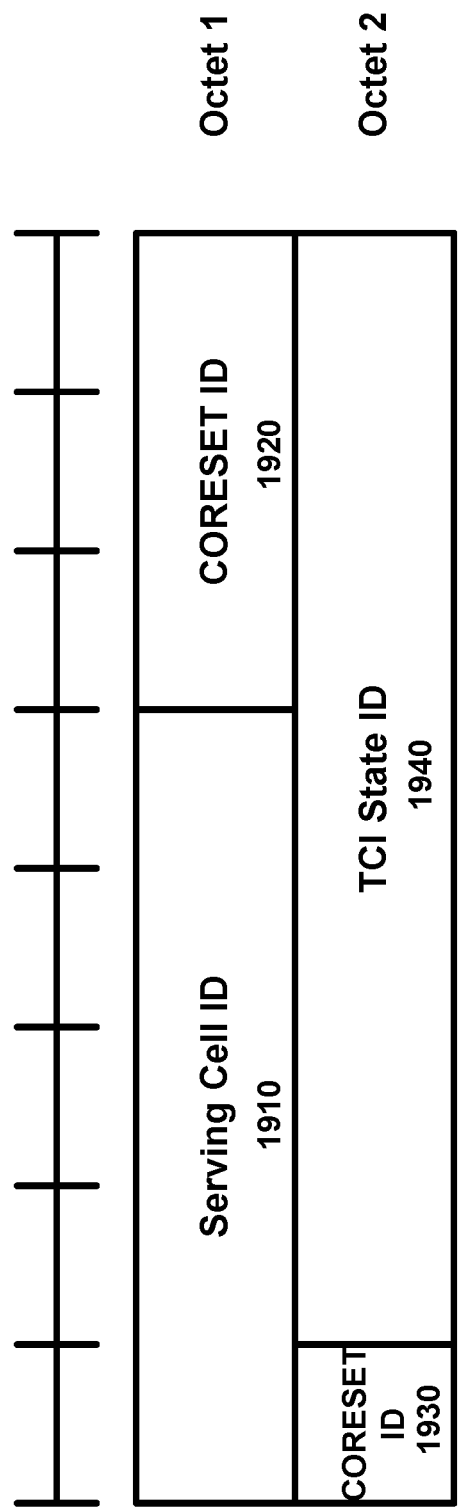
FIG. 19 shows an example of a MAC control element (CE) format used for indicating the transmission configuration indication (TCI) state for the coreset.

FIG. 19 shows an example of a MAC CE format used for indicating the TCI state for the coreset. The base station may configure a coreset with a plurality of TCI states. The base station may indicate a TCI of the plurality of TCI states for the coreset as an active TCI state via a MAC CE command or a DCI command. A serving cell index (e.g., Serving Cell ID 1910) may indicate an index of a serving cell, where the MAC CE is used. A coreset index (e.g., CORESET ID 1920) may indicate a coreset index where the MAC CE is used. A TCI state index (e.g., TCI State ID 1940) may indicate a TCI state identified by TCI-StateId. The TCI state ID 1940 may indicate one TCI state of first 64 TCI states configured for pdsch-Config of a BWP of the serving cell, for example, if the coreset is CORESET #0. The BWP of the serving cell may be an active BWP of the cell. The TCI state ID 1940 may indicate a TCI state of the plurality of TCI states configured for the coreset in pdcch-Config, for example, if the coreset is not the CORESET #0 (e.g., CORESET ID is not zero).

A base station and a wireless device may use a plurality of downlink control information (DCI) formats to communicate control information to schedule downlink data and/or uplink data or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 02 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 22 may be used to indicate one or more transmit power control commands for PUCCH and PUSCH. A DCI format 2_3 may be used to indicate one or more transmit power control for SRS. A DCI format 2_4 may be used to indicate uplink cancellation information. A DCI format 2_5 may be used to indicate preemption information. A DCI format 2_6 may be used to indicate a power saving state outside of DRX active time. A DCI format 3_0 or 3_1 may be used to schedule NR sidelink resource or LTE sidelink resource in one cell.

A DCI format 0_0 and a DCI format 10 may be referred to as a fallback DCI format for scheduling uplink and downlink, respectively. A DCI format 0_1 and a DCI format 1_1 may be referred to as a non-fallback DCI format scheduling uplink and downlink, respectively. A DCI format 0_2 and a DCI format 1_2 may be referred to as a compact DCI format for scheduling uplink and downlink, respectively. A base station may configure one or more DCI formats for scheduling downlink and/or uplink resources. For example, a DCI format 0_0, 0_1, and/or 0_2 may be used to schedule uplink resource(s) for one or more PUSCHs. A DCI format 1_0, 1_1, and/or 1_2 may be used to schedule downlink resource(s) for one or more PDSCHs. A DCI format 2_0, 2_1, 2_2, 2_3, 2_4, 2_5, and/or 2_6 may be used for a group-common DCI transmission. Each format of DCI format 2_x may be used for different information. For example, the DCI format 2_4 may be used to indicate uplink resources for a group of wireless devices. A wireless device may cancel any uplink resource, scheduled prior to the receiving, for example, if the uplink resource may be overlapped with the indicated uplink resources, and, for example, based on (e.g., after or in response to) receiving DCI based on the DCI format 2_4.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be sent (e.g., transmitted) via a master information block (MIB). For example, the one or more RRC configuration parameters may be sent (e.g., transmitted) via system information blocks (SIBs). For example, the one or more RRC configuration parameters may be sent (e.g., transmitted) via one or more wireless device specific messages. For example, the wireless device may determine one or more DCI sizes of one or more DCI fields of a DCI format 0_0 based on the one or more RRC configuration parameters sent (e.g., transmitted) via the MIB and/or the SIBs. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters sent (e.g., transmitted) via the MIB and/or the SIBs.

The wireless device may determine one or more first DCI sizes of one or more first DCI fields of a DCI format 0_2 based on one or more RRC configuration parameters sent (e.g., transmitted) via the MIB and/or the SIBs and/or the wireless device specific RRC message(s). The wireless device may determine one or more bitfield sizes of the one or more first DCI fields based on the one or more RRC configuration parameters.

Figure 20:
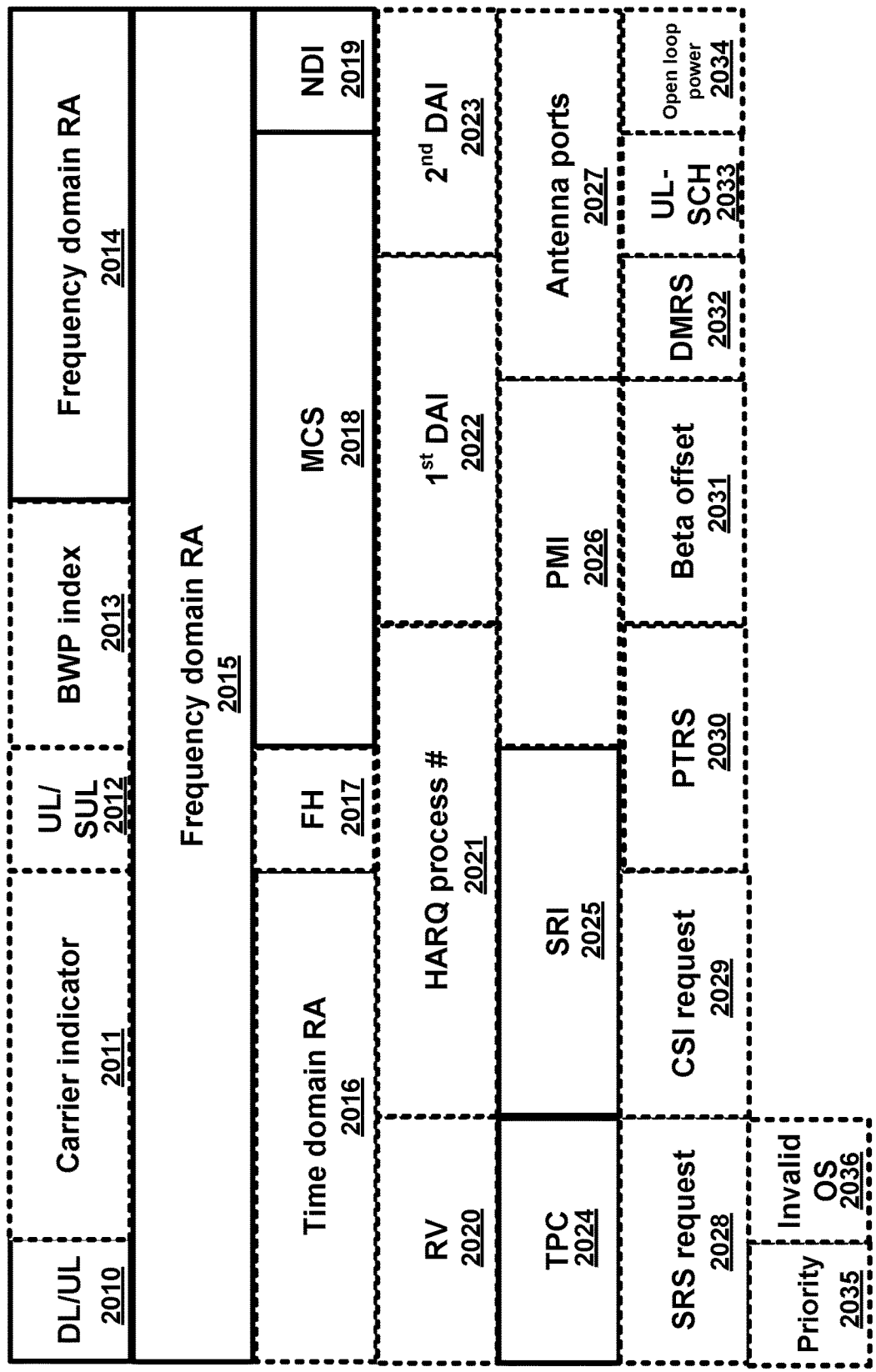
FIG. 20 shows example DCI fields of a DCI format 0_2.

FIG. 20 shows example first DCI fields of the DCI format 0_2. In FIG. 20, there are one or more second DCI fields that may be present in the DCI format 0_2 regardless of the wireless device-specific RRC message(s). For example, the one or more second DCI fields may comprise at least one of a DL/UL indicator 2010, frequency domain resource allocation 2015, MCS 2018, NDI 2019, and TPC 2024 fields. For example, the one or more first DCI fields may comprise the one or more second DCI fields and one or more third DCI fields. A DCI field of the one or more third DCI fields may be present or might not be present based on one or more configuration parameters sent (e.g., transmitted) by the base station. For example, the one or more third DCI fields may comprise at least one of a BWP index 2013, RV 2020, HARQ process #2021, PMI 2026, antenna ports 2027, and/or beta offset 2031.

For example, the DCI format 0_2 may comprise a 1-bit DL/UL indicator 2010 where the bit is configured with zero ('0') to indicate an uplink grant for the DCI format 0_2. DCI field(s) shown in dotted boxes need not be present or a size of the DCI field(s) may be configured as zero. A carrier indicator 2011 may be present, for example, if the DCI format 0_2 is used to schedule a cell based on cross-carrier scheduling. The carrier indicator 2011 may indicate a cell index of a scheduled cell by the cross-carrier scheduling. For example, the UL/SUL indicator (UL/SUL 2012) may indicate whether DCI based on the DCI format 0_2 schedules a resource for an uplink carrier or a supplemental uplink. The UL/SUL indicator field 2012 may be present, for example, if the wireless device is configured with a supplemental uplink for a scheduled cell of the DCI. Otherwise, the UL/SUL indicator field 2012 might not be present.

The BWP index 2013 may indicate a bandwidth part indicator. The base station may send (e.g., transmit) configuration parameters indicating one or more uplink BWPs for the scheduled cell. The wireless device may determine a bit size of the field of BWP index based on a number/quantity of the one or more uplink BWPs. For example, 1 bit may be used for the BWP index 2013. The number/quantity of the one or more uplink BWPs (excluding an initial UL BWP) may be two. The field of BWP index 2013 may be used to indicate an uplink BWP switching. The wireless device may switch to a first BWP, for example, based on (e.g., after or in response to) receiving the DCI indicating an index of the first BWP. The first BWP may be different from an active uplink BWP (e.g., active before receiving the DCI).

A DCI field of frequency domain resource allocation (frequency domain RA 2015) may indicate uplink resource(s) of the scheduled cell. For example, the base station may send (e.g., transmit) configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. A length may be a multiple of K1 resource blocks. For example, the configuration parameters may indicate/comprise a resource allocation type1 granularity for the DCI format 0_2 (e.g., K1). A default value of the K1 may be one ('1'). The base station may send (e.g., transmit) configuration parameters indicating a dynamic change between the resource allocation type 0 and the resource allocation type 1 (e.g., 'dynamicswitch'). The wireless device may determine a field size of the frequency domain RA field 2015 based on the configured resource allocation type and a bandwidth of an active UL BWP of the scheduled cell. The wireless device may further determine the field size of the frequency domain RA field 2015 based on the K1 value, for example, if the resource allocation type 1 may be used/configured. The bitmap may indicate each of the one or more RBGs covering the bandwidth of the active UL BWP, for example if the resource allocation type 0 is configured. A size of the bitmap may be determined based on a number/quantity of the one or more RBGs of the active UL BWP. For example, the wireless device may determine the size of the frequency domain RA 2015 field based on the resource allocation type 1 based on the bandwidth of the active uplink BWP (e.g., ceil (log 2(BW/K1(BW/K1+1)/2) and the resource allocation type1 granularity, where the BW is the bandwidth of the active uplink BWP, and K1 is the resource allocation type1 granularity).

The wireless device may determine a resource allocation indicator value (RIV) table, where an entry of the table may comprise a starting PRB index and a length value. The wireless device may determine the RIV table, for example, based on the resource allocation type1 granularity. A larger size may be determined between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1, for example, if the dynamic change between the resource allocation type 0 and the resource allocation type 1 is used. For example, the frequency domain RA field 2015 may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil(log 2(BW/K1(BW/K1+1)/2)–K bits to indicate the uplink resource(s) based on the resource allocation type 1, for example, if frequency hopping is enabled. Otherwise, the base station/wireless device may use ceil(log 2(BW/K1 (BW/K1+1)/2) bits to indicate the uplink resource(s) based on the resource allocation type 1.

A base station may send (e.g., transmit) one or more messages comprising configuration parameters of a BWP of a cell. The configuration parameters may indicate/comprise a resource allocation type for one or more PUSCHs scheduled by one or more DCIs, based on a first RNTI. The resource allocation type may be a resource allocation type 0, a resource allocation type 1, or a dynamic switching between the resource allocation type 0 and the resource allocation type 1. For example, the first RNTI may be a C-RNTI. The configuration parameters may indicate/comprise a configured grant configuration or a SPS configuration. The configuration parameters may indicate a resource allocation type for the configured grant configuration or the SPS configuration. The resource allocation type may be a resource allocation type 0, a resource allocation type 1, or a dynamic switching between the resource allocation type 0 and the resource allocation type 1.

A DCI field of time domain resource allocation (time domain RA 2016) may indicate time domain resource of one or more slots of the scheduled cell. The base station may send (e.g., transmit) configuration parameters indicating one or more time domain resource allocation lists of a time domain resource allocation table for an uplink BWP of the scheduled cell. The wireless device may determine a bit size of the time domain RA field 2016 based on a number/quantity of the one or more time domain resource allocation lists of the time domain resource allocation table. The base station may indicate a frequency hopping (FH) flag by an FH flag (FH 2017). The FH flag 2017 may be present, for example, if the base station enables a frequency hopping of the scheduled cell or the active UL BWP of the scheduled cell. A DCI field of modulation and coding scheme (MCS) (MCS 2018) may indicate a coding rate and a modulation scheme for the scheduled uplink data. A bit size of the MCS field may be predetermined as a constant (e.g., 5 bits). A new data indicator (NDI) field 2019 may indicate whether the DCI schedules the uplink resource(s) for a new/initial transmission or a retransmission. A bit size of the NDI 2019 may be fixed as a constant value (e.g., 1 bit). A redundancy version (RV) field 2020 may indicate one or more RV values (e.g., a RV value may be 0, 2, 3, or 1) for one or more PUSCHs scheduled over the one or more slots of the scheduled cells. For example, the DCI may schedule a single PUSCH via one slot, and an RV value is indicated. For example, the DCI may schedule two PUSCHs via two slots, and two RV values may be indicated. A number/quantity of PUSCHs scheduled by DCI may be indicated in a time domain resource allocation list of the one or more time domain resource allocation lists. The configuration parameters may indicate/comprise a bit size of the RV field 2020. For example, the bit size may be 0, 1 or 2 bits for a single PUSCH. The wireless device may use RV=0 for any uplink resource scheduled by DCI based on the DCI format 0_2, for example, if the bit size is configured as zero ('0').

A DCI field of hybrid automatic repeat request process number (HARQ process #2021) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may indicate/comprise a bit size for the HARQ process # field 2021. For example, the bit size may be 0, 1, 2, 3, or 4 bits for a single PUSCH. The wireless device may assume that a HARQ process index=0 in case the bit size is configured as zero. The wireless device may assume that a HARQ process index is in a range of [0, 1], for example, if the bit size is configured as one. The wireless device may assume that a HARQ process index is in a range of [0, . . . , 3], for example, if the bit size is configured as two. The wireless device may assume that a HARQ process index is in a range of [0, . . . , 7], for example, if the bit size is configured as three. For the 4 bits of bit size, the wireless device may use a HARQ process in a range of [0, . . . , 15].

The DCI format 02 may have a first downlink assignment index (1st DAI 2022) and/or a second DAI (2nd DAI 2023). The configuration parameters may indicate/comprise a parameter to indicate whether to use DAI for the DCI format 0_2 (e.g., Downlinkassignmentindex-ForDCIFormat0_2). The first DAI 2022 may be used to indicate a first size of bits of first HARQ-ACK codebook group. The second DAI 2023 may be present, for example, if the base station sends (e.g., transmits) configuration parameters indicating a plurality of HARQ-ACK codebook groups. The wireless device may assume the first HARQ-ACK codebook group only, for example, if there is no HARQ-ACK codebook group configured. The second DAI 2023 may indicate a second size of bits of second HARQ-ACK codebook group. The first DAI 2022 may be 1 bit, for example, if a semi-static HARQ-ACK codebook generation mechanism is used. The first DAI 2022 may be 2 bits or 4 bits, for example, if a dynamic HARQ-ACK codebook generation mechanism is used.

A field of transmission power control (TPC 2024) may indicate a power offset value to adjust transmission power of the one or more scheduled PUSCHs. A field of sounding reference signal (SRS) resource indicator (SRI 2025) may indicate an index of one or more configured SRS resources of an SRS resource set. A field of precoding information and number/quantity of layers (PMI 2026) may indicate a precoding and a MIMO layer information for the one or more scheduled PUSCHs. A field of antenna ports 2027 may indicate DMRS pattern(s) for the one or more scheduled PUSCHs. A field of SRS request 2028 may indicate whether to trigger an SRS transmission of an SRS resource or to skip SRS transmission. A field of CSI request 2029 may indicate whether to trigger a CSI feedback based on a CSI-RS configuration or to skip CSI feedback. A field of phase tracking reference signal (PTRS)-demodulation reference signal (DMRS) association (PTRS 2030) may indicate an association between one or more ports of PTRS and one or more ports of DM-RS. The one or more ports may be indicated in the field of antenna ports 2027. A field of beta_offset indicator (beta offset 2031) may indicate a code rate for transmission of uplink control information (UCI) via a PUSCH of the one or more scheduled PUSCHs. A field of DM-RS sequence initialization (DMRS 2032) may be present based on a configuration of transform precoding. A field of UL-SCH indicator (UL-SCH 2033) may indicate whether or not a UCI may be sent (e.g., transmitted) via a PUSCH of the one or more scheduled PUSCHs. A field of open loop power control parameter set indication (open loop power 2034) may indicate a set of power control configuration parameters. The wireless device may be configured with one or more sets of power control configuration parameters. A field of priority indicator (priority 2035) may indicate a priority value of the one or more scheduled PUSCHs. A field of invalid symbol pattern indicator (invalid OS 2036) may indicate one or more unavailable/not-available OFDM symbols to be used for the one or more scheduled PUSCHs.

Note that additional DCI field(s), although not shown in FIG. 20, may be present for the DCI format 0_2. For example, a downlink feedback information (DFI) field may indicate one or more configured grant resources that are present for an unlicensed/shared spectrum cell. For example, the unlicensed/shared spectrum cell may be a scheduled cell. Other DCI fields may be used to indicate a HARQ-ACK bitmap for the one or more configured grant resources and TPC commands for a scheduled PUSCH, for example, if the DCI format 0_2 is used for indicating downlink feedback information for the one or more configured grant resources. Any remaining bits may be reserved and filled with zeros ('0's).

Figure 21:
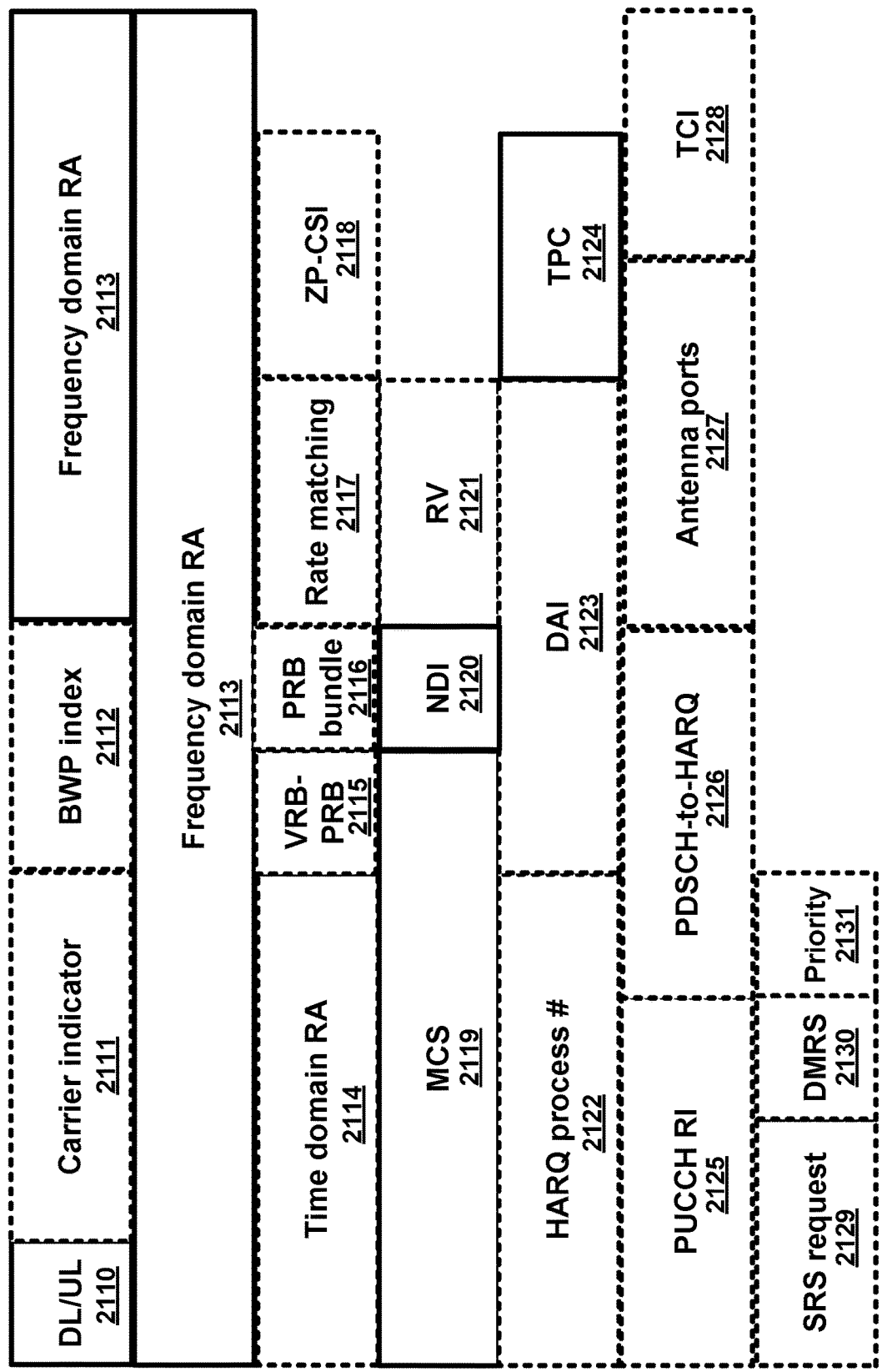
FIG. 21 shows example DCI fields of a DCI format 1_2.

FIG. 21 shows example DCI fields of a DCI format 1_2. The DCI format 1_2 may schedule a downlink resource for a scheduled downlink cell. The DCI format 1_2 may comprise one or more DCI fields such as an identifier for DCI formats (DL/UL 2110), a carrier indicator 2111, a bandwidth part indicator (BWP index 2112), a frequency domain resource assignment (frequency domain RA 2113), a time domain resource assignment (time domain RA 2114), a virtual resource block to physical resource block mapping (VRB-PRB 2115), a physical resource block (PRB) bundling size indicator (PRB bundle 2116), a rate matching indicator (rate matching 2117), a zero power CSI-RS (ZP-CSI 2118), an MCS 2119, an NDI 2120, an RV 2121, a HARQ process number (HARQ process #2122), a downlink assignment index (DAI 2123), a TPC command for a PUCCH (TPC 2124), a PUCCH resource indicator (PUCCH-RI 2125), a PDSCH-to-HARQ_feedback timing indicator (PDSCH-to-HARQ 2126), antenna ports 2127, a transmission configuration indication (TCI 2128), an SRS request 2129, DMRS sequence initialization (DMRS 2130), and a priority indicator (priority 2131). The descriptions for these various fields may be similar to those descriptions pertaining to FIG. 20, unless otherwise noted.

The base station may send (e.g., transmit) one or more messages indicating configuration parameters for the DCI format 1_2. Similar to the DCI format 0_2 of FIG. 20, one or more DCI fields shown in dotted lined boxes may be present or might not be present based on the configuration parameters. The configuration parameters may indicate/comprise one or more DCI bit sizes and/or related configuration parameters/values for the one or more DCI fields.

For example, the VRB-PRB field 2115 may indicate whether a mapping is based on a virtual RB or a physical RB. The PRB bundle 2116 may indicate a size of PRB bundle, for example, if a dynamic PRB bundling is enabled. For example, the rate matching may indicate one or more rate matching resources where the scheduled data may be mapped around based on the rate matching. For example, the ZP-CSI field 2118 may indicate a number/quantity of aperiodic ZP CSI-RS resource sets configured by the base station. For example, the DCI format 12 may also include MCS 2119, NDI 2120, and RV 2121 for a second transport block, based on (e.g., in response to) a max number/quantity of codewords scheduled by DCI being configured as two. The DCI format 1_2 might not include MCS 2119, NDI 2120, and RV 2121 for the second transport block. For example, the DAI field 2123 may indicate a size of bits of HARQ-ACK codebook. The TPC field 2124 may indicate a power offset for the scheduled PUCCH. The wireless device may send (e.g., transmit) the scheduled PUCCH comprising HARQ-ACK bit(s) of the scheduled downlink data by the DCI. The PUCCH-RI 2125 may indicate a PUCCH resource of one or more PUCCH resources configured by the base station. The PDSCH-to-HARQ field 2126 may indicate a timing offset between an end of a scheduled PDSCH by the DCI and a starting of the scheduled PUCCH. The field of antenna ports 2127 may indicate DMRS patterns for the scheduled PDSCH. The TCI field 2128 may indicate a TCI code point of one or more active TCI code points/active TCI states. The base station may send (e.g., transmit) configuration parameters indicating one or more TCI states for the scheduled cell. The base station may activate one or more second TCI states of the one or more TCI states via one or more MAC CEs/DCIs. The wireless device may map an active TCI code point of the one or more active TCI code points to an active TCI of the one or more second TCI states.

A wireless device may receive DCI (e.g., first DCI) indicating an activation, a release, or a retransmission for one or more configured grant configurations or one or more semi-persistent scheduling configurations. The DCI may be cyclic redundancy check (CRC) scrambled with a first radio network temporary identifier (RNTI). The wireless device may receive second DCI indicating one or more resources for scheduling downlink and/or uplink data. The second DCI may be CRC scrambled with a second RNTI. For example, the second RNTI may be a cell RNTI (C-RNTI) and/or MCS-C-RNTI. For example, the first RNTI may be a configured scheduling RNTI (CS-RNTI) for an uplink configured grant configuration. The first RNTI may be semi-persistent scheduling RNTI (SPS-RNTI). The DCI and the second DCI may be based on a DCI format. For example, the DCI and the second DCI may be based on a DCI format 0_2 for uplink (e.g., uplink grant and/or configured grant (CG)). For example, the DCI and the second DCI may be based on a DCI format 1_2 for downlink (e.g., downlink scheduling and/or semi-persistent scheduling (SPS)).

For example, the wireless device may determine whether the DCI indicates the activation, the release, or the retransmission for the one or more CG configurations or for the one or more SPS configurations based on determining one or more values of one or more DCI fields of the DCI format used for the DCI. For example, the wireless device may determine that the DCI indicates the activation based on (e.g., after or in response to) receiving the DCI with a HARQ process # (HARQ process number) field 2122 of the DCI format indicating zero(s) (e.g., '0, . . . , 0') and a RV field of the DCI indicating zero(s). The wireless device may first determine whether an NDI field 2120 of the DCI indicates new data or not. The wireless device may further determine the HARQ process number field 2122 and the RV field 2121 of the DCI, for example, based on (e.g., after or in response to) receiving the DCI with the NDI field 2120 of the new data. The wireless device may determine the DCI may indicate the activation or the release of at least one CG configuration or at least one SPS configuration, for example, based on (e.g., after or in response to) determining that the HARQ process number field 2122 is set to a predetermined value (e.g., zero(s)) and the RV field 2121 is set to a predetermined value (e.g., zero(s)). For example, the wireless device may further check/determine an MCS field 2119 of the DCI and/or a frequency domain RA field 2113 of the DCI to differentiate between the activation and the release. The wireless device may determine that the DCI indicates the release for the at least one CG configuration or the at least one SPS configuration, for example, based on (e.g., after or in response to) the MCS field 2119 being set to a second predetermined value (e.g., one(s), '1, . . . , 1') and the FDRA field being set to a third predetermined value (e.g., zero(s) for resource allocation type 0 or a resource allocation type 2 with mu=1, one(s) for resource allocation type 1 or the resource allocation type 2 with mu=0). The wireless device may determine that the DCI indicates the activation for the at least one CG configuration or the at least one SPS configuration, for example, based on (e.g., after or in response to) the MCS field 2119 being set to different value from the second predetermined value and/or the frequency domain RA field 2113 being set to the third predetermined value.

For example, a DCI format 0_0/0_1/0_2, CRC scrambled with the first RNTI, may be used to indicate an activation, a release, and/or retransmission for a configured grant (CG) based on setting one or more DCI fields with one or more predetermined values. For example, a DCI format 1_0/1_2, CRC scrambled with a third RNTI (e.g., SPS-RNTI), may be used to indicate an activation, a release and/or retransmission for a semi-persistent scheduling (SPS) on setting the one or more DCI fields with one or more predetermined values.

A physical downlink control channel (PDCCH) may comprise one or more CCEs. For example, the PDCCH may comprise one CCE that may correspond to an aggregation level (AL)=1. For example, the PDCCH may comprise two CCEs that may correspond to an AL of two (AL=2). For example, the PDCCH may comprise four CCEs that may correspond to an AL of four (AL=4). For example, the PDCCH may comprise eight CCEs that may correspond to an AL of eight (AL=8). For example, the PDCCH may comprise sixteen CCEs that may correspond to an AL of sixteen (AL=16).

A PDCCH may be carried over one or more control resource sets (coresets). A coreset may comprise N_rb_coreset resource blocks (RBs) in the frequency domain and N_symbol_coreset symbols in the time domain. For example, the N_rb_coreset may be a multiple of 6 RBs (e.g., 6, 12, 18, etc.). For example, N_symbol_coreset may be 1, 2 or 3. A CCE may comprise M (e.g., M=6) resource-element groups (REGs). For example, one REG may comprise one RB during one OFDM symbol. REGs within the coreset may be ordered/numbered in increasing order in a time-first manner, starting with 0 for a first OFDM symbol and a lowest number (e.g., a lowest frequency) RB in the coreset. The wireless device may increase the numbering in the first OFDM symbol by increasing a frequency location or an RB index. The wireless device may move to a next symbol, for example, based on (e.g., after or in response to) all RBs of the first symbol having been indexed. The wireless device may map one or more REG indices for one or more 6 RBs of N_rb_coreset RBs within N_symbol_coreset OFDM symbols of the coreset.

A wireless device may receive configuration parameters from a base station. The configuration parameters may indicate/comprise one or more coresets. One coreset may be associated with one CCE-to-REG mapping. For example, a single coreset may have a single CCE mapping to physical RBs/resources of the single coreset. For example, a CCE-to-REG of a coreset may be interleaved or non-interleaved. For example, a REG bundle may comprise L consecutive REGs (e.g., iL, iL+1, . . . , iL+L−1). For example, L may be a REG bundle size (e.g., L=2 or 6 for N_symbol_coreset=1 and L=N_symbol_coreset or 6, for example, if N_symbol_coreset is 2 or 3). An index of a REG bundle (e.g., i), may be in a range of [0, 1 . . . N_reg_coreset/L−1]. For example, N_reg_coreset may be defined as N_rb_coreset*N_symbol_coreset (e.g., a total number/quantity of REGs in the single coreset). For example, a j-th indexed CCE may comprise one or more REG bundles of {f(6j/L), f(6j/L+1), . . . , f(6j/L+6/L−1)}. For example, f(x) may be an interleaver function. The function f(x) may be x (e.g., j-th CCE may comprise 6j/L, 6j/L+1, . . . , and 6j/L+6/L−1), for example, if the CCE-to-REG mapping is non-interleaved. When the CCE-to-REG mapping may be interleaved, L may be defined as one of {2, 6} when N_symbol_coreset is 1, or L may be defined as one of {N_symbol_coreset, 6} when N_symbol_coreset is 2 or 3. When the CCE-to-REG mapping may be interleaved, the function f(x) may be defined as (rC+c+n_shift) mod (N_reg_coreset/L), wherein x=cR+r, r=0, 1, . . . , R−1, c=0, 1, . . . , C−1, C=N_reg_coreset/(L*R), and R is one of {2, 3, 6}.

For example, the configuration parameters may indicate/comprise a frequencyDomainResources that may define N_rb_coreset. The configuration parameters may indicate/comprise duration that may define N_symbol_coreset. The configuration parameters may indicate/comprise cce-REG-MappingType that may be selected between interleaved or non-interleaved mapping. The configuration parameters may indicate/comprise reg-BundleSize that may define a value for L for the interleaved mapping. For the non-interleaved mapping, L=6 may be predetermined. The configuration parameters may indicate/comprise shiftIndex that may determine n_shift as one of {0, 1, . . . , 274}. The wireless device may determine/assume a same precoding for REGs within a REG bundle, for example, if precoder granularity (e.g., a precoderGranularity indicated/configured by the configuration parameters) is configured as sameAsREG-bundle. The wireless device may determine/assume a same precoding for all REGs within a set of contiguous RBs of a coreset, for example, if the precoderGranularity is configured as allContiguousRBs.

For a first coreset (e.g., CORESET #0) may be defined/configured with L=6, R=2, n_shift=cell ID, and precoderGranularity=sameAsREG-bundle.

A base station may indicate control channel repetition by indicating a number/quantity of repetitions of a coreset or a search space. The base station may send (e.g., transmit) configuration parameters indicating the number/quantity of repetitions for the coreset or the search space. The base station may indicate a single transmission configuration indicator (TCI) state associated/configured with the coreset. The base station may indicate a single coreset associated with the search space, where a second TCI state may be activated for the single coreset of the search space. The number/quantity of repetitions of the control channel repetition may occur based on a TCI state. Control channel repetition based on a single TCI state may reduce reliability of the control channel. For example, if a channel quality of the single TCI is poor, high reliability might not be achieved even with the repetition.

A plurality of TCI states for control channel repetition may be considered. Transmission of a DCI/PDCCH or repeated DCIs/PDCCHs over a plurality of TCI states may improve reliability and enhance quality of service. For example, the plurality of TCI states may be associated with a plurality of carriers. For example, the plurality of TCI states may be associated with a plurality of transmission and reception points (TRPs). For example, the plurality of TCI states may be associated with a plurality of coresets.

A wireless device may receive one or more RRC messages comprising configuration parameters. The configuration parameters may indicate/comprise a first coreset of a first carrier. The configuration parameters may indicate/comprise a first TCI state associated with the first coreset. A base station may activate the first TCI for the first coreset via one or more MAC CEs and/or DCIs. The configuration parameters may indicate/comprise a second coreset of a second carrier. The configuration parameters may indicate/comprise a second TCI state associated with the second coreset. The base station may activate the second TCI for the second coreset via one or more MAC CEs and/or DCIs. The configuration parameters may indicate control channel repetition via the first coreset and the second coreset. The wireless device may monitor one or more DCIs/PDCCHs via the first coreset and the second coreset based on the first TCI state and the second TCI state, respectively. The configuration parameters may indicate a search space associated with the first coreset and the second coreset. The wireless device may receive DCI scheduling a transport block via one or more monitoring occasions based on the search space, based on the first TCI state and the second TCI state. For example, the wireless device may receive first DCI via the first coreset. The first DCI may indicate/comprise a first resource for a transport block and a HARQ process identifier for the transport block. The wireless device may receive second DCI via the second coreset of the second carrier. The second DCI may indicate/comprise the first resource and the HARQ process identifier. For example, the first resource may comprise resource blocks of the first carrier and/or resource blocks of the second carrier. For example, the first resource may comprise resource blocks of a third carrier. In an example, a number/quantity of control channel element (CCEs) of the first coreset may be same as a second number/quantity of CCEs of the second coreset. For example, the first carrier may be same or different from the second carrier. The wireless device may receive the transport block via the first resource. This may enhance a reliability of a control channel/a DCI. A base station may send (e.g., transmit) one or more messages comprising configuration parameters. The configuration parameters may indicate/comprise a plurality of serving cells for a wireless device. The configuration parameters may indicate/comprise parameter(s) to enable control channel repetition. For example, the control channel repetition may be sent (e.g., transmitted) via one or more serving cells. The control channel repetition may schedule one or more resources for a transport block. The transport block may be sent (e.g., transmitted) via one or more PDSCHs or one or more PUSCHs. For example, the control channel repetition may be sent (e.g., transmitted) via a single cell, where the single cell may operate with a single transmission and reception point (TRP) or a plurality of TRPs. The base station may send (e.g., transmit) one or more control channels for control channel repetition via one or more resources in different frequency resources (e.g., repetition in a frequency domain or in a plurality of carriers/cells). The one or more resources may overlap in time domain. The base station may send (e.g., transmit) one or more second control channels for control channel repetition via one or more second resources in different time resources (e.g., repetition in a time domain or in a plurality of slots). The one or more second resources may overlap in frequency domain. For example, the base station may send (e.g., transmit) the repetitions of the control channel repetition via a plurality of coresets of the single cell. For example, the base station may send (e.g., transmit) the control channel repetition via a plurality of search spaces of the single cell.

The control channel repetition may be sent (e.g., transmitted) via a plurality of PDCCHs. For example, a PDCCH may indicate a physical control channel sent (e.g., transmitted) in one search space candidate. A search space candidate may comprise one or more CCEs based on an aggregation level. The plurality of PDCCHs may be sent (e.g., transmitted) via a plurality of coresets of a plurality of cells. For example, a coreset of a cell of the plurality of cells may send (e.g., transmit) a PDCCH of the plurality of the PDCCHs. The plurality of PDCCHs may be sent (e.g., transmitted) via a plurality of coresets of a cell. For example, a coreset of the plurality of coresets may send (e.g., transmit) a PDCCH of the plurality of the PDCCHs. The plurality of PDCCHs may be sent (e.g., transmitted) via a plurality of search spaces, where a PDCCH of the plurality of PDCCHs may be sent (e.g., transmitted) via a search space of the plurality of search spaces. The plurality of PDCCHs may be sent (e.g., transmitted) via a plurality of search space candidates where each PDCCH of the plurality of PDCCHs may be sent (e.g., transmitted) via a search space candidate of the plurality of search space candidates. The plurality of search space candidates may belong to a single search space or a plurality of search spaces. A search space may comprise a set of search space candidates associated with monitoring occasions. Monitoring occasions of the search space may refer to timing occasions during which the wireless device may monitor a search space candidate for receiving DCI/PDCCH.

A PDCCH of the plurality of PDCCHs for the control channel repetition may send (e.g., convey/transmit) DCI based on a DCI format. For example, first DCI of a first PDCCH of the plurality of PDCCHs may be the same as second DCI of a second PDCCH of the plurality of PDCCHs. For example, content of the first DCI/PDCCH may be the same as content of the second DCI/PDCCH. Based on the same content of the plurality of PDCCHs, the wireless device may aggregate the plurality of DCIs/PDCCHs, for example, before decoding DCI/PDCCH. For example, the wireless device may need to determine a reference frequency domain resource, a reference time domain resource, a reference CCE index, and/or a reference REG index, for example, if the control channel repetition is sent (e.g., transmitted) via equal content DCIs/PDCCHs. For example, the wireless device may determine an aggregated DCI/PDCCH by aggregating the plurality of DCIs/PDCCHs. The wireless device may decode the aggregated DCI/PDCCH. For example, the reference frequency domain resource of the plurality of DCIs/PDCCHs may be determined based on an earliest PDCCH (or a latest PDCCH) among the plurality of PDCCHs. The first PDCCH may determine the reference frequency domain resource, for example, if a first PDCCH of the plurality of PDCCHs is sent (e.g., transmitted) in a slot n and a second PDCCH of the plurality of PDCCHs is sent (e.g., transmitted) in a slot n+1. Similarly, the reference time domain resource and/or the reference CCE index and/or the reference REG may be determined based on the earliest PDCCH or the latest PDCCH. The reference frequency domain resource of the plurality of DCIs/PDCCHs may be determined based on a CORESET index of one or more CORESETs where the plurality of DCIs/PDCCHs are sent (e.g., transmitted). For example, a smallest (or a largest) index of the one or more CORESETs may be used for the determining.

The reference frequency domain resource of the plurality of DCIs/PDCCHs may be determined based on a search space index of one or more search spaces where the plurality of DCIs/PDCCHs are sent (e.g., transmitted). For example, a smallest (or a largest) index of the one or more search spaces may be used for the determining. The reference frequency domain resource of the plurality of DCIs/PDCCHs may be determined based on a cell index of one or more cells where the plurality of DCIs/PDCCHs are sent (e.g., transmitted). For example, a smallest (or a largest) index of the one or more cells may be used for the determining. Similarly, the reference time domain resource and/or the reference CCE index and/or the reference REG may be determined based on the CORESET index, the search space index and/or the cell index. Combinations of transmission time, a CORESET index, a search space, and/or a cell index may be used. For example, the reference frequency domain resource may be determined based on the transmission time of DCI/PDCCH. The wireless device may use the CORESET index, the search space index, and/or the cell index to further identify a reference DCI/PDCCH, for example, if there are multiple DCIs/PDCCHs sent (e.g., transmitted) at the same time. The wireless device may determine the reference DCI/PDCCH for determining the reference frequency domain resource, the reference time domain resource, the reference CCE index, and/or the reference REG index.

The base station may configure a maximum repetition number/quantity K for the control channel repetition. The base station may send (e.g., transmit) a number/quantity of repetitions M that is smaller than the K. The wireless device may determine the reference DCI/PDCCH, for example, based on a candidate DCI/PDCCH in the K-th repetition regardless whether the K-th repetition has been actually sent (e.g., transmitted) or not, and/or, for example, based on the M being smaller than K. The wireless device may determine the reference DCI/PDCCH based on first DCI/PDCCH, which may be a first repetition. The wireless device may determine the reference DCI/PDCCH based on a last DCI/PDCCH which has been actually sent (e.g., transmitted) (e.g., M-th repetition). This type of control channel repetition (e.g., same content is repeated over a plurality of DCIs/PDCCHs) may be called/referred to as a first control channel repetition mode (e.g., mode 1, repetition mode 1, first repetition mode). A base station may configure a list of time domain resource allocation entries. A time domain resource allocation entry may comprise a number/quantity of repetitions of a control channel, a scheduling offset between the control channel and a PDSCH, and/or a number/quantity of PDSCH repetitions. For example, the number/quantity of repetitions of the control channel may represent the number/quantity of repetitions K. Based on the number/quantity of repetitions, the wireless device may determine a reference DCI/PDCCH timing based on the K-th DCI/PDCCH repetition. The repeated DCIs/PDCCHs may indicate an entry of the list of time domain resource allocation entries.

First DCI/PDCCH of the plurality of DCIs/PDCCHs may be different from second DCI/PDCCH of the plurality of DCIs/PDCCHs. For example, a wireless device might not aggregate the first DCI/PDCCH and the second DCI as contents of the first DCI/PDCCH may be different. The wireless device may attempt to decode the first DCI/PDCCH separately from the second DCI/PDCCH. For example, the wireless device may complete the decoding of the control channel repetition, for example, if the wireless device has received at least one DCI/PDCCH of the plurality of DCIs/PDCCHs. The wireless device may be able to receive or send (e.g., transmit) a TB scheduled by the plurality of DCIs/PDCCHs, for example, if the wireless device has received at least one DCI/PDCCH of the plurality of DCIs/PDCCHs. This type of control channel repetition (e.g., potentially different contents are sent (e.g., transmitted) via a plurality of DCIs/PDCCHs, and DCI/PDCCH of the plurality of DCIs/PDCCHs may schedule one or more resources of a transport block) may be called/referred to as a second control channel repetition mode (e.g., mode 2, repetition mode 2, second repetition mode). For example, a reference DCI/PDCCH of the plurality of DCIs/PDCCHs based on the second control channel repetition mode may be each DCI/PDCCH received by the wireless device.

Figure 22:
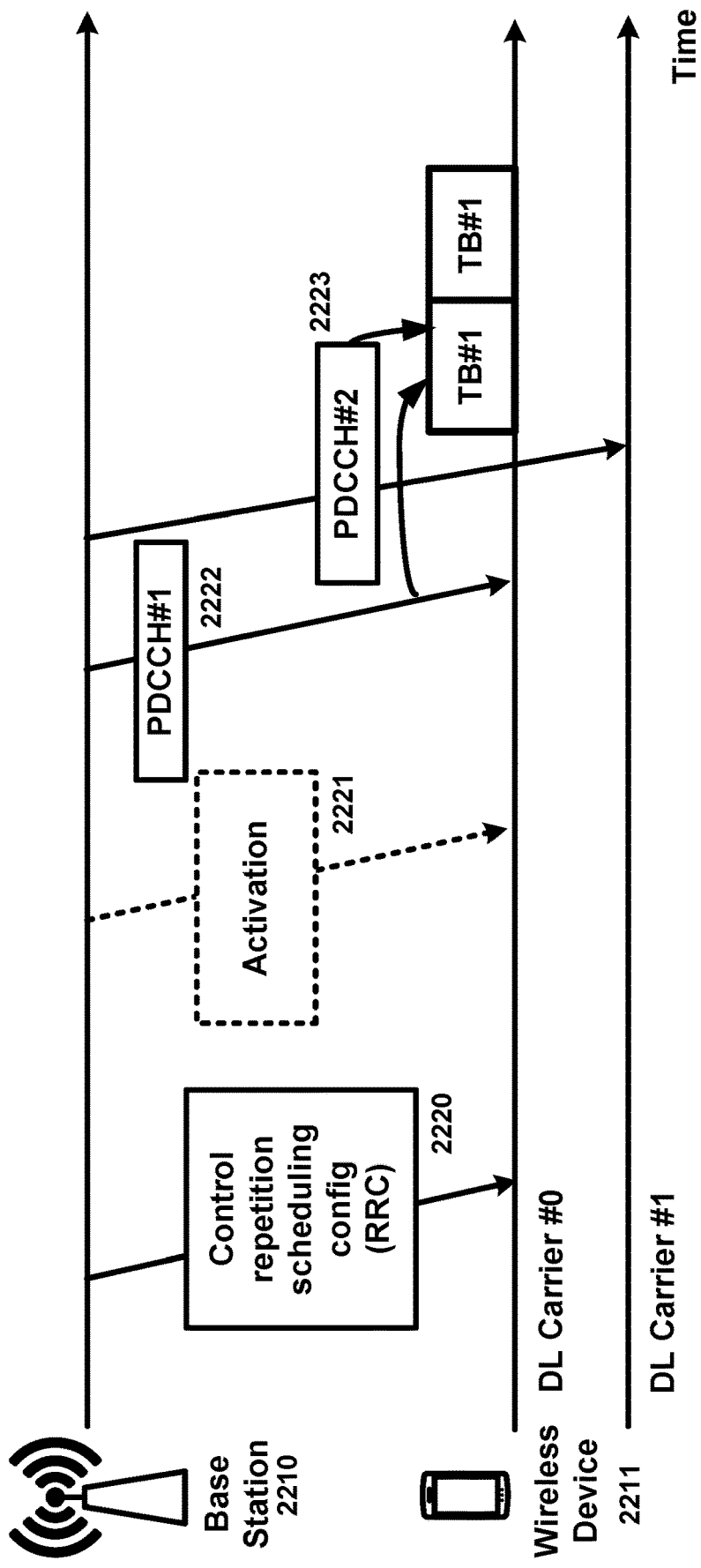
FIG. 22 an example of physical downlink control channel (PDCCH) repetition via a plurality of serving cells/carriers.

FIG. 22 shows an example of PDCCH repetition via a plurality of serving cells/carriers. The base station 2210 may send (e.g., transmit) one or more RRC messages 2220 comprising configuration parameters. The configuration parameters may indicate/comprise parameters for control channel repetition. The parameters may comprise one or more scheduling carriers/cells for sending (e.g., transmitting) one or more PDCCHs/DCIs of repeated control channels. The parameters may comprise one or more coresets of the one or more scheduling cells/carriers. For example, the parameters may comprise a coreset of a first carrier (DL Carrier #0) of the one or more scheduling cells as a main coreset or a primary coreset. The parameters may comprise one or more second coresets of one or more second carriers of the one or more scheduling cells as secondary coresets. FIG. 22 illustrates a second coreset of a second carrier (DL Carrier #1). The parameters may indicate a coreset index of the coreset of the first carrier and/or a carrier/cell index of the first carrier for a coreset of the one or more second coresets. A wireless device 2211 may determine, based on the coreset index and/or the carrier/cell index, that the coreset of the one or more second coresets is configured for the repeated control channel corresponding to the coreset of the first carrier. The base station 2210 may optionally send (e.g., transmit) an activation 2221 of the control channel repetition via one or more MAC CEs and/or one or more DCIs. Activation 2221 may or may not be present in a control channel repetition procedure. The base station 2210 may send (e.g., transmit) a first PDCCH 2222, scheduling repetition of a TB via the first carrier, via the first coreset of the first carrier. The base station 2210 may send (e.g., transmit) a second PDCCH 2223, scheduling repetition of the TB via the first carrier, via the second coreset of the second carrier. The wireless device 2211 may aggregate the first PDCCH and the second PDCCH based on the first control channel repetition mode or may attempt to receive/decode each PDCCH independently based on the second control channel repetition mode. Based on the first PDCCH and/or the second PDCCH, the wireless device 2211 may receive the repetition of the TB.

A base station 2210 may send (e.g., transmit) one or more RRC messages 2220 comprising configuration parameters. The configuration parameters may indicate/comprise parameters for control channel repetitions. The parameters may comprise a first coreset of a first carrier. For example, the first coreset may be determined as a primary or main coreset for a plurality of coresets configured/used for the control channel repetition. The parameters may indicate one or more second coresets of one or more second cells/carriers. For example, the parameters may indicate the one or more second carriers/cells configured/used for the control channel repetition. The wireless device 2211 may determine one or more parameters of a second coreset of the one or more second coresets based on one or more parameters of the primary or the main coreset of the one or more coresets. For example, the one or more parameters may comprise a frequency domain resource. The base station 2210 need not explicitly configure a frequency domain resource for the second coreset. The wireless device 2211 may determine the frequency domain resource of the second coreset based on the frequency domain resource of the primary coreset. For example, the frequency domain resource of the second coreset may be the same as the frequency domain resource of the primary coreset (e.g., set of RBs, of an active BWP of the second carrier, with same indexes to those of RBs, of an active BWP of the first carrier, indicated by the frequency domain resource of the primary coreset). The one or more parameters may comprise a cce-REG-mappingType. For example, the primary coreset and the second coreset may use a same type of CCE to REG mapping. The one or more parameters may comprise a precoder granularity. The one or more parameters may comprise a tci-PresentInDCI, DM-RS scrambling identity, RB offset, tci-PresenceInDCI-Format1_2, and/or a coreset pool index.

Configuration parameters of the second coreset of the one or more second coresets may indicate/comprise a control resource set index (e.g., a controlResourceSetId), a coreset index of the primary coreset, and/or a cell index of the first cell of the primary coreset. The wireless device 2211 may determine the coreset index of the primary coreset based on the carrier/cell index of the first carrier/cell without receiving a parameter from the configuration parameters of the second coreset. For example, the wireless device 2211 may determine an active BWP of the first carrier/cell. The wireless device 2211 may determine one or more coresets of the active BWP of the first carrier/cell based on one or more search spaces associated with the one or more coresets. For example, the wireless device 2211 may determine a coreset, where the wireless device 2211 may monitor one or more DCI formats (e.g., a DCI format 1_1, a DCI format 0_1, a DCI format 12, and/or a DCI format 0_2) via a search space associated with the coreset. The one or more coresets may comprise the coreset. The wireless device 2211 may determine the one or more coresets from coresets of the active BWP of the first carrier/cell where the wireless device 2211 may monitor the one or more DCI formats via the one or more search spaces associated with the one or more coresets.

The configuration parameters of the second coreset may indicate/comprise an indication of enabling or disabling the control channel repetition. For example, the configuration parameters may indicate PDCCH repetition via the second coreset. The wireless device 2211 may inherit one or more parameters from the primary coreset wherein the base station 2210 might not configure the one or more parameters for the second coreset. The wireless device 2211 may use a value from the parameter of the primary coreset, for example, based on (e.g., in response to) the absence of a parameter for the second coreset. The wireless device 2211 may use a value for the parameter of the second coreset, for example, if the base station 2210 configures a parameter for the second coreset with the value. The configuration parameters of the second coreset may comprise a list of TCI states and/or a TCI state. The base station 2210 may activate a first TCI state for the primary/first coreset and may activate a second TCI state for the second coreset. The configuration parameters may indicate whether all (e.g., both) repetitions of DCI will include a TCI field.

The base station 2210 may send (e.g., transmit) one or more RRC messages comprising configuration parameters of the first carrier/cell. The configuration parameters of the first carrier/cell may comprise one or more search spaces. As the first carrier/cell is configured with the primary coreset of the control channel repetition, a search space of the first carrier/cell may be associated with a plurality of coresets. For example, the plurality of coresets may comprise the primary coreset and the one or more second coresets. The search space may be configured with a set of {a coreset index, a carrier/cell index} for the plurality of coresets. Control channel repetition may occur across a plurality of carriers. Based on carrier/frequency diversity (e.g., via different carrier/frequency) and/or a beam diversity (e.g., via different TCI states), a reliability of a control channel may be enhanced.

A carrier/cell may comprise one or more downlink carriers. The carrier/cell may optionally comprise one or more uplink carriers.

A primary coreset may be configured with one or more second coresets. For example, the one or more second coresets may be configured in the same carrier/cell as the primary coreset. The one or more second coresets may be configured in different carrier(s)/cell(s) from the primary coreset. One or more coreset indices of the one or more second coresets may be configured as a parameter of the primary coreset. For example, a list of {a coreset index, a cell/carrier index} may be configured as a configuration parameter of the primary coreset. Parameters of the primary coreset may comprise the list of {the coreset index, the cell/carrier index}, wherein each {the coreset index, the cell/carrier index} may correspond to each coreset of the one or more second coresets. For example, the coreset index may represent an index of the each coreset. For example, the cell/carrier index may represent a cell/carrier identifier where the each coreset is configured. The wireless device 2211 may be configured with a search space associated with the primary coreset. The wireless device 2211 may use configuration parameters of the search space for the one or more second coresets. For example, the wireless device 2211 may monitor search space candidates determined based on the configuration parameters of the search space via the primary coreset and the one or more second coresets. For example, parameters of the search space such as monitoring periodicity and offset, one or more DCI formats to monitor may be used to determine a set of candidates over the primary coreset and the one or more second coresets. The wireless device 2211 may monitor M candidates of the search space via the primary coreset and may monitor additional M candidates of the search space via the second coreset of the one or more second coresets, for example, if the primary coreset and a second coreset are configured for the control channel repetition and a search space with M candidates are configured to be associated with the primary coreset. The additional M candidates may be used to send (e.g., transmit) a repeated DCI/PDCCH.

A base station 2210 may configure a plurality of carriers/cells for supporting control channel repetition for a first carrier/cell. The base station 2210 may configure a plurality of cross carrier scheduling configurations for the first carrier/cell for the plurality of carriers/cells, where each cross carrier scheduling configuration is used for each carrier/cell of the plurality of carriers/cells. A cross carrier scheduling configuration for the first carrier/cell may comprise a plurality of scheduling carrier/cell identities corresponding to the plurality of the carriers/cells. A wireless device 2211 may monitor first DCI/PDCCH, scheduling a TB, via the first carrier/cell. The wireless device 2211 may monitor one or more second DCIs/PDCCHs, scheduling the TB, via the plurality of carriers/cells.

A base station 2210 may send (e.g., transmit) one or more RRC messages indicating/comprising configuration parameters indicating, for control channel repetition, a first carrier/cell and a second carrier/cell. The base station 2210 may send (e.g., transmit) first DCI/PDCCH via the first carrier/cell and second DCI/PDCCH via the second carrier/cell. The configuration parameters may indicate/comprise one or more BWPs of the first carrier/cell. The configuration parameters may comprise one or more coresets of the first carrier/cell. The configuration parameters may indicate a self-carrier scheduling for the first carrier/cell. The configuration parameters may indicate/comprise a carrier/cell index of the second carrier/cell as a repetition carrier/cell for the first carrier/cell. The wireless device 2211 may monitor the first DCI/PDCCH via the first carrier/cell and the second DCI/PDCCH via the second carrier/cell. For example, the second DCI/PDCCH may be a repetition of the first DCI/PDCCH based on the first control channel repetition mode or based on the second control channel repetition mode.

The configuration parameters may indicate/comprise first cross carrier scheduling configuration for the first carrier/cell. The first cross carrier scheduling configuration may comprise a scheduling carrier/cell index with a value indicating the second carrier/cell. The first cross carrier scheduling configuration may comprise a cif-InSchedulingCell with a value indicating an index of carrier field indicator (CIF) for the first carrier/cell scheduled by the second carrier/cell. For example, the configuration parameters may indicate/comprise second cross carrier scheduling configuration for the second carrier/cell. For example, the second carrier/cell is configured as the scheduling carrier/cell for the first carrier/cell. For example, the second cross carrier configuration may comprise a cif-Presence (e.g., indication of cross-carrier scheduling by the second carrier/cell) with a value indicating a carrier indicator field (CIF) for the first carrier/cell. The configuration parameters may indicate/comprise a parameter indicating control channel repetition. Based on the parameter, the wireless device 2211 may determine one or more first coresets of an active BWP of the first carrier/cell as one or more primary coresets of the control channel repetition. Based on the parameter and the first cross carrier scheduling configuration, the wireless device 2211 may determine one or more second coresets of an active BWP of the second carrier/cell as one or more secondary coresets of the control channel repetition. The wireless device 2211 may receive first DCI/PDCCH, scheduling a resource for a TB, via the one or more primary coresets of the first carrier/cell. The wireless device 2211 may receive second DCI/PDCCH, scheduling the resource for the TB, via the one or more secondary coresets of the second carrier/cell.

The wireless device 2211 may be configured with the control channel repetition for the first carrier/cell, where the second carrier/cell may be indicated as the scheduling carrier/cell via the cross-carrier scheduling. For the control channel repetition, the wireless device 2211 may monitor first DCI/PDCCH, scheduling a TB, via one or more first search spaces of one or more first coresets of an active BWP of the first carrier/cell. The wireless device 2211 may monitor second DCI/PDCCH, scheduling the TB, via one or more second search spaces of one or more second coresets of an active BWP of the second carrier/cell. A first monitoring occasion for the first DCI/PDCCH may or may not overlap, in time domain, with a second monitoring occasion for the second DCI/PDCCH. For example, the first monitoring occasion and the second monitoring occasion may occur within a time duration (e.g., a slot, a few slots, in a subframe, in a frame). The wireless device 2211 may receive the first DCI/PDCCH and the second DCI/PDCCH, receive one of the first DCI/PDCCH and the second DCI/PDCCH, or receive neither the first DCI/PDCCH nor the second DCI/PDCCH. Based on the first control channel repetition mode, the wireless device 2211 may determine an aggregate candidate by aggregating a first search space candidate for the first DCI/PDCCH and a second search space candidate for the second DCI/PDCCH. The wireless device 2211 may attempt to decode the aggregated candidate. Additionally, the wireless device 2211 may attempt to decode the first search space candidate and/or the second search space candidate. Based on the second control channel repetition mode, the wireless device 2211 may attempt decoding each search space candidate or each DCI/PDCCH independently. The wireless device 2211 may receive the scheduled TB or send (e.g., transmit) the scheduled TB based on successfully decoding at least one of the first DCI/PDCCH and the second DCI/PDCCH. Control channel repetition may be achieved across a plurality of carriers/cells with low configuration (e.g., RRC/MAC CE) overhead. By configuring/indicating enabling of control channel repetition with a list of carriers/cells of the control channel repetition, a wireless device 2211 may determine one or more coresets used for the control channel repetition.

The wireless device 2211 may determine a first search space of the first carrier/cell for the first DCI/PDCCH based on the active BWP of the first carrier/cell. For example, the first search space may be configured with a non-fallback DCI format or be configured with a DCI format 1_1, a DCI format 12, a DCI format 01, and/or a DCI format 0_2. The wireless device 2211 may determine a second search space of the second carrier/cell based on a rule. For example, a first search space index of the first search space may be the same as a second search space index of the second search space. For example, a first coreset index of a first coreset associated with the first search space may be the same as a second coreset index of a second coreset associated with the second search space. For example, the second search space may be configured with the non-fallback DCI formats or be configured with the DCI format 1_1, the DCI format 1_2, the DCI format 0_1, and/or the DCI format 0_2. For example, the first search space and the second search space are configured with same one or more DCI formats. For example, the configuration parameters may indicate/comprise association between each of one or more first search spaces of the first carrier/cell and each of one or more second search spaces of the second carrier/cell.

The wireless device 2211 might not monitor second DCI/PDCCH, scheduling the TB, via a second carrier/cell of the plurality of carriers/cells, for example, if the wireless device 2211 does not identify a second search space based on the rule corresponding to the first search space of the first carrier/cell based on an active BWP of the first carrier/cell. The wireless device 2211 may skip monitoring the second DCI/PDCCH via the second carrier/cell, for example, based on (e.g., after or in response to) the rule not being satisfied for any search space of an active BWP of the second carrier/cell. Control channel repetition may be achieved across a plurality of carriers/cells with low configuration (e.g., RRC/MAC CE) overhead. By configuring/indicating enabling of control channel repetition with a list of carriers/cells of the control channel repetition, a wireless device 2211 may determine one or more search spaces of the plurality of carriers/cells used for the control channel repetition.

A base station 2210 may send (e.g., transmit) one or more RRC messages 2220 comprising configuration parameters indicating/comprising one or more supplemental downlink carriers corresponding to a downlink carrier. For example, the configuration parameters may indicate/comprise a list of downlink frequencies for the downlink carrier (e.g., in a ServingCellConfig of the downlink carrier or BWP-Downlink of the downlink carrier). The list of downlink frequencies may correspond to the one or more supplemental downlink carriers. For example, the configuration parameter may indicate/comprise a list of cell indices of the one or more supplemental downlink carriers. The base station 2210 may configure a cell comprising the downlink carrier and the one or more supplemental downlink carriers. The base station 2210 may assign a single cell index for the cell comprising the downlink carrier and the one or more supplemental downlink carriers. Based on a self-carrier scheduling, the base station 2210 may send (e.g., transmit) DCI via the downlink carrier scheduling a resource of a second downlink carrier of the one or more supplemental downlink carriers. Based on the self-carrier scheduling, the base station 2210 may send (e.g., transmit) second DCI via the second carrier scheduling a second resource of the downlink carrier.

To support DCI, via the downlink carrier or the one or more supplemental downlink carriers, scheduling a downlink carrier of the cell, the base station 2210 may configure a bitmap or an index to indicate a list of scheduled downlink carriers or a scheduled downlink carrier in a DCI format used for scheduling downlink data. For example, a DCI format 1_1 or a DCI format 1_2 may comprise a bitmap, where a size of the bitmap is determined based on a number/quantity of the downlink carrier and the one or more supplemental downlink carriers (e.g., if there is one supplemental downlink carrier, then 2 bits for the size of the bitmap; if there are two supplemental downlink carriers, then 3 bits for the size of the bitmap; etc.). Each bit of the bitmap may correspond to a first downlink carrier of the downlink carrier and the one or more supplemental downlink carriers of the cell. The wireless device 2211 may consider that the DCI may schedule a resource for the first downlink carrier, for example, if the bit is indicated or set to one (1). The DCI may schedule a plurality of resources for one or more downlink carriers of the cell based on the bitmap indication. The wireless device 2211 may consider that a TB may be repeatedly sent (e.g., transmitted) via the one or more downlink carriers based on the bitmap. The DCI may schedule resource(s) for the scheduled downlink carrier for a TB, for example, if the DCI comprises the index to the scheduled downlink carrier.

Figure 23:
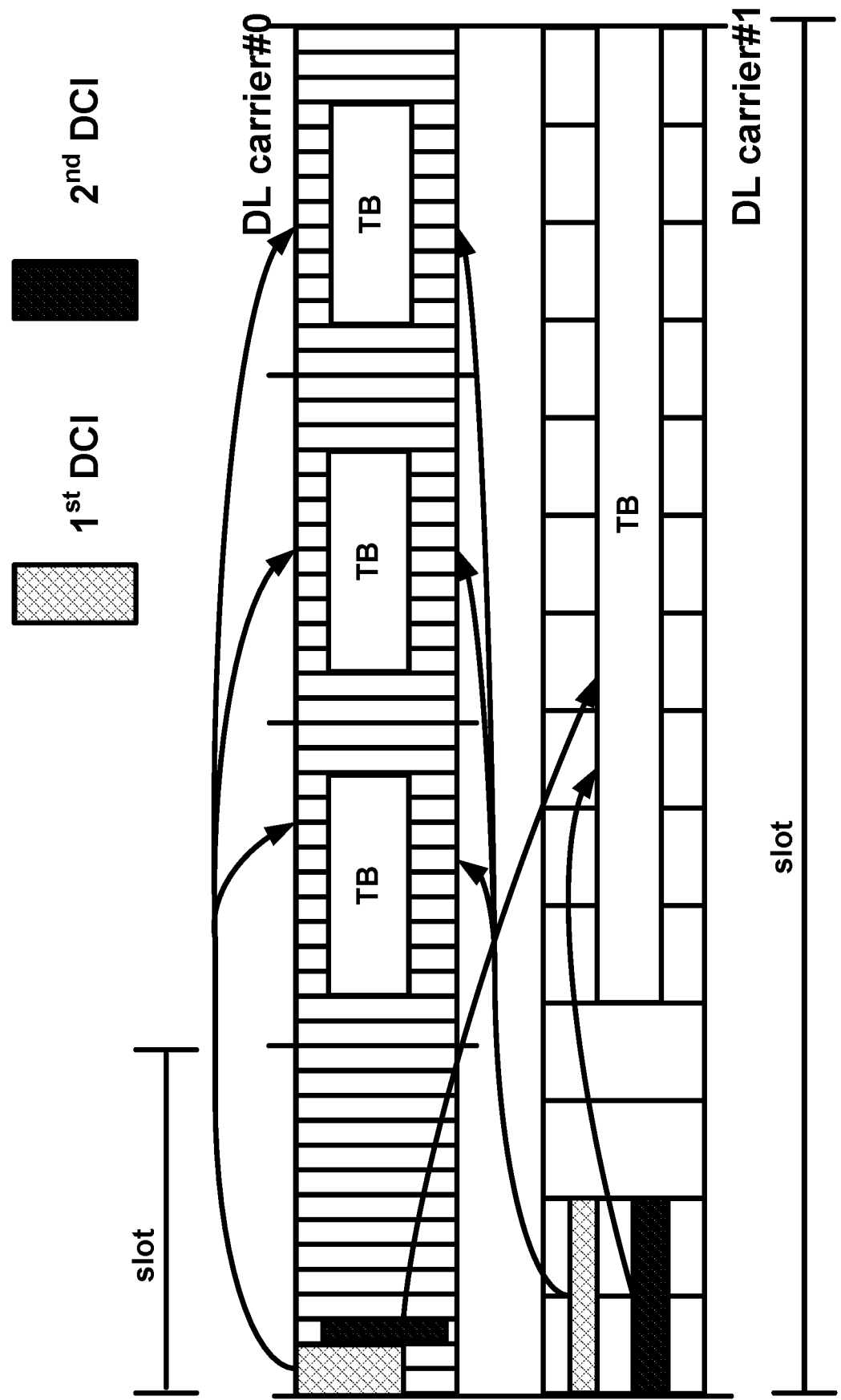
FIG. 23 shows an example of DCI comprising an index of a scheduled downlink carrier.

FIG. 23 shows an example of DCI comprising an index of a scheduled downlink carrier. A wireless device may be configured with a first downlink carrier (DL carrier #0) and a second downlink carrier (DL carrier #1) for a cell. The base station may send (e.g., transmit) DCI, scheduling resource(s) for the first downlink carrier or the second downlink carrier, via the first downlink carrier or the second downlink carrier. For example, the DCI may comprise a scheduled carrier index (e.g., 1 bit based on 0 for the first downlink carrier and 1 for the second downlink carrier). For example, first DCI of the first downlink carrier may schedule resources for three repeated PDSCH carrying a transport block. For example, the base station may send (e.g., transmit) configuration parameters. The configuration parameters may indicate/comprise a first set of time domain resource allocation entries for the first downlink carrier. The configuration parameters may indicate/comprise a second set of time domain resource allocation entries for the second downlink carrier. The wireless device may use the first set of time domain resource allocation entries (e.g., a first time domain resource allocation (TDRA) table), for example, based on (e.g., after or in response to) receiving the first DCI via the first downlink carrier. The first DCI may indicate '0' in the scheduled carrier index to schedule resource(s) for the first downlink carrier. In the example, a same time domain resource over three slots are allocated for the transport block via the first downlink carrier by the first DCI of the first downlink carrier.

The wireless device may receive second DCI via the first downlink carrier that may schedule resource(s) for the second downlink carrier. For example, the second DCI may schedule a resource for the transport block via the second downlink carrier. In the example, the transport block (TB) may be repeated over the first downlink carrier and the second downlink carrier. For example, the TB may be repeated three time via the first downlink carrier and one time via the second downlink carrier. The wireless device may use the second set of time domain resource allocation entries (e.g., a second TDRA table), for example, based on (e.g., after or in response to) receiving the second DCI via the first downlink carrier. The second DCI may comprise a scheduled carrier index indicating the second downlink carrier (e.g., 1). Similarly, the base station may send (e.g., transmit) first DCI via the second downlink carrier scheduling resources for the first downlink carrier for the TB. The base station may send (e.g., transmit) second DCI via the second downlink carrier scheduling resource(s) for the second downlink carrier for the TB. The wireless device may receive the first DCI of the first downlink carrier and the second downlink carrier or may receive either one. The wireless device may receive the scheduled TB via the repeated resources of three slots of the first downlink carrier, for example, based on (e.g., after or in response to) the wireless device receiving the first DCI of the first downlink carrier and the second downlink carrier or receives either one. Similarly, for the second DCI, the wireless device may receive from both carriers or either carrier. Based on the receiving, the wireless device may receive the TB via the resource of the second downlink carrier. The first DCI via the first downlink carrier and the first DCI via the second downlink carrier may be sent (e.g., transmitted) based on the first control channel repetition mode or the second control channel repetition mode.

A starting CCE index of the first DCI/PDCCH via the first downlink carrier may be the same as a starting CCE index of the first DCI/PDCCH via the second downlink carrier, for example, if the first control channel repetition mode is used. The wireless device may determine a first search space for the first DCI/PDCCH via the first downlink carrier. The wireless device may determine a second search space for the first DCI/PDCCH via the second downlink carrier based on a rule. For example, the rule may be determined based on a search space index of the first and second search spaces (e.g., an equal search space index), determined based on a coreset index associated with the first and second search spaces (e.g., an equal coreset index), determined based on an association configured by the base station, or determined based on a DCI format (e.g., a same DCI format is configured for the first search space and the second search space).

Figure 24:
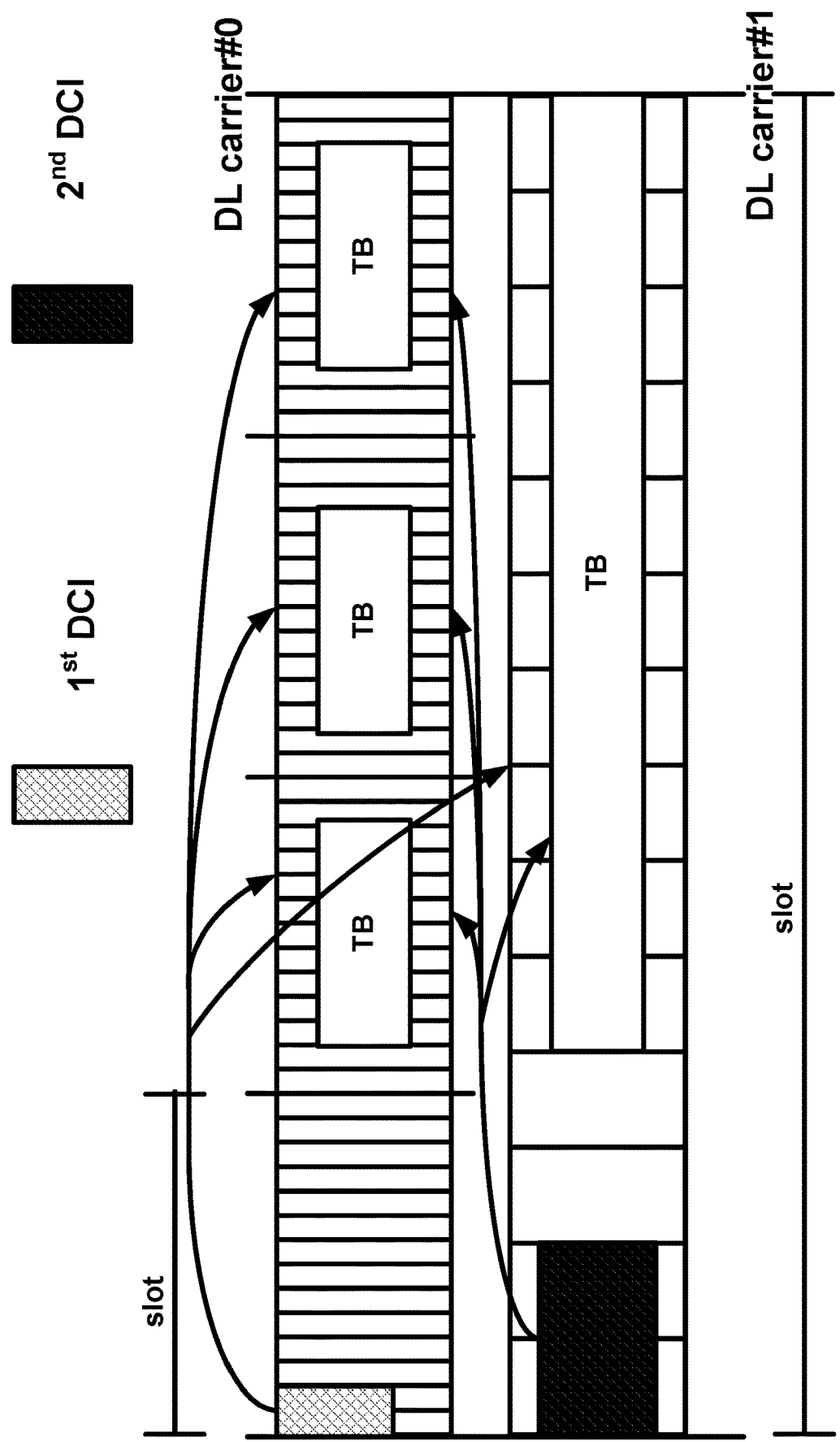
FIG. 24 shows an example of control channel repetition based on a multi-carrier DCI mechanism.

FIG. 24 shows an example of control channel repetition based on a multi-carrier DCI mechanism. DCI may comprise a bitmap or resource allocations for a plurality of downlink carriers. For example, the DCI may schedule a plurality of resources via the plurality of downlink carriers for a transport block. The DCI may be referred to as a multi-carrier DCI. The base station may send (e.g., transmit) one or more RRC messages comprising configuration parameters. The configuration parameters may indicate/comprise a first downlink carrier (DL carrier #0) and a second downlink carrier (DL carrier #1). The first downlink carrier and the second downlink carrier may be associated with a cell. The first downlink carrier and the second downlink carrier may be associated with a plurality of cells. Similar to FIG. 23, the configuration parameters may indicate/comprise a list of first time domain resource allocation entries (e.g., a first TDRA table) for the first downlink carrier and/or a list of second time domain resource allocation entries (e.g., a second TDRA table). The base station may send (e.g., transmit) first DCI via the first downlink carrier. The first DCI may indicate a first resource allocation, of the list of first time domain resource allocation entries, for the first downlink carrier and a second resource allocation, of the list of second time domain resource allocation entries, for the second downlink carrier. For example, the first DCI may comprise a first field for the first resource allocation and a second field for the second resource allocation. For example, the first DCI may comprise a single field for indicating the first resource allocation and the second resource allocation. The base station may repeat transmission of a TB three times via the first downlink carrier. The base station may send (e.g., transmit) an instance of the TB via the second downlink carrier. The base station may send (e.g., transmit) second DCI via the second downlink carrier indicating the first resource allocation of the TB via the first downlink carrier and the second resource allocation of the TB via the second downlink carrier. The first DCI and the second DCI may be sent (e.g., transmitted) based on the first control channel repetition mode or the second control channel repetition mode.

Control channel repetition via a plurality of carriers associated with a single cell may enable flexible scheduling with reduced wireless device complexity. A wireless device may support the control channel repetition across different carriers within the single cell. Flexible scheduling of data may be achieved via one or more of the plurality of carriers.

One or more DCI fields of first DCI scheduled via a first carrier may indicate values for a second carrier. The first DCI may schedule resource(s) of a TB for the second carrier (e.g., the TB scheduled via the resources of the second cell). For example, a frequency domain resource allocation field of the first DCI may indicate one or more resource blocks of an active BWP of the second carrier. A time domain resource allocation field of the first DCI may indicate a TDRA entry from a TDRA table configured for the second carrier. A TCI state field may indicate a TCI state from one or more TCI states configured for the second carrier. One or more second DCI fields may indicate one or more values shared across a plurality of carriers associated with a cell. For example, a HARQ process index field of the first DCI may indicate a HARQ process ID. The plurality of carriers associated with the cell (e.g., the first downlink carrier and the second downlink carrier) may share a set of HARQ processes. The HARQ process index field may indicate a HARQ process from the set of HARQ processes of the cell.

A value of a DCI field of the first DCI may be determined based on a numerology of the second carrier (e.g., a numerology of a scheduled carrier). For example, the first DCI may comprise resource(s) of a TB for the second carrier. For example, the DCI field may be a HARQ resource timing offset (e.g., PDSCH-to-HARQ timing offset). The first DCI may be a time domain resource allocation.

The first DCI may be repeated over a plurality of carriers/cells based on the first control channel repetition mode. The wireless device may determine a reference DCI from one or more DCIs repeated over the plurality of carriers/cells based on one or more rules to determine a reference frequency domain resource and/or a reference time domain resource and/or a reference CCE index and/or a reference REG index. Based on the reference DCI, the wireless device may determine resources and/or values indicated by one or more DCI fields of the first DCI.

A wireless device may monitor/receive first DCI/PDCCH, scheduling resource(s) of one or more downlink carriers for a TB, via a first downlink carrier. For example, the one or more downlink carriers may comprise or may not comprise the first downlink carrier. The wireless device may monitor/receive second DCI/PDCCH, scheduling the resource(s) of the one or more downlink carriers for the TB, via a second downlink carrier. The one or more downlink carriers may comprise or may not comprise the second downlink carrier. The wireless device may aggregate the first DCI/PDCCH and the second DCI/PDCCH based on the first control channel repetition mode (e.g., the first control channel repetition mode is enabled/configured/implemented/supported). One or more DCI fields of the first DCI/PDCCH and the second DCI/PDCCH may be determined based on a primary downlink carrier of the one or more downlink carriers. For example, the wireless device may determine a downlink carrier among the one or more downlink carriers as the primary downlink carrier, wherein a carrier index of the downlink carrier is a lowest/smallest (or a largest/highest). For example, the wireless device may determine a downlink carrier as the primary downlink carrier, wherein the downlink carrier is associated with the cell as a normal downlink carrier. The base station may configure one or more supplemental downlink carriers associated with the cell. The wireless device may determine a downlink carrier as the primary downlink carrier, wherein the downlink carrier is mapped to a value '0' (or a lowest value) of a DCI field indicating a scheduled carrier. The wireless device may determine a downlink carrier as the primary downlink carrier, wherein the downlink carrier may have a smallest (or largest) subcarrier spacing among the one or more downlink carriers. The wireless device may determine a downlink carrier based on a combination of one or more rules mentioned in above. Based on the determined downlink carrier as the primary downlink carrier, the wireless device may determine values of the one or more DCI fields. For example, the wireless device may determine a HARQ time resource based on an offset between a last PDSCH of one or more PDSCHs via the primary downlink carrier, scheduled by the first DCI/PDCCH and/or the second DCI/PDCCH.

A first numerology of a first downlink carrier of one or more downlink carriers and a second numerology of a second downlink carrier of the one or more downlink carriers may be the same. The one or more downlink carriers may be configured/used for scheduling data. A base station may schedule a multi-carrier DCI, via one or more second downlink carriers, scheduling resources of a TB for the one or more downlink carriers based on a same numerology used for the one or more downlink carriers. The wireless device may determine a primary downlink carrier from the one or more downlink carriers. The wireless device may assume a repeated transmission of the TB may occur via a cell with a same numerology to a numerology of the primary downlink carrier. The wireless device may ignore or may assume that the repeated transmission of the TB may be skipped via a second carrier, for example, if a numerology of the second carrier is different from the numerology of the primary downlink carrier. A base station may configure one or more downlink carriers with a same numerology associated with a cell for data repetition (e.g., repeated of a TB across the one or more downlink carriers). A base station may indicate a first downlink carrier and a second downlink carrier configured/used for control channel repetition. The base station may ensure a first numerology of a first active BWP of the first downlink carrier is the same as a second numerology of a second active BWP of the second downlink carrier. The base station may maintain a single numerology across a plurality of carriers used/configured for the control channel repetition. A wireless device may determine one or more carriers of the plurality of carriers based on a numerology of a primary carrier of the plurality of carriers. The wireless device may determine a carrier with the same numerology to the primary carrier. The one or more carriers may comprise the carrier.

Mechanisms proposed for a plurality of downlink carriers associated with a first cell may be also used for a plurality of uplink carriers associated with a second cell without loss of generality. One or more wireless device capabilities associated with a cell may be used for a plurality of downlink carriers associated with the cell. For example, a number/quantity of blind decodings may be counted over the plurality of carriers, wherein the number/quantity of blind decodings might not exceed a wireless device's capability for blind decoding. In another example, a wireless device may support a first wireless device capability for a cell associated with a single carrier. The wireless device may support a second wireless device capability for the cell associated with a plurality of carriers. The wireless device may inform the first wireless device capability and the second wireless device capability. The base station may use the first wireless device capability, for example, if the cell is associated with the single carrier. The base station may use the second wireless device capability, for example, if the cell is associated with the plurality of carriers. Control channel repetition may be used across a plurality of carriers associated with a cell. Using the one or more wireless device capabilities for a plurality of downlink carriers associated with the cell may reduce the complexity of the wireless device in implementing the control channel repetition, enhance reliability, reduce latency, and improve quality of service of the wireless device.

Control channel repetition, based on one or more embodiments of the specification, may be used for one or more first DCI formats. The control channel repetition might not be used for one or more second DCI formats. For example, the one or more first DCI formats may comprise a DCI format 1_1, a DCI format 0_1, a DCI format 1_2, and/or a DCI format 0_2. For example, the one or more second DCI formats may comprise a DCI format 0_1 and/or a DCI format 1_0. For example, the one or more first DCI formats may comprise one or more fallback DCI formats, wherein the fallback DCI formats may be used for DCIs scheduled via CSS and/or USS. For example, the one or more second DCI formats may comprise one or more non-fallback DCI formats, wherein the non-fallback DCI formats may be used for DCIs scheduled via USS only. A base station may enable a first control channel repetition for the one or more first DCI formats independently from a second control channel repetition for the one or more second DCI formats. The base station may configure first parameters for the first control channel repetition (e.g., via pdcch-ConfigCommon). The base station may configure second parameters for the second control channel repetition (e.g., via pdcch-Config). This may allow efficient coexistence of a first wireless device requiring control channel repetition and a second wireless device not requiring control channel repetition by limiting the repetition occurring for non-fallback DCIs.

A base station may indicate control channel repetition. A wireless device may use the control channel repetition for one or more DCI formats configured/associated with a USS. The wireless device might not use the control channel repetition for one or more second DCI formats configured/associated with a CSS. The wireless device might not use the control channel repetition for a CSS. The wireless device may use the control channel repetition for a USS.

A base station may enable control channel repetition for first DCI format and, for example, disable control channel repetition for second DCI format. The base station may indicate whether to enable or disable the control channel repetition for each DCI format of one or more DCI formats supported by the wireless device via a cell, where the control channel repetition is used. For example, the base station may enable control channel repetition for a DCI format 1_1/0_1 and disable the control channel repetition for a DCI format 1_2/0_2 or a DCI format 1_0/0_0. Better resource utilization may be achieved by allowing control channel repetition to be not used for a smaller sized DCI format (e.g., a compact DCI without repetition).

A base station may send (e.g., transmit) a plurality of DCIs/PDCCHs, scheduling resource(s) for a transport block of a cell, via a plurality of TRPs or via a plurality of coreset pools or via a plurality of coreset groups. For example, a base station may configure a first TRP (or a first coreset pool) for a first cell via one or more RRC messages. The one or more RRC messages may comprise configuration parameters. The configuration parameters may indicate/comprise the first coreset pool of the first cell. The configuration parameters may indicate/comprise a second coreset pool of the first cell. For example, the second coreset pool may correspond to a second TRP of the first cell. The base station may send (e.g., transmit) first DCI/PDCCH via a first search space of a first coreset of the first coreset pool. The base station may send (e.g., transmit) second DCI/PDCCH via a second search space of a second coreset of the second coreset pool. The first DCI/PDCCH and the second DCI/PDCCH may schedule resource(s) of a transport block. The first/PDCCH and the second DCI/PDCCH may be repeated transmission of a control information. The transport block may be sent (e.g., transmitted) via the first TRP and the second TRP. The transport block may be sent (e.g., transmitted) based on a plurality of TCI states. The transport block may be sent (e.g., transmitted) based on a TCI state, where the TCI state is associated with a plurality of TCI states.

The configuration parameters may indicate control channel repetition enabled/configured for the first cell. For example, a parameter of a control channel repetition mode may be configured. The control channel repetition mode may be the first control channel repetition mode or the second control channel repetition mode. The configuration parameters may indicate/comprise a first coreset associated with (e.g., configured with or of) the first coreset pool. The configuration parameters may indicate/comprise a second coreset associated with (e.g., configured with or of) the second coreset pool. The wireless device may determine a pair of the first coreset and the second coreset, where repeated DCI/PDCCHs may be sent (e.g., transmitted), based on a rule. For example, the wireless device may determine the first coreset of the first coreset pool based on a search space associated with the first coreset, where the wireless device may monitor a DCI format via the search space. For example, the DCI format may be a DCI format 1_1, a DCI format 0_1, a DCI format 1_2, a DCI format 0_2, a DCI format 3_0, or a DCI format 3_1. The wireless device may determine the plurality of first coresets of the first coreset pool, for example, if there is a plurality of first search spaces, of the first coreset pool, configured with the DCI format. Similarly, the wireless device may determine the second coreset of the second coreset pool based on a search space associated with the second coreset, where the wireless device may monitor the DCI format via the search space. The wireless device may determine the plurality of second search spaces, for example, if there is a plurality of second search spaces, of the second coreset pool, configured with the DCI format. The wireless device may be configured with at most one search space for a DCI format in each coreset pool.

The wireless device may determine the second coreset of the second coreset pool based on a first coreset index of the first coreset of the first coreset pool. For example, a second index of the second coreset may be the first coreset index+GAP. For example, the GAP may be a determined/predetermined value (e.g., 0, 12). For example, the configuration parameters may indicate/comprise a parameter indicating a value of the GAP. The wireless device may determine the second coreset based on a second search space, associated with the second coreset, and the first search space. For example, an index of the second search space may be a first index of the first search space+SS-GAP. For example, SS-GAP may be a predetermined value (e.g., 20, 0). For example, the wireless device may determine the second coreset and/or the second search space based on an association configured by the configuration parameters. For example, the configuration parameters may indicate the association between each of a coreset/search space associated with the first coreset pool and each of a coreset/search space associated with the second coreset pool. The configuration parameters may indicate/comprise a first coreset and/or a first search space of the first coreset pool. The wireless device may monitor first DCI/PDCCH via the first search space of the first coreset pool. The configuration parameters may indicate/comprise a parameter indicating control channel repetition across a multi-TRP or a multi-coreset pool for the first coreset or the first search space. Based on the parameter, the wireless device may determine a second coreset or a second search space of the second coreset pool. For example, the wireless device may determine the second coreset based on one or more parameters of the first coreset. For example, a same set of resource blocks configured for the first coreset may be used for the second coreset. For example, monitoring occasions of the first search space may be used for determining monitoring occasions of the second search space.

The first coreset and the second coreset may be used for control channel repetition. Based on the control channel repetition, the configuration parameters may indicate a first set of RBs of the first coreset may be the same as a second set of RBs of the second coreset. Alternatively, the first set of RBs may be nested within the second set of RBs. The second set of RBs may comprise the first set of RBs. The wireless device may determine/use a third set of RBs belonging to the first set of RBs and the second of RBs for the control channel repetition. The configuration parameters may indicate a first monitoring periodicity of a first search space, associated with the first coreset for the control channel repetition, may be the same as a second monitoring periodicity (in terms of slots) of a second search space, associated with the second coreset for the control channel repetition. The configuration parameters may indicate a set of slots where the wireless device may monitor the first search space may be the same as a second set of slots where the wireless device may monitor the second search space.

A base station may indicate control channel repetition based on a coreset. For example, the base station may send (e.g., transmit) a plurality of DCIs/PDCCHs via the coreset. The base station may send (e.g., transmit) the plurality of DCIs/PDCCHs over a plurality of TRPs. The base station may send (e.g., transmit) one or more RRC messages and/or MAC CEs indicating a plurality of TCI states are activated for the coreset. For example, the plurality of TCI states may comprise a first TCI state, corresponding to a first TRP of the plurality of TRPs, and a second TCI state, corresponding to a second TRP of the plurality of TRPs. The base station may send (e.g., transmit) one or more second RRC messages comprising configuration parameters for the coreset. For example, the configuration parameters may indicate control channel repetition based on the coreset. The configuration parameters may indicate the control channel repetition across a plurality of TRPs. The configuration parameters may indicate repetition pattern across the plurality of TRPs. For example, the repetition pattern (e.g., TRP switching pattern) may be [0, . . . , 0, 1, . . . , 1] where 0 may represent a first TRP of the plurality of TRPs and 1 may represent a second TRP of the plurality of TRPs. The base station may indicate a bitmap indicating a number/quantity of control channel repetitions. Each bit of the bitmap may represent which TRP may send (e.g., transmit) i-th repetition. The repetition pattern may be [0, 1, 0, 1, . . . , 0, 1]. The repetition pattern may be [0, 0, . . . , 0, 1, 1, . . . , 1, 0, 0, . . . , 0, 1, 1, . . . , 1]. Various repetition patterns may be considered. Based on the repetition pattern, the wireless device may receive a control channel repetition based on a TCI state of the plurality of TCI states. The wireless device may receive the control channel repetition based on the first TCI state, for example, if the repetition pattern indicates the first TRP. The wireless device may receive the control channel repetition based on the second TCI state, for example, if the repetition indicates the second TRP.

Figure 25:
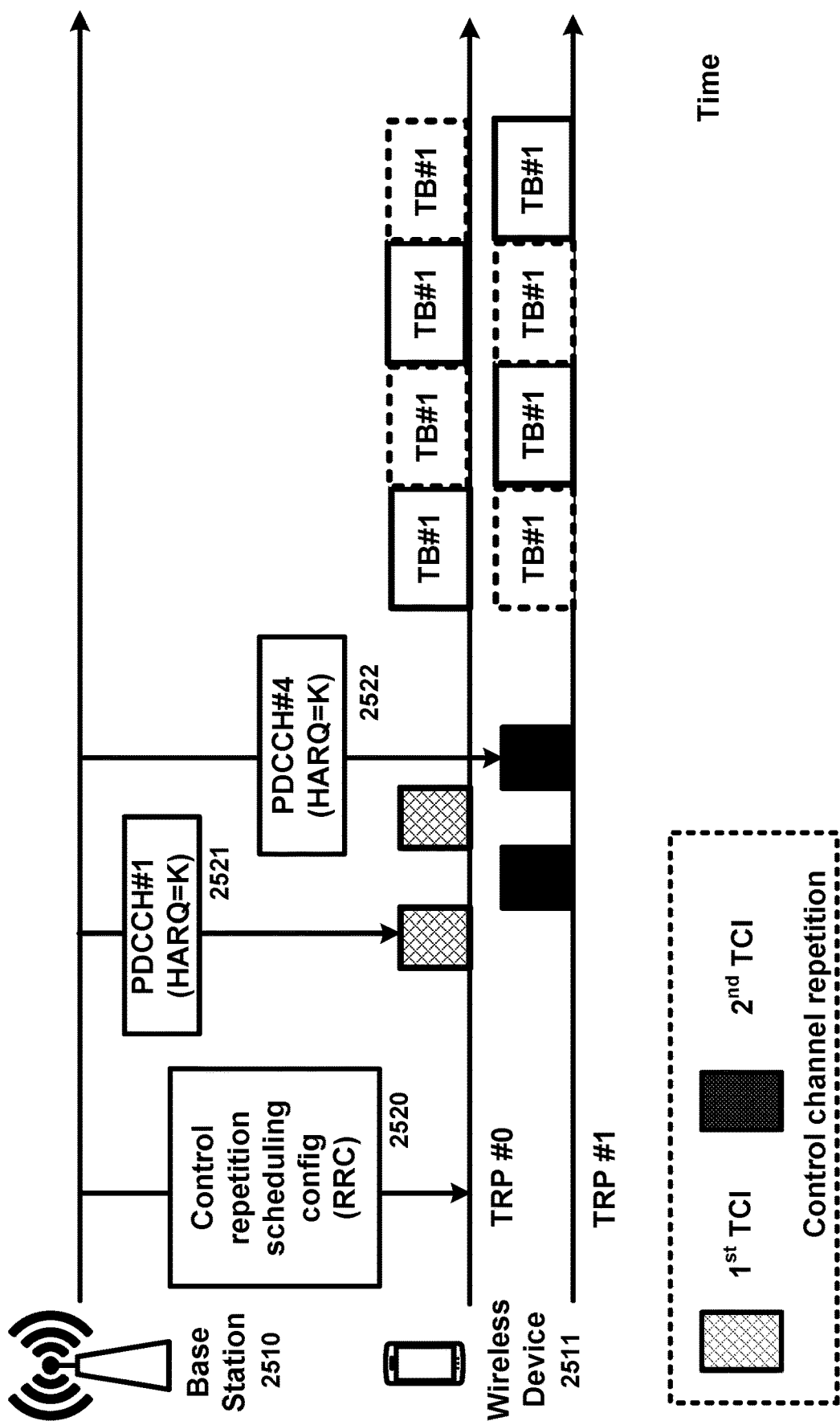
FIG. 25 shows an example of control channel repetition across a plurality of transmission and reception points (TRPs).

FIG. 25 shows an example of control channel repetition across a plurality of TRPs (or a plurality of coreset pools). The base station 2510 may send (e.g., transmit) one or more RRC messages 2520 comprising configuration parameters. The configuration parameters may indicate/comprise a first TRP (TRP #0) and a second TRP (TRP #1) associated with a cell. The configuration parameters may comprise/indicate control channel repetition across a multi-TRP (e.g., via the first TRP and the second TRP). The base station 2510 may send (e.g., transmit) first DCI/PDCCH (e.g., PDCCH #1 2521) via the first TRP or a first coreset pool. The first DCI/PDCCH may comprise/indicate resources scheduling a TB via the multi-TRP. The base station 2510 may send (e.g., transmit) second DCI/PDCCH (e.g., PDCCH #2) via the second TRP or a second coreset pool. The second DCI/PDCCH may comprise/indicate the resources scheduling the TB via the multi-TRP. The first DCI/PDCCH and the second DCI/PDCCH may indicate a same HARQ process index (e.g., HARQ-K) scheduling the TB. The base station 2510 may send (e.g., transmit) a third DCI/PDCCH via the first TRP. The base station 2510 may send (e.g., transmit) a fourth DCI/PDCCH (e.g., PDCCH #4 2522) via the second TRP. A control information scheduling the TB may be repeated four times via a plurality of TRPs. A wireless device 2511 may monitor the first DCI/PDCCH 2521 and the third DCI/PDCCH based on a first TCI state, associated with the first TRP or the first coreset pool. The wireless device 2511 may monitor the second DCI/PDCCH and the fourth DCI/PDCCH 2522 based on a second TCI state, associated with the second TRP or the second coreset pool.

The base station 2510 may repeat the TB via four repetitions of the first TRP and via four repetitions of the second TRP. The wireless device 2511 may repeat the TB simultaneously via the first TRP and the second TRP, for example, if the wireless device 2511 supports simultaneous reception via the first TRP and the second TRP. The base station 2510 may send (e.g., transmit) the repeated transmission of the TB via the first TRP and the second TRP based on a time-domain division multiplexing, for example, if the wireless device 2511 does not support simultaneous reception via the first TRP and the second TRP. For example, the base station 2510 may send (e.g., transmit) a first repetition of the repeated transmission via the first TRP. The base station 2510 may send (e.g., transmit) a second repetition of the repeated transmission via the second TRP. A switching pattern between the first TRP and the second TRP may be configured by the base station 2510 based on RRC/MAC-CE/DCI signaling. The first DCI and the second DCI may schedule the repeated transmissions of the TB. Control channel repetition via a plurality of TRPs may enhance reliability and lead to better QoS experience.

A base station 2510 may send (e.g., transmit) one or more RRC messages 2520 comprising configuration parameters. The configuration parameters may indicate control channel repetition enabled for a cell. The base station 2510 may send (e.g., transmit) a plurality of DCIs/PDCCHs scheduling a transport block via a plurality of coresets of the cell. For example, the configuration parameters may configure a first coreset and a second coreset for the control channel repetition. The configuration parameters may comprise/indicate a first search space associated with the first coreset. The configuration parameters may comprise/indicate a second search space associated with the second coreset. The configuration parameters may comprise/indicate a first TCI state associated with the first coreset. The configuration parameters may comprise/indicate a second TCI state associated with the second coreset. The first TCI state may be the same as or different from the second TCI state. The configuration parameters may comprise/indicate a set of first TCI states associated with the first coreset. One or more MAC CEs may indicate the first TCI state of the set of the first TCI states for the first coreset. For example, the configuration parameters may comprise/indicate a set of second TCI states associated with the second coreset. One or more second MAC CEs may indicate the second TCI state of the set of the second TCI states for the second coreset. The configuration parameters may indicate the first coreset and the second coreset are associated to schedule repeated DCIs/PDCCHs for a transport block.

The configuration parameters may indicate/comprise a search space associated with the first coreset and the second coreset. The configuration parameters may indicate/comprise a plurality of coreset indexes. The configuration parameters may comprise a coreset index, of the plurality of coreset indexes, indicating the first coreset. The configuration parameters may indicate/comprise one or more indexes, of the plurality of coreset indexes, of repeated/additional coresets (e.g., coresets used for control channel repetition in addition to the first coreset, the second coreset). For example, an index of the one or more indexes may indicate the second coreset. First parameters of the first coreset and second parameters of the second coreset may have restriction in terms of configuration, for example, if the first coreset and the second coreset are associated for control channel repetition. For example, a set of resource blocks (RB) in frequency domain of the first coreset may be the same as (or a subset of or a superset of) a set of resource block(s) in frequency domain of the second coreset. The wireless device 2511 may determine a set of RBs belonging to the first coreset and the second coreset for the control channel repetition. For example, a first duration of the first coreset may be the same as a second duration of the second coreset. For example, a number/quantity of REGs of the first coreset may be the same as a number/quantity of REGs. For example, a number/quantity of CCEs of the first coreset may be the same as (or less than or larger than) a number/quantity of CCEs of the second coreset. The wireless device 2511 may determine a number/quantity of REGs based on the determined set of RBs or based on the set of RBs of the first coreset. For example, a first CCE-to-REG mapping type of the first coreset (e.g., between interleaved or non-interleaved) may be the same as a second CCE-to-REG mapping type of the second coreset. For example, a precoder granularity of the first coreset may configured as same to a precoder granularity of the second coreset. For example, a first tci-PresenceInDCI of the first coreset may same as a second tci-PresenceInDCI of the second coreset. For example, a first rb-Offset of the first coreset may be the same as a second rb-Offset of the second coreset.

The first coreset and the second coreset may have potentially different configurations for one or more parameters. For example, the one or more parameters may comprise one or more TCI states. For example, the one or more parameters may comprise DM-RS scrambling identity (e.g., pdcch-DMRS-ScramblingID). For example, the one or more parameters may comprise a coreset pool index (e.g., coresetPoolIndex). For example, the one or more parameters may comprise a coreset index.

The wireless device 2511 may determine whether a first number/quantity of CCEs of the first coreset is less than or equal to (or greater than or equal to) a second number/quantity of CCEs of the second coreset, for example, if the wireless device 2511 receives first configuration parameters of the first coreset and second configuration parameters of the second coreset. Based on the determining, the wireless device 2511 may consider the first coreset and the second coreset may be used for control channel repetition. Otherwise, the wireless device 2511 may determine the first coreset, and the second coreset might not be used for the control channel repetition. Alternatively, the wireless device 2511 may determine a smallest number/quantity of CCEs (e.g., M) among one or more of CCEs of one or more coresets (e.g., determine a coreset of the one or more coresets with a smallest number/quantity of CCEs). For example, the one or more coresets may be configured/indicated/used for control channel repetition. The wireless device 2511 may determine/assume/consider that first M candidates of each coreset of the one or more coresets are used for the control channel repetition.

A wireless device 2511 may determine a number/quantity of REGs of a first coreset of one or more coresets configured for control channel repetition. The wireless device 2511 may determine a second number of REGs of a second coreset of the one or more coresets. The wireless device 2511 may determine whether the number of REGs is equal to the second number of REGs. The wireless device 2511 may consider that the control channel repetition is configured via the first coreset and the second coreset, for example, based on (e.g., after or in response to) the determination that the number/quantity of REGs is equal to the second number/quantity of REGs. Otherwise, the wireless device 2511 may consider the configuration as an error case and might not activate the control channel repetition via the first coreset and the second coreset. The wireless device 2511 may determine a smallest number/quantity of REGs of the one or more coresets (e.g., determine a coreset with a smallest number/quantity of REGs). The wireless device 2511 may assume that the smallest number/quantity of REGs used for the control channel repetition.

DCI or a PDCCH of the control channel repetition may be sent (e.g., transmitted) via the one or more coresets, where a set of CCEs comprising/sending (e.g., transmitting) the DCI or the PDCCH may be determined from the one or more coresets. For example, an aggregation level of the DCI or the PDCCH may be L (e.g., L CCEs). The wireless device 2511 may determine first L/M CCEs from a first coreset of the one or more coresets. For example, M may be a number/quantity of coresets in the one or more coresets. For example, M may be 1, 2, 4, or 8. For example, L may be 1, 2, 4, 8, 16, 32, 64, ..., $2^N$. The wireless device 2511 may determine second L/M CCEs from a second coreset of the one or more coresets. The wireless device 2511 may determine next L/M CCEs from a next coreset of the one or more coresets. For example, a starting CCE index of the first L/M CCEs of the first coreset may be the same as a starting CCE index of the second L/M CCEs of the second coreset. For example, a set of CCE indexes of the first L/M CCEs of the first coreset may be the same as a set of CCE indexes of the second L/M CCEs of the second coreset. For example, a same set of CCEs and/or a starting CCE index of each coreset of the one or more coresets, configured for the control channel repetition, may be expected for a search space candidate for sending (e.g., transmitting) the DCI or the PDCCH. For example, a same set of CCEs and/or a starting CCE index of each coreset of the one or more coresets, configured for the control channel repetition, may be expected for a plurality of search space candidates sending (e.g., transmitting/conveying) a plurality of DCIs/PDCCHs, wherein the plurality of DCIs/PDCCHs are repeated transmission of DCI/PDCCH comprising a transport block.

A first search space may be associated with a first coreset of one or more coresets configured for control channel repetition. A second search space may be associated with a second coreset of the one or more coresets. The first coreset and the second coreset may be configured in different bandwidth parts of a cell. The first coreset and the second coreset may be configured in different cells. The first coreset and the second coreset may be configured in a BWP of a cell. A wireless device 2511 may receive first DCI/PDCCH 2521 via the first coreset of a first carrier. For example, the first DCI/PDCCH 2521 may indicate a first resource for a TB and a HARQ process identifier corresponding to the TB. The wireless device 2511 may receive second DCI/PDCCH via the second coreset of a second carrier. The second carrier may indicate the first resource and the HARQ process identifier of the TB. The wireless device 2511 may receive, based on the first DCI/PDCCH and the second DCI/PDCCH, the transport block.

A wireless device 2511 may receive one or more RRC messages 2520 comprising configuration parameters. The configuration parameters may indicate/comprise a first coreset of a first carrier. The first coreset may be associated/configured/activated with a first TCI state. The configuration parameters may indicate/comprise a second coreset of a second carrier. The second coreset may be associated/configured with a second TCI state. A first number/quantity of CCEs of the first coreset may be the same as a second number/quantity of CCEs of the second coreset. The first number/quantity of CCEs of the first coreset may be different from the second number/quantity of CCEs of the second coreset. The wireless device 2511 may receive first DCI via the first coreset. For example, the first DCI may indicate a first resource for a TB and a HARQ process identifier corresponding to the TB. The wireless device 2511 may receive second DCI via the second coreset. The second carrier may indicate the first resource and the HARQ process identifier of the TB. The wireless device 2511 may receive, based on the first DCI and the second DCI, the transport block. For example, the first carrier may be different or same to the second carrier. For example, the first carrier and the second carrier may be associated with a cell. For example, the second carrier may be a supplemental downlink carrier of the cell. The first carrier may be a normal downlink carrier of the cell.

Figure 26:
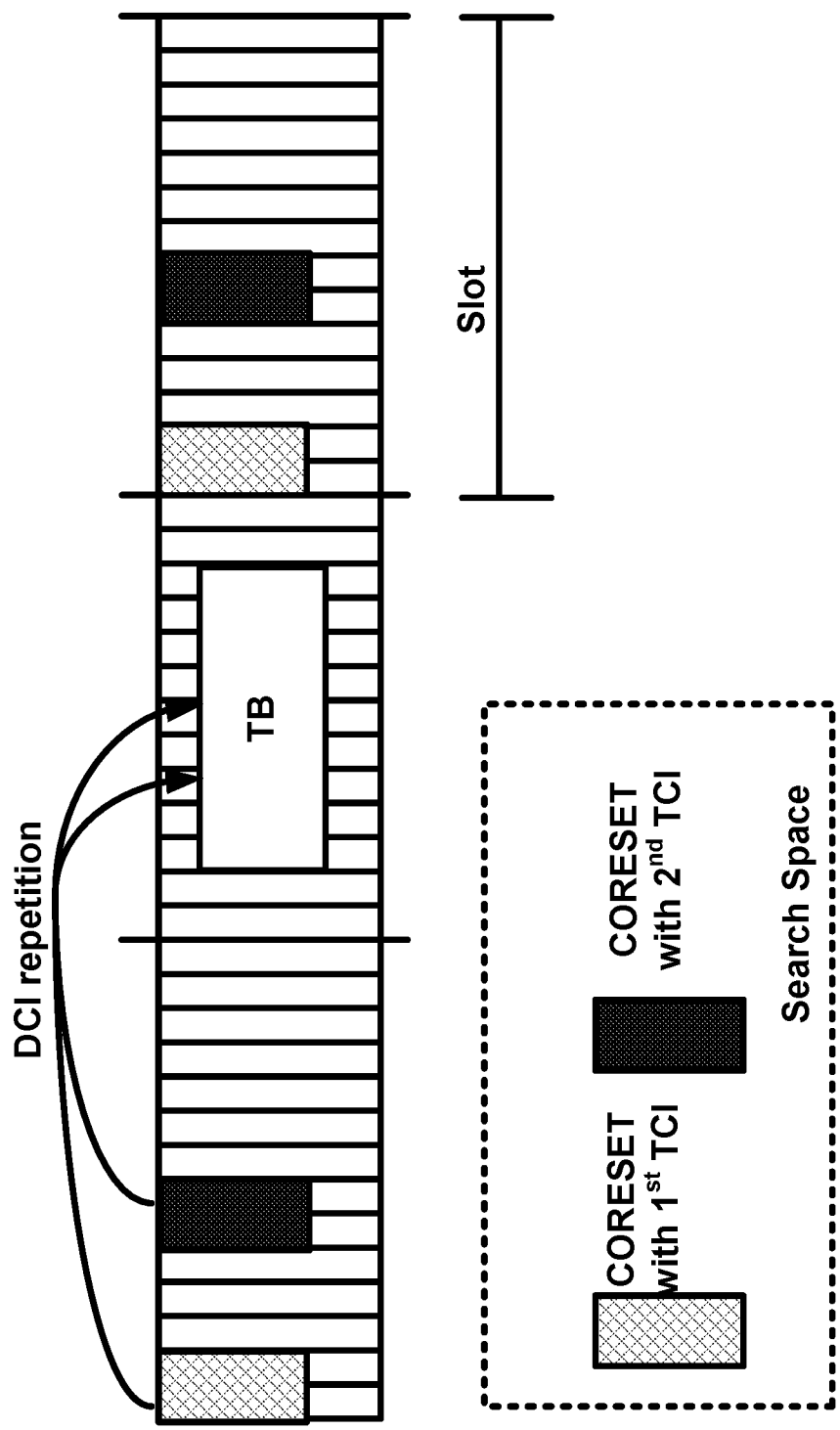
FIG. 26 shows an example of control channel repetition across a plurality of coresets.

FIG. 26 shows an example of control channel repetition across a plurality of coresets. For example, the base station may send (e.g., transmit) one or more RRC messages comprising configuration parameters. The configuration parameters may indicate/comprise a first coreset and a second coreset. The configuration parameters may indicate the first coreset and the second coreset are associated with a BWP of a cell. The configuration parameters may indicate the first coreset is associated with a first BWP of a first carrier, and the second coreset is associated with a second BWP of a second carrier. The configuration parameters may indicate one or more first TCI states for the first coreset. The base station may send (e.g., transmit) one or more MAC CEs or DCIs to activate a first TCI state of the one or more first TCI states for the first coreset. The configuration parameters may indicate one or more second TCI states for the second coreset. The base station may send (e.g., transmit) one or more MAC CEs or DCIs to activate a second TCI state of the one or more second TCI states for the second coreset. The configuration parameters may indicate first monitoring occasions, first REGs, first CCEs, first candidates, and/or first search space, associated with the first coreset occurring over a first two OFDM symbols of every two slots. The configuration parameters may indicate second monitoring occasions, second REGs, second CCEs, second candidates, and/or second search space, associated with the second coreset occurring over 6th and 7th OFDM symbol of every two slots.

For example, the base station may send (e.g., transmit) first DCI/PDCCH via the first coreset and second DCI/PDCCH via the second coreset. The first DCI/PDCCH and the second DCI/PDCCH may be repeated/duplicated control channels based on the first control channel repetition mode. The wireless device may aggregate the first DCI/PDCCH and the second DCI/PDCCH, for example, before decoding an aggregated DCI/PDCCH. The first DCI/PDCCH and the second DCI/PDCCH may be repeated/duplicated control channels scheduling a transport block based on the second control channel repetition mode. The wireless device may receive one of the first DCI/PDCCH and the second DCI/PDCCH or may receive both. The wireless device may decode independently each DCI/PDCCH of the first DCI/PDCCH and the second DCI/PDCCH. The wireless device may use DCI fields of the first DCI independently from DCI fields of the second DCI. The wireless device may ignore the second DCI/PDCCH, for example, based on (e.g., in response to) receiving the first DCI/PDCCH and the second DCI/PDCCH scheduling the TB. The wireless device may determine that the first DCI/PDCCH and the second DCI/PDCCH are repeated control channels based on the second control channel repetition mode based on a HARQ process ID, NDI, frequency domain resource allocation, time domain resource allocation, HARQ feedback resource, and/or PDSCH-to-HARQ timing offset. For example, the wireless device may determine that the first DCI/PDCCH and the second DCI/PDCCH are repeated DCIs/PDCCHs, for example, if a first HARQ process ID of the first DCI/PDCCH is the same as a second HARQ process ID of the second DCI/PDCCH. For example, the wireless device may determine that the first DCI/PDCCH and the second DCI/PDCCH are repeated DCIs/PDCCHs, for example, if a first resource (e.g., in frequency domain and/or time domain) indicated by the first DCI/PDCCH is the same as a second resource indicated by the second DCI/PDCCH. The wireless device may determine the first DCI fields based on a scheduled cell. The wireless device may determine the second DCI fields based on the scheduled cell.

FIG. 26 shows that the first DCI/PDCCH and the second DCI/PDCCH may schedule a resource of a TB. The wireless device may receive the TB based on the first DCI/PDCCH and/or the second DCI/PDCCH.

A base station may send (e.g., transmit) one or more RRC messages comprising configuration parameters. The configuration parameters may indicate control channel repetition across a first coreset of a first carrier and a second coreset of a second carrier. A wireless device may determine a plurality of REGs across the first coreset and the second coreset. The configuration parameters may comprise/indicate a search space associated with the first coreset and the second coreset. For example, the configuration parameters may indicate/comprise one or more starting OFDM symbols for the first coreset and/or the second coreset. For example, the configuration parameters may indicate that the search space may be associated with the first coreset and the second coreset. The configuration parameters may indicate that a first starting OFDM symbol of the first coreset is a K-th OFDM symbol (e.g., K=0) and a second starting OFDM symbol of the second coreset is an M-th OFDM symbol (e.g., M=7). The configuration parameters may indicate/comprise that one or more first starting OFDM symbols of the first coreset are K1-th, K2-th, . . . , Km-th OFDM symbols (e.g., K1=0, K2=4, etc.), and one or more second starting OFDM symbols of the second coreset are M1-th, M2-th, . . . , Mn-th OFDM symbols (e.g., M1=2, M2=6, etc.). The configuration parameters may indicate a switching pattern or a pattern of a plurality of coresets associated with a search space. For example, the switching pattern may be M repetition(s) of the first coreset and N repetition(s) of the second coreset. For example, the switching may be alternating between the first coreset and the second coreset consecutively. For example, the switching pattern may be a bitmap of a plurality of OFDM symbols within one or more slots indicating each bit corresponds to each OFDM symbol. For example, a bit 0 may indicate the first coreset being monitored in the corresponding OFDM symbol and a second bit 1 may indicate the second coreset being monitored in the corresponding OFDM symbol. Based on the starting OFDM symbols within a slot and based on the search space, the wireless device may consider that the first coreset and the second coreset may be present in a same slot (or in a few slots) in different OFDM symbols.

Figure 27:
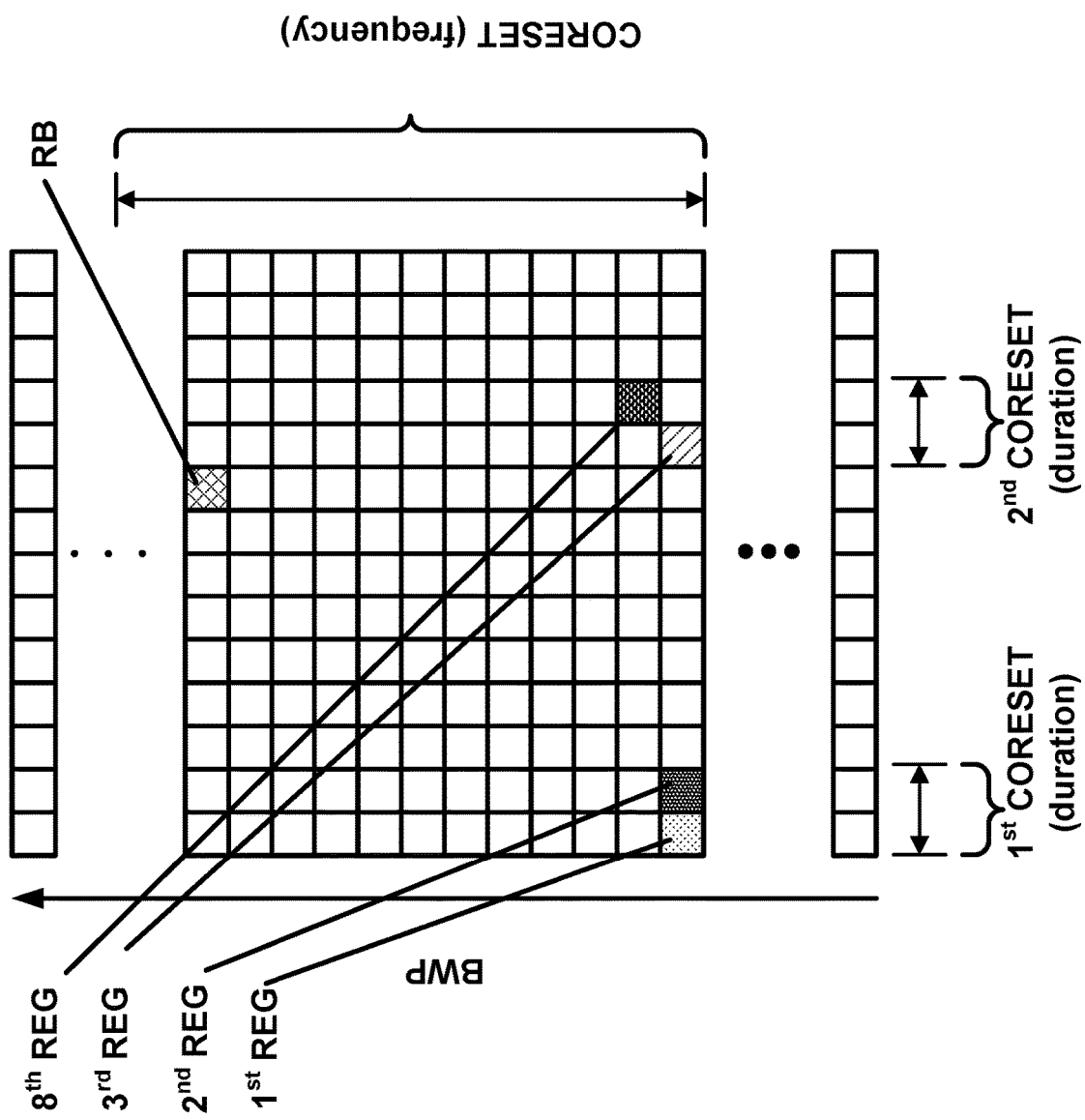
FIG. 27 shows an example list of resource-element groups (REGs) determined across a plurality of coresets.

FIG. 27 shows an example list of REGs determined across a plurality of coresets. A wireless device may be configured with a first coreset between the 1st OFDM symbol and the 2nd OFDM symbol. The wireless device may be configured with a second coreset between the 10th OFDM symbol and the 11th OFDM symbol. The wireless device may determine the list of REGs across RBs of the first coreset and the second coreset. For example, the wireless device may determine a REG index in increasing order in a time-first manner, starting with 0 for an earliest OFDM symbol and the lowest-numbered resource block across the first coreset and the second coreset. For example, as shown in FIG. 27, the wireless device may determine a REG index=0 (e.g., 1st REG) for a REG in the 1st OFDM symbol with the lowest P RB(s) (e.g., P=1). The wireless device may determine a REG index=1 for a REG in the 2nd OFDM symbol with the lowest P RB(s). The wireless device may determine a REG index=2 for a REG in the 10th OFDM symbol with the lowest P RB(s). The wireless device may determine a REG index=3 for a REG in the 11th OFDM symbol with the lowest P RB(s). The wireless device may determine a REG index=4 for a REG in the 1st OFDM symbol with the next P RB(s) from a lowest frequency/RBs. The wireless device may continue numbering the REGs based on a time-first and frequency-second manner. Based on the rule, FIG. 27 shows a REG index=7 (e.g., 8th REG) in the 11th OFDM symbol with the next P RB(s) from the lowest frequency/RBs of the second coreset.

The wireless device may determine REG indices such that REGs belonging to a REG bundle may be associated with a coreset (e.g., either the first coreset or the second coreset). For example, a REG bundle size may be L REGs. The wireless device may determine $\{iL, iL+1, \ldots, iL+L-1\}$ within a coreset of the first coreset and the second coreset. The wireless device may determine $\{(i+1)L, (i+1)L+1, \ldots, (i+1)L+L-1\}$ within another coreset of the first coreset and the second coreset. For example, the wireless device may determine $\{0, 1, \ldots, L-1\}$ REGs over the first coreset where REGs are ordered/numbered in a time-first and frequency-second manner. The wireless device may determine $\{L, L+1, \ldots, 2L-1\}$ over the second coreset where REGs are ordered/numbered in a time-first and frequency-second manner. The wireless device may determine {2L, 2L+1, ..., 3L−1} over the first coreset and so on. This may ensure a same precoder may be used across a REG bundle regardless of TCI state(s) associated with the coreset. This may allow a REG bundle to be efficiently used for control repetition via a plurality of coresets.

The wireless device may determine REG indices such that REGs belonging to a CCE may be associated with a coreset. For example, a CCE size is M REGs (e.g., M=6). The wireless device may determine {iM, iM+1, ..., iM+M−1} within a coreset of the first coreset and the second coreset. The wireless device may determine {(i+1)M, (i+1)M+1, ..., (i+1)M+M−1} within another coreset of the first coreset and the second coreset. For example, the wireless device may determine {0, 1, ..., M−1} REGs of the first coreset where REGs are ordered/numbered in a time-first and frequency-second manner. The wireless device may determine {M, M+1, ..., 2M −1} of the second coreset where REGs are ordered/numbered in a time-first and frequency-second manner. The wireless device may determine {2M, 2M+1, ..., 3M−1} of the first coreset and so on. This may ensure that a CCE is confined within a coreset. This may allow channel estimation in a CCE level with control channel repetition via a plurality of coresets.

The wireless device may determine REG indices such that REGs belonging to K CCEs may be associated with a coreset. For example, K may be 1, 2, 4, or 8. K CCEs may correspond to P REGs (e.g., P=48, if K=8). The wireless device may determine {iP, iP+1, ..., iP+P−1} within a coreset of the first coreset and the second coreset. The wireless device may determine {(i+1)P, (i+1)P+1, ..., (i+1)P+P−1} within another coreset of the first coreset and the second coreset.

The wireless device might not number/index the remaining REGs, for example, if a number/quantity of remaining unnumbered/unindexed REGs in the first coreset is less than a minimum number/quantity (e.g., L, if numbering is based on REG bundle; M, if numbering is based on CCE; and P, if numbering is based on K CCEs). The wireless device may continue numbering until a last REG of the first coreset and may continue numbering starting from a first remaining REGs of the second coreset. The base station may configure the first coreset and the second coreset such that there are no remaining REGs where a number/quantity of remaining REGs is smaller than the minimum number/quantity.

A wireless device may determine a first list of REGs (e.g., index=0, ..., N1) for the first coreset independently from a second list of REGs (e.g., index=0, ..., N2) for the second coreset. The wireless device may determine the first list of REGs and/or the second list of REGs based on time-first and frequency-second mapping. The wireless device may determine a CCE based on the first list of REGs and the second list of REGs. For example, the wireless device may determine M/2 REGs from the first list of REGs and determine remaining M/2 REGs from the second list of REGs. The wireless device may determine a i-th CCE from the first list of REGs. The wireless device may determine a (i+1)-th CCE from the second list of REGs. For example, i=0, 2, ..., 2*floor(N1/2)−1. The wireless device may index a list of CCEs across the first list of REGs and the second list of REGs.

The wireless device may determine a REG bundle size of 6, for example, if CCE-to-REG mapping is non-interleaved. For the non-interleaved mapping, the wireless device may determine CCE with an index j, where the CCE comprises {floor (j/2)L, floor(j/2)L+1, ..., (floor(j/2)+1)L−1} of a coreset. The CCE may comprise REGs from the first coreset, for example, if j is an even number. The CCE may comprise REGs from the second coreset, for example, if j is an odd number. The wireless device may use an interleaver function f(x) in each coreset (e.g., f1(x) for the first coreset, f2(x) for the second coreset), for example, if CCE-to-REG mapping is interleaved. For CCE with an index j, wherein j is even number, the wireless device may determine CCE j comprising REGs from the first list of REGs based on the f1(x). For example, the CCE j comprises {f1(6j/(2L)), f1(6j/(2L)+1), ..., f1(6j/(2L)+6/(2L)−1)} from the first list of REGs. For CCE index with an index j, wherein j is odd number, the wireless device may determine CCE j comprising REGs from the second list of REGs based on the f2(x). For example, the CCE j comprises {f2(6j/(2L)), f2(6j/(2L)+1), ..., f2(6j/(2L)+6/(2L)−1)} from the second list of REGs.

A wireless device may determine a first list of CCEs (e.g., CCE index=0, ..., N1) for the first coreset independently from a second list of CCEs (e.g., CCE index=0, ..., N2) for the second coreset. The wireless device may determine a search space candidate with an aggregation level AL based on the first list of CCEs and the second list of CCEs. For example, the aggregation level AL may be greater than or equal to 2 (e.g., AL=2, 4, 8, 16, etc.). The wireless device may determine first AL/2 CCEs from the first list of CCEs and second AL/2 CCEs from the second list of CCEs. The wireless device may determine the first AL/2 CCEs from the first list of CCEs of the first coreset, wherein the first AL/2 CCEs may be determined based on a second AL=L/2 of the first coreset. The wireless device may determine one or more CCEs of the first coreset as if the wireless device is configured with K candidates for AL=L/2 over the first coreset, for example, if the wireless device is configured with K candidates for AL=L over the first coreset and the second coreset. The wireless device may determine the one or more CCEs based on a single coreset or no control channel repetition. The wireless device may determine one or more second CCEs of the second coreset based on the one or more CCEs of the first coreset. For example, the wireless device may determine the one or more second CCEs, wherein each CCE of the one or more second CCEs may have a same CCE index to each CCE of the one or more CCEs of the first coreset.

Figure 28:
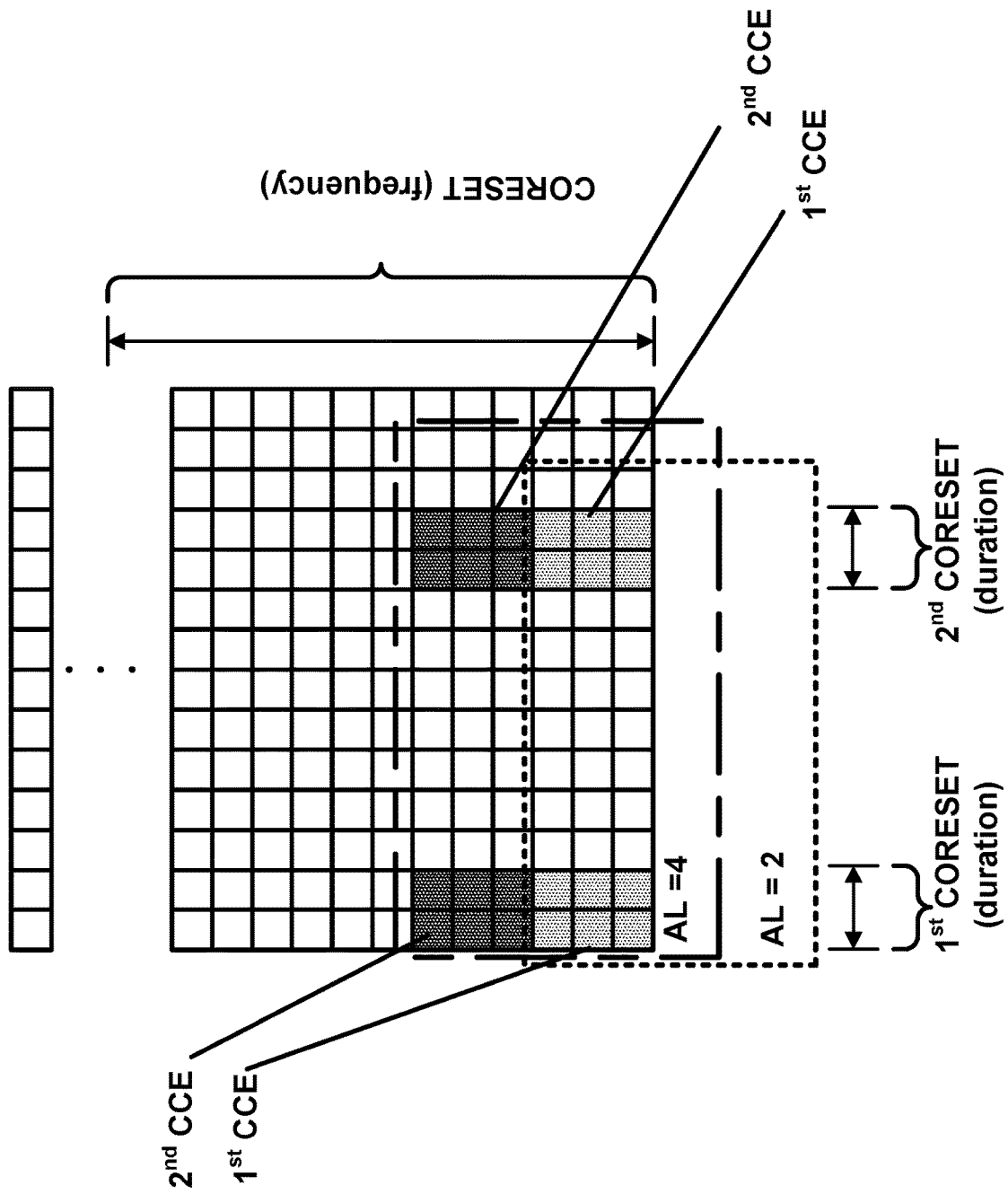
FIG. 28 shows example control channel elements (CCEs) of an aggregation level determined across a first coreset and a second coreset.

FIG. 28 shows example CCEs of an AL determined across a first coreset and a second coreset. For example, the wireless device may determine a first list of CCEs of the first coreset and a second list of CCEs of the second coreset based on a CCE-to-REG mapping (e.g., non-interleaved). The wireless device may determine a search space candidate of AL=2 comprising 1st CCE of the first coreset and the 1st CCE of the second coreset. The wireless device may determine a second search space candidate of AL=4 comprising 1st CCE and 2nd CCE of the first coreset and 1st CCE and 2nd CCE of the second coreset. The wireless device may use a hashing function over the first coreset to determine one or more CCEs for a search space candidate, based on a half-reduced aggregation level (e.g., AL/2) for an aggregation level (e.g., AL). Based on the one or more CCEs of the first coreset, the wireless device may determine one or more second CCEs of the second coreset.

The wireless device may determine a list of CCEs of a search space candidate of the first coreset and the second coreset for an aggregation level AL as follows. For example, the wireless device may be configured with a search space associated with the first coreset and the second coreset. The search space may comprise parameters of a number/quantity of candidate $M_{s,n_{ci}}^{(AL)}$ for the aggregation level AL. The wireless device may monitor the search space candidate in a USS. The search space may be the USS. The wireless device may determine first CCE(s), of the list of CCEs, from the coreset as follows. For the search space s associated with the first coreset p, the wireless device may determine the first CCEs based on a first aggregation level L=AL/2 (or L=AL/# of coresets used for control channel repetition). The wireless device may determine, in slot $n_{s,f}^\mu$, the first CCEs comprising one or more CCEs with CCE indexes satisfying:

$$L \cdot \left\{ \left( Y_{p,n_{s,f}^\mu} + \left\lfloor \frac{m_{s,n_c} \cdot N_{CCE,p}}{L \cdot M_{s,max}^{(L)}} \right\rfloor + n_{CI} \right) \bmod \lfloor N_{CCE,p}/L \rfloor \right\} + i,$$

where:
- $Y_{p,n_{s,f}^\mu}=0$ when the search space s is a CSS and, $Y_{p,n_{s,f}^\mu}=(A_p \cdot Y_{p,n_{s,f}^\mu-1}) \bmod D$, $Y_{p,-1}=n_{RNTI} \neq 0$, $A_p=39827$ for p mod 3=0, $A_p=39829$ for p mod 3=1, $A_p=39839$ for p mod 3=2, and D=65537
- i=0, ..., L−1;
- $N_{CCE,p}$ is a number/quantity of CCEs, numbered from 0 to $N_{CCE,p}-1$, in the first coreset p;
- $n_{CI}$ is the carrier indicator field value if the wireless device is configured with a carrier indicator field by CrossCarrierSchedulingConfig for a serving cell on which DCI/PDCCH is monitored; otherwise, including for any CSS, $n_{CI}=0$; $m_{s,n_{ci}}=0, \ldots, M_{s,n_{ci}}^{(AL)}-1$ and $M_{s,max}^{(L)}$ is the maximum of $M_{s,n_{ci}}^{(L)}$ over all configured $n_{CI}$ values for a CCE aggregation level AL of search space s.

The wireless device may determine second CCE(s) of the second coreset based on a similar manner (e.g., using above hashing function). The wireless device may use a number/quantity of CCEs of the first coreset for the first CCE(s). The wireless device may use a number/quantity of CCEs of the second coreset for the second CCEs. The wireless device may use different hashing number based on a coreset index (e.g., Ap=39839, if p mod 3 is equal to 1). The wireless device may aggregate the first CCEs and the second CCEs for a candidate of AL.

The configuration parameters may comprise a number/quantity of candidates P for an aggregation level L. The wireless device may determine first CCE(s) of the first coreset based on the aggregation level L and the number/quantity of candidates P. The wireless device may determine second CCE(s) of the second coreset based on the aggregation level L and the number/quantity of candidates P. The wireless device may determine a candidate with aggregation level 2*L based on the first CCE(s) and the second CCE(s). The wireless device may determine P candidates for the aggregation level L for each coreset (e.g., 2P candidates in total) and P candidates for the aggregation level 2L for the search space. In total, the wireless device may determine 3P candidates of AL=L or 2L based on a configuration of the number/quantity of candidates P for the aggregation level L, for example, if control channel repetition is configured.

The wireless device may determine 2*L CCEs of first L CCE(s) of the first coreset and second L CCE(s) of the second coreset, where first L CCE(s) and second L CCE(s) may be determined based on a same index of $m_{s,n_{ci}}$ (e.g., an index of candidate of the aggregation level L in a search space).

The configuration parameters of the search space, associated with the first coreset and the second coreset, may comprise/indicate a switching pattern or mapping pattern of the first coreset and the second coreset. For example, the wireless device may determine a search space monitoring occasion based on the configuration parameters of the search space. The wireless device may determine the search space monitoring occasion based on the first coreset. The wireless device may determine a second search space monitoring occasion or an extended monitoring occasion based on a rule. For example, the wireless device may determine the second search space monitoring occasion as a next slot of the first monitoring occasion. The wireless device may determine the second search space monitoring occasion based on the second search space. The configuration parameters may indicate a bitmap of a number/quantity of OFDM symbols in a slot (or of a number/quantity of slots, for example, a multiple slots). The bitmap may indicate 0 for the first coreset or 1 for the second coreset for each corresponding OFDM symbol or a slot. The wireless device may monitor a search space monitoring occasion based on the first coreset, for example, if 0 is indicated for an OFDM symbol. The wireless device may monitor a second search space monitoring occasion based on a second coreset, for example, if 1 is indicated for a second OFDM symbol.

Figure 29:
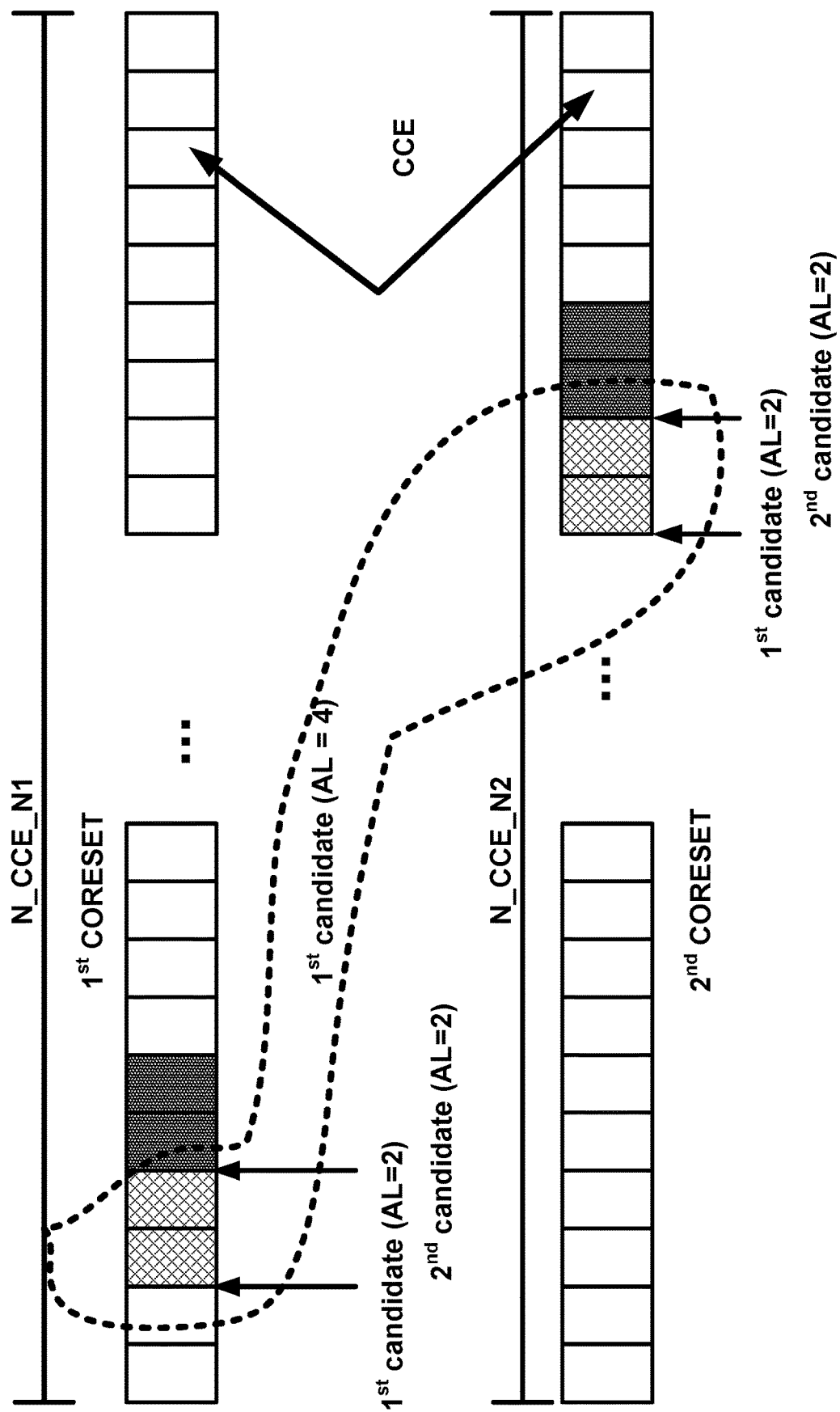
FIG. 29 shows a candidate of an aggregation level determined based on a first candidate of the first coreset and a second candidate of the second coreset.

FIG. 29 shows a candidate of an aggregation level 2L determined based on a first candidate of the first coreset and a second candidate of the second coreset. For example, the number/quantity of CCEs in the first coreset may be N_CCE_N1. Each box may represent a CCE. The number/quantity of CCEs in the second coreset may be N_CCE_N2. Based on a hashing function, the wireless device may determine a first candidate of aggregation level L for the first coreset starting from the 3rd CCE. The wireless device may determine a first candidate of aggregation level L for the second coreset starting from the (N_CCE_N2−9)-th CCE. The wireless device may determine a first candidate of the aggregation level 2L for the control channel repetition by aggregating the first candidate of the first coreset and the second candidate of the second coreset. FIG. 29 shows that the wireless device may aggregate the 3rd/4th CCEs of the first coreset and the (N_CCE_N2−9)-th and (N_CCE_N2−8)-th CCEs of the second coreset for the first candidate of aggregation level 2L. The first candidate of the aggregation level 4 via the first coreset and the second coreset may comprise the 3rd/4th CCEs based on the first coreset and the (N_CCE_N2−9)-th and (N_CCE_N2−8)-th CCEs based on the second coreset.

A wireless device may determine a primary coreset based on a rule. For example, a coreset with a lowest index may be determined as the primary coreset from a plurality of coresets configured for control channel repetition. The wireless device may determine the first CCE(s) of aggregation level L based on the primary coreset. The wireless device may determine the second CCE(s) of aggregation L based on the first CCE(s). For example, the wireless device may determine the second CCE(s) based on one or more CCE indexes of the first CCE(s) (e.g., the same CCE indexes are selected). For example, the wireless device may determine the second CCE(s) based on REGs of the first CCEs. The wireless device may determine the same set of REG indexes for the second CCE(s) to REG indexes corresponding to the first CCE(s). For example, the wireless device may determine a set of same frequency RBs of the first CCEs for the second CCEs. Based on the determining, the wireless device may determine a candidate or CCEs of an aggregation level K*L. For example, K may be a number/quantity of coresets in the plurality of coresets. Diversity of control channel transmission may be enhanced by selecting resources from a plurality of coresets.

The descriptions herein pertaining to two coresets may extended to more than two coresets. For example, when a wireless device is configured with three coresets for control channel repetition, a base station may send configuration parameters (e.g., one or more RRC messages) indicating information related to three or more coresets. Three or more coresets may be configured for control channel repetition. For example, a same configuration parameter value may ensure presence of a field (e.g., TCI or coreset pool index) in DCI across the three or more coresets. Linking one or more candidates of one or more search spaces may be extended to three or more search spaces, wherein each of the three or more search spaces is associated with a coreset of the three or more coresets.

A base station may send (e.g., transmit) one or more RRC messages comprising configuration parameters. The configuration parameters may comprise a first coreset of a first carrier and a second coreset of a second carrier. The first coreset and the second coreset may be configured/used for control channel repetition. The configuration parameters may comprise/indicate a first search space associated with the first coreset. The configuration parameters may comprise/indicate a second search space associated with the second coreset. The configuration parameters may indicate the first search space and the second search space may be used for the control channel repetition. The configuration parameters may indicate a plurality of search spaces used for control channel repetition. For example, the wireless device may determine a candidate of an aggregation level 2L based on a first candidate of an aggregation level L via the first search space, and determine a second candidate of an aggregation level L via the second search space. The wireless device may determine the first candidate in slot n. The wireless device may determine the second candidate in slot n (e.g., the same slot). The configuration parameters may indicate a same monitoring periodicity between the first search space and the second search space. The configuration parameters may indicate different OFDM symbols to monitor for the first search space from OFDM symbols to monitor for the second search space. The configuration parameters may indicate/comprise same monitoring occasions of the first search space and the second search space. The wireless device may monitor the first coreset and the second coreset simultaneously. The wireless device may indicate whether it supports the simultaneous monitoring of a plurality of coresets or not for the control channel repetition. The configuration parameters may indicate different monitoring occasions between the first search space and the second search space, for example, if the wireless device does not support the simultaneous monitoring. Without simultaneous monitoring capability, the wireless device may skip monitoring either the first search space or the second search space based on a priority, for example, if a first monitoring occasion of the first search space overlaps in time with a second monitoring occasion of the second search space. For example, the wireless device may prioritize a search space with lower (or higher) index. For example, the wireless device may prioritize a search space with a smaller subcarrier spacing. For example, the wireless device may prioritize a search space with an associated coreset with a lower (or higher) coreset index.

The configuration parameters may indicate a same number/quantity of candidates for an aggregation level L for the first search space and the second search space. The wireless device may determine a smaller number/quantity, for example, if a first number/quantity of candidates of the first search space is different from a second number/quantity of candidates of the second search space for the aggregation level L. The wireless device may determine the determined number/quantity of candidates of an aggregation level 2L across the first search space and the second search space.

A candidate across the first search space and the second search space may comprise a first candidate of the first search space and a second candidate of the second search space. Based on slot formation indication or based on a rate matching pattern, the wireless device may ignore the candidate, for example, if either the first candidate is not available or the second candidate is not available. Thus, control channel repetition may be achieved across a plurality of coresets with low wireless device complexity.

A first numerology of a first coreset may be different from a second numerology of a second coreset. The first coreset and the second coreset may be configured as a plurality of coresets for supporting control channel repetition. The wireless device may determine a candidate of an aggregation level L from the first coreset and the second coreset based on a first candidate of an aggregation level L1 via the first coreset and a second candidate of an aggregation level 2 via the second coreset. For example, L1+L2=L. For example, L1 and L2 may be the same. For example, L1/L2=a first subcarrier spacing of the first numerology/a second subcarrier spacing of the second numerology. For example, when the first subcarrier spacing is 60 kHz and the second subcarrier spacing is 15 kHz, L1/L2=4. For example, L1=4, 8, or 16. For example, L2=1, 2, or 4. For example, L may be 5, 10, or 20. A first number/quantity of candidates of L1 may be the same as a second number/quantity of candidates of L2. The wireless device may determine the first number/quantity of candidates as a number/quantity of candidates of L. The wireless device may determine a smaller number/quantity between the first number/quantity of candidates of L1 and the second number/quantity of candidates of L2 as a number/quantity of candidates of L.

A wireless device may receive one or more RRC messages comprising configuration parameters. The configuration parameters may indicate/comprise a coreset of a bandwidth part of a cell. The configuration parameters may comprise parameters of a search space associated with the coreset. The parameters of the search space may indicate a first monitoring periodicity in a unit of a first time duration. For example, the first time duration may be a slot or a few slots. The parameters of the search space may indicate a second monitoring periodicity in a unit of a second time duration. For example, the second time duration may be an OFDM symbol or a few OFDM symbols or a slot. For example, the second time duration may be smaller than the first time duration. The wireless device may monitor one or more repeated DCIs/PDCCHs via one or more monitoring occasions determined based on the second monitoring periodicity within the first monitoring periodicity. For example, the configuration parameters may indicate the one ore monitoring occasions within the first monitoring periodicity.

For example, the wireless device may receive/monitor first DCI/PDCCH of the one or more repeated DCIs/PDCCHs via a first monitoring occasion of the one or more monitoring occasions. The wireless device may receive/monitor second DCI/PDCCH of the one or more repeated DCIs/PDCCHs via a second monitoring occasion of the one or more monitoring occasions. The first DCI/PDCCH may be the same as the second DCI/PDCCH. The first DCI/PDCCH and the second DCI/PDCCH may indicate the same resource(s) for a transport block. The wireless device may receive/monitor DCI via the one or more monitoring occasions, where a search space candidate for the DCI may comprise one or more candidates of the one or more monitoring occasions. For example, the search space candidate may comprise a first candidate of the first monitoring occasion and a second candidate of the second monitoring occasion. For example, a first starting CCE index of the first candidate of the first monitoring occasion may be the same as a second starting CCE index of the second candidate of the second monitoring occasion.

The wireless device may receive/monitor the DCI/PDCCH via the one or more monitoring occasions, where the search space candidate for the DCI/PDCCH may comprise one or more CCEs from the one or more monitoring occasions.

For example, the coreset may be associated with a plurality of TCI states as active TCI states. For example, the plurality of TCI states may be activated via one or more RRC messages or MAC CEs or DCIs. The wireless device may monitor the first monitoring occasion based on a first TCI of the plurality of TCI states. The wireless device may monitor the second monitoring occasion based on a second TCI of the plurality of TCI states.

A wireless device may receive first DCI via a first coreset of a first carrier. The first DCI may indicate a first resource for a transport block; and a hybrid automatic repeat request (HARQ) process identifier for the transport block. The wireless device may receive second DCI via a second coreset of the second carrier. For example, the second DCI may indicate the first resource and the HARQ process identifier. The wireless device may receive the transport block via the first resource. For example, a first transmission configuration indicator (TCI) state may be activated/configured for the first coreset. A second TCI state may be activated/configured for the second coreset. For example, the first carrier may be the same as the second carrier. For example, the first carrier may be different from the second carrier. A first numerology of an active downlink bandwidth part of the first carrier may be the same as a second numerology of an active downlink bandwidth part of the second carrier. For example, the first coreset may be the same as the second coreset. For example, the first coreset may be different from the second coreset. A number/quantity of CCEs of the first coreset may be the same as a number/quantity of CCEs of the second coreset. For example, a first duration of the first coreset may be the same as a second duration of the second coreset. For example, a first aggregation level of a first search space candidate carrying the first DCI via the first coreset may be the same as a second aggregation level of a second search candidate carrying the second DCI via the second coreset.

A first physical downlink control channel (PDCCH) may carry the first DCI and a second PDCCH carries the second DCI. For example, content of the first DCI may be the same as content of the second DCI. The wireless device may determine DCI based on aggregation of the first PDCCH and the second DCI. For example, the wireless device may attempt to decode the DCI based on the aggregation. For example, the second DCI may be the first DCI. For example, a PDCCH may carry the first DCI via a search space candidate comprising first CCE(s) of the first coreset and second CCE(s) of the second coreset. For example, a first starting CCE index of the first CCE(s) may be the same as a second starting CCE index of second CCE(s). For example, an aggregation level of the search space candidate is L. A first starting CCE index of the first CCE(s) is determined based on an aggregation level L/2. A second starting CCE index of the second CCE(s) is determined based on the aggregation level L/2. The wireless device may determine a set of resource element groups (REGs) across the first coreset and the second coreset in a time-first and frequency-second manner. For example, a CCE may comprise K (e.g., K=6) REGs. For example, a first REG of the first coreset may be indexed as zero. The wireless device may determine a set of REG bundles across the first coreset and the second coreset in a time-first and frequency-second manner. For example, a REG bundle comprises one or more REGs.

A wireless device may receive one or more RRC messages. The one or more RRC messages may indicate a first coreset of a first carrier. For example, a first TCI state may be associated with the first coreset. The one or more RRC messages indicate a second corset of a second carrier. For example, a second TCI state may be associated with the second coreset. For example, a first number/quantity of CCEs of the first coreset may be equal to a second number/quantity of CCEs. The wireless device may receive first DCI via a first control resource set(coreset) based on the first TCI state. For example, the first DCI may indicate a first resource of the first carrier for a transport block; and a HARQ process identifier for the transport block. The wireless device may receive second DCI via the second coreset of the second carrier. For example, the second DCI may indicate the first resource and the HARQ process identifier. The wireless device may receive or send (e.g., transmit) the transport block via the first resource. The first TCI state may be different from the second TCI state. For example, the first coreset may be the same as or different from the second coreset. For example, a number/quantity of CCEs of the first coreset may be the same as a number/quantity of CCEs of the second coreset. For example, a first duration of the first coreset may be the same as a second duration of the second coreset. For example, a first aggregation level of a first search space candidate carrying the first DCI via the first coreset may be the same as a second aggregation level of a second search candidate carrying the second DCI via the second coreset.

A first physical downlink control channel (PDCCH) may carry the first DCI and a second PDCCH may carry the second DCI. For example, the first DCI may be the same as content of the second DCI. For example, the wireless device may determine DCI based on aggregation of the first PDCCH and the second DCI. For example, the wireless device may attempt to decode the DCI based on the aggregation. For example, the second DCI may be the first DCI. For example, a PDCCH may carry the first DCI via a search space candidate comprising first CCE(s) of the first coreset and second CCE(s) of the second coreset. For example, a first starting CCE index of the first CCE(s) may be the same as a second starting CCE index of second CCE(s). For example, an aggregation level of the search space candidate may be L. For example, a first starting CCE index of the first CCE(s) may be determined based on an aggregation level L/2. For example, a second starting CCE index of the second CCE(s) may be determined based on the aggregation level L/2. The wireless device may determine a set of resource element groups (REGs) across the first coreset and the second coreset in a time-first and frequency-second manner. For example, a CCE may comprise 6 REGs. For example, a first REG of the first coreset is indexed as zero. The wireless device may determine a set of REG bundles across the first coreset and the second coreset in a time-first and frequency-second manner. For example, a REG bundle may comprise one or more REGs.

A wireless device may receive one or more RRC message indicating a first coreset of a first carrier. For example, a first TCI state may be associated with the first coreset. And the one or more RRC messages may indicate a second coreset. For example, a second TCI state may be associated with the second coreset. First CCEs of the first coreset may fully overlap with second CCEs of the second coreset. The wireless device may receive first DCI via a first control resource set(coreset) based on the first TCI state. For example, the first DCI may indicate a first resource for a transport block and a HARQ process identifier for the transport block. The wireless device may receive second DCI via the second coreset of the second carrier. For example, the second DCI may indicate the first resource and the HARQ process identifier. The wireless device may receive or send (e.g., transmit) the transport block via the first resource.

Figure 30:
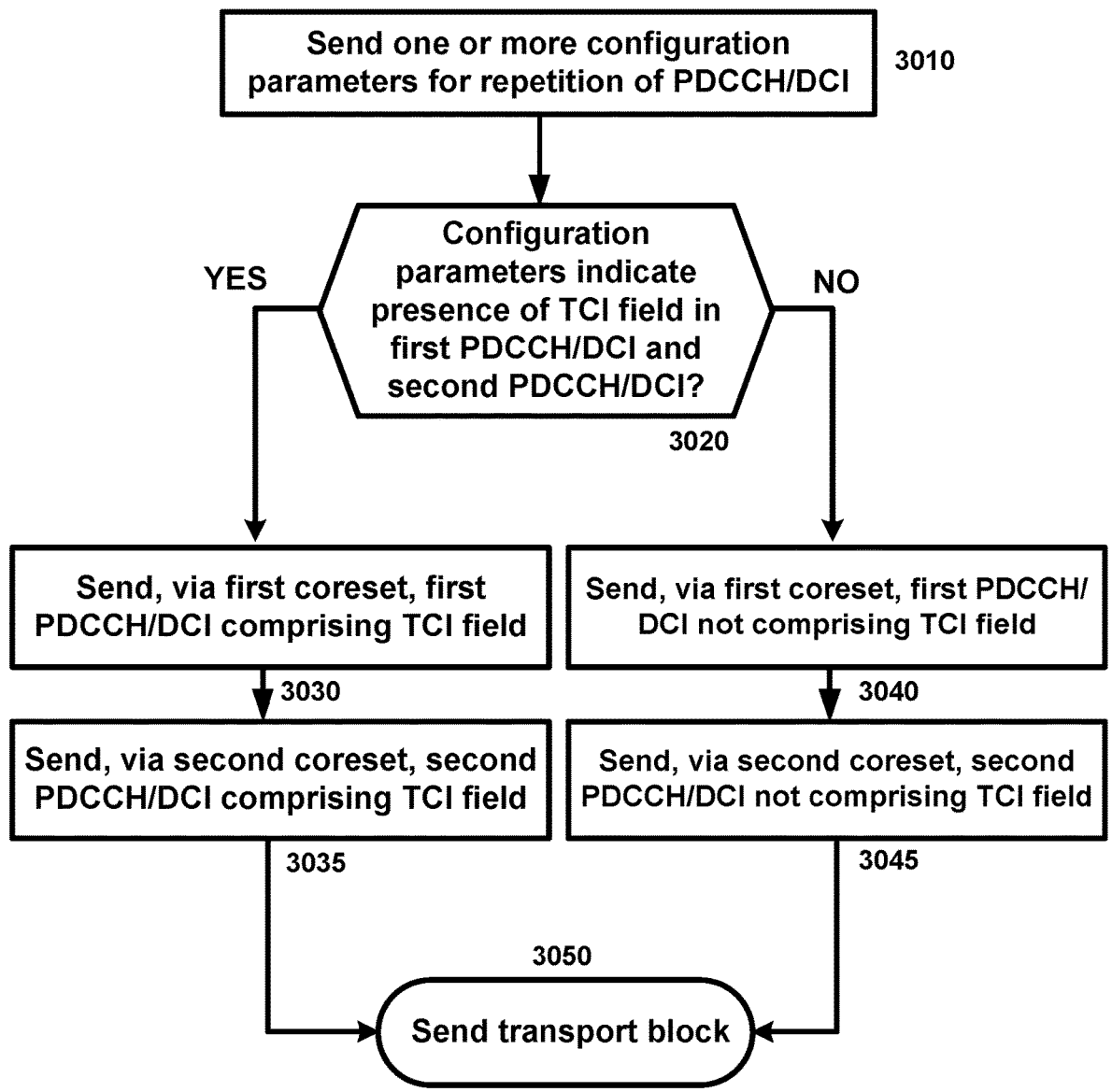
FIG. 30 shows an example method for performing PDCCH repetition.

FIG. 30 shows an example method for performing PDCCH repetition. At step 3010, a base station may send one or more configuration parameters for repetition of DCI. A wireless device may receive the one or more configuration parameters for repetition of DCI. The one or more configuration parameters may be sent in one or more RRC messages. The repetition of the DCI may comprise at least first PDCCH/DCI (e.g., a first repetition of the DCI) and second PDCCH/DCI (e.g., a second repetition of the DCI). The one or more configuration parameters may indicate a first coreset for one or more repetitions of the DCI. For example, the first coreset may be associated with the first PDCCH/DCI (e.g., the first repetition of the DCI). The one or more configuration parameters may indicate a second coreset for one or more repetitions of the DCI. For example, the second coreset may be associated with the second PDCCH/DCI (e.g., the second repetition of the DCI). The one or more configuration parameters may indicate control channel repetition. The one or more parameters may indicate one or more scheduling carriers/cells for sending repetitions of PDCCH/DCI of repeated control channels. The one or more configuration parameters may indicate presence or absence of a TCI field in each of the first DCI and the second DCI. The presence/absence of the TCI field is used as an example here, but the presence/absence of any of the DCI fields may also or alternatively be indicated in the configuration parameters. For example, the presence/absence of a coreset pool index field may be also configured. For example, a coreset pool index may be configured to be the same across the first coreset and the second coreset.

If the configuration parameters indicate that the TCI field is present both in the first DCI and the second DCI (3020: Yes), then the base station may send, via the first coreset, the first DCI (e.g., a first repetition of the DCI) that comprises a TCI field (step 3030), and send, via the second coreset, the second DCI (e.g., a second repetition of the DCI) that comprises a TCI field (step 3035). The wireless device may receive, via the first coreset, the first DCI comprising the TCI field, and receive, via the second coreset, the second DCI comprising the TCI field. Alternatively, if the configuration parameters does not indicate that the TCI field is present in the first DCI and the second DCI, or alternatively, indicates that the TCI field is absent from the first DCI and the second DCI (3020: No), then the base station may send, via the first coreset, the first DCI (e.g., a first repetition of the DCI) that does not comprise a TCI field (step 3040), and send, via the second coreset, the second DCI (e.g., a second repetition of the DCI) that does not comprise a TCI field (step 3045). The wireless device may receive, via the first coreset, the first DCI not comprising the TCI field, and receive, via the second coreset, the second DCI not comprising the TCI field.

At step 3050, the base station may send one or more transport blocks. The wireless device may receive the one or more transport blocks. The wireless device may monitor the first DCI/PDCCH, scheduling a TB, via one or more first search spaces of the one or more first coresets. The wireless device may monitor the second DCI/PDCCH, scheduling a TB, via one or more second search spaces of the one or more second coresets. Based on the first PDCCH/DCI comprising the TCI field and the second PDCCH/DCI not comprising the TCI field, the wireless device may receive either the first DCI or the second DCI. The wireless device may determine a first DCI size based on receiving the first DCI and a second DCI size based on receiving the second DCI. The first DCI size and the second DCI size may be different.

Figure 31:
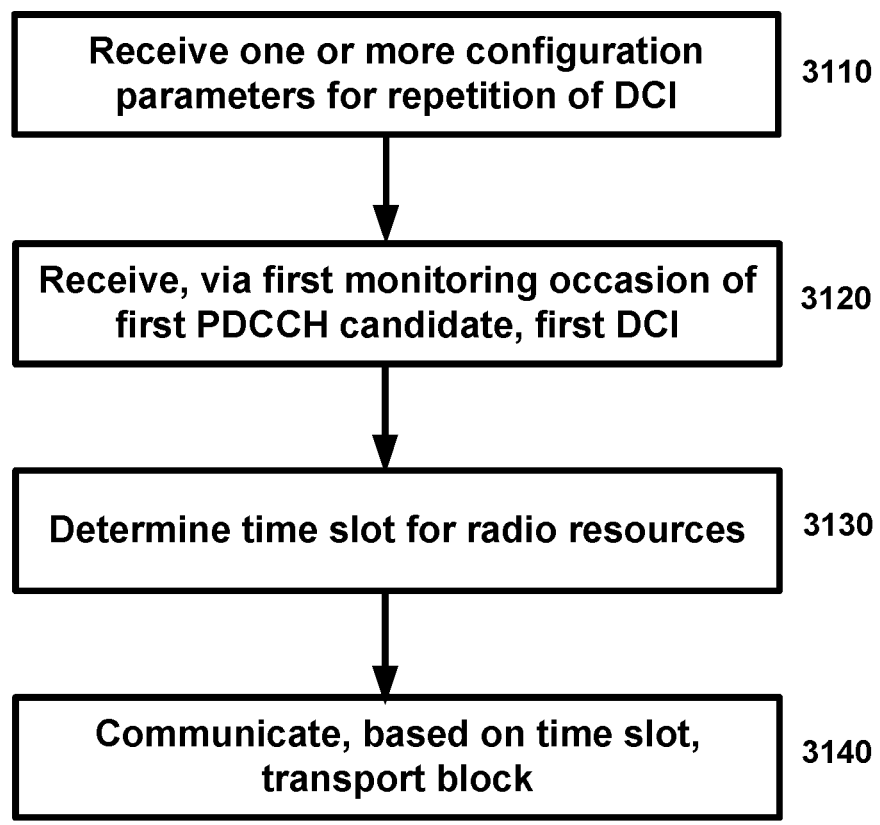
FIG. 31 shows an example method for determining resources based on a candidate of a last configured repetition.

FIG. 31 shows an example method for determining resources based on a candidate of a last configured repetition. At step 3110, a base station may send one or more configuration parameters for repetition of DCI. The wireless device may receive the one or more configuration parameters for repetition of DCI. The one or more configuration parameters may indicate a first PDCCH candidate of a first search space and a second PDCCH candidate of a second search space. At step 3120, the base station may send first DCI via a first monitoring occasion of the first PDCCH candidate. The wireless device may receive the first DCI via the first monitoring occasion of the first PDCCH candidate. The first DCI may indicate a scheduling offset between the receiving the first DCI and a time slot for radio resources. The base station may skip sending a repetition of the first DCI (e.g., second DCI) via the second monitoring occasion of the second PDCCH candidate. Alternatively, the base station may send a repetition of the first DCI (e.g., second DCI) via the second monitoring occasion of the second PDCCH candidate, but the wireless device might not receive it.

At step 3130, the wireless device may determine, based on the scheduling offset and a second monitoring occasion of the second PDCCH candidate, the time slot for radio resources. The wireless device may determine the time slot, for example, even if the base station does not send a second repetition (e.g., second DCI) and/or the wireless device does not receive the second repetition. At step 3140, the wireless device and the base station may communicate, via the radio resources and based on the time slot, a transport block. The base station may send the transport block to the wireless device via the radio resources. Alternatively, the wireless device may send the transport block to the base station via the radio resources.

A base station may perform a method comprising multiple operations. The base station may send, to a wireless device, one or more configuration parameters associated with a plurality of control resource sets (coresets) for a plurality of repetitions of downlink control information (DCI). Presence or absence of a transmission configuration indicator (TCI) field may be the same for the plurality of repetitions of the DCI. The base station may send, to the wireless device via the plurality of coresets, the plurality of repetitions of the DCI. The base station may send, to the wireless device, one or more second configuration parameters. The one or more second configuration parameters may indicate a first physical downlink control channel (PDCCH) candidate of a first search space; and a second PDCCH candidate of a second search space. The base station may send, via a first monitoring occasion of the first PDCCH candidate, a first repetition of the DCI indicating a scheduling offset. The base station may skip a second repetition of the DCI via a second monitoring occasion of the second PDCCH candidate. The base station may send, to the wireless device, a transport block. The one or more configuration parameters may indicate: a first coreset associated with a first repetition of the DCI; a second coreset associated with a second repetition of the DCI; and presence of the TCI field in the first repetition of the DCI and the second repetition of the DCI. The one or more configuration parameters may indicate a coreset pool index for the plurality of coresets. The base station may send a first repetition of the DCI via a first monitoring occasion associated with a first coreset of the plurality of coresets. The base station may send a second repetition of the DCI via a second monitoring occasion associated with a second coreset of the plurality of coresets. The base station may determine one or more first control channel elements (CCEs), for a first search space candidate associated with a first coreset, based on at least one of: a first quantity of CCEs of the first coreset; a first hashing number determined based on a first coreset index of the first coreset; an index of the first search space candidate; or an aggregation level associated with the first coreset. The base station may determine one or more second CCEs, for a second search space candidate associated with a second coreset, based on at least one of: a second quantity of CCEs of the second coreset; a second hashing number determined based on a second coreset index of the second coreset, wherein the second hashing number is different from the first hashing number; an index of the second search space candidate; or an aggregation level associated with the second coreset. The plurality of coresets may overlap in time domain. First resource blocks of a first coreset and second resource blocks of a second coreset may be configured in different frequency resources.

A wireless device may perform a method comprising multiple operations. The wireless device may receive, from a base station, one or more configuration parameters for a plurality of repetitions of downlink control information (DCI). The one or more configuration parameters may indicate: a first physical downlink control channel (PDCCH) candidate of a first search space; and a second PDCCH candidate of a second search space. The wireless device may receive, via a first monitoring occasion of the first PDCCH candidate, a repetition of the DCI indicating a scheduling offset between the receiving the repetition of the DCI and a time slot for radio resources. The wireless device may determine, based on the scheduling offset and a second monitoring occasion of the second PDCCH candidate, and further based on no repetition of the DCI being received via the second monitoring occasion of the second PDCCH candidate, the time slot. The wireless device may receive, via the radio resources and based on the time slot, a transport block. Presence or absence of a transmission configuration indicator (TCI) may be the same for the plurality of repetitions of the DCI. The one or more configuration parameters may further indicate at least one of: a first periodicity of the first search space, wherein the wireless device determines a plurality of first monitoring occasions of the first search space based on the first periodicity; or a second periodicity of the second search space, wherein the wireless device determines a plurality of second monitoring occasions of the second search space based on the second periodicity. A first index of the first PDCCH candidate may be the same as a second index of the second PDCCH candidate. The wireless device may determine one or more first control channel elements (CCEs) of the first PDCCH candidate based on at least one of: a first coreset index of a first coreset associated with the first PDCCH; a first quantity of CCEs of the first coreset; a candidate index of the first PDCCH candidate; or an aggregation level of the first PDCCH candidate. The wireless device may determine one or more second CCEs of the second PDCCH candidate based on at least one of: a second coreset index of a second coreset associated with the second PDCCH, wherein the second coreset index is different from the first coreset index; a second quantity of CCEs of the second coreset, wherein the second quantity of CCEs is different from the first quantity of CCEs; a candidate index of the second PDCCH candidate; or an aggregation level of the second PDCCH candidate. The wireless device may determine, based on an earliest control channel element (CCE) index of one or more control channel elements (CCEs) of the second PDCCH candidate, a feedback resource corresponding to the transport block.

A wireless device may perform a method comprising multiple operations. The wireless device may receive, from a base station, one or more configuration parameters associated with a plurality of control resource sets (coresets) for a plurality of repetitions of downlink control information (DCI), wherein presence or absence of a transmission configuration indicator (TCI) field is the same for the plurality of repetitions of the DCI. The wireless device may receive, from the base station via the plurality of coresets, the plurality of repetitions of the DCI. The wireless device may receive, from the base station, one or more second configuration parameters indicating: a first physical downlink control channel (PDCCH) candidate of a first search space; and a second PDCCH candidate of a second search space. The wireless device may receive, via a first monitoring occasion of the first PDCCH candidate, a repetition of the DCI indicating a scheduling offset between the receiving the repetition of the DCI and a time slot for radio resources. The wireless device may determine, based on the scheduling offset and a second monitoring occasion of the second PDCCH candidate, and further based on no repetition of the DCI being received via the second monitoring occasion of the second PDCCH candidate, the time slot. The wireless device may receive, via the radio resources and based on the time slot, a transport block. The one or more configuration parameters indicate: a first coreset associated with a first repetition of the DCI; a second coreset associated with a second repetition of the DCI; and presence of the TCI field in the first repetition of the DCI and the second repetition of the DCI. The one or more configuration parameters indicate a coreset pool index for the plurality of coresets. The wireless device may receive a first repetition of the DCI via a first monitoring occasion associated with a first coreset of the plurality of coresets. The wireless device may receive a second repetition of the DCI via a second monitoring occasion associated with a second coreset of the plurality of coresets. The wireless device may determine one or more first control channel elements (CCEs), for a first search space candidate associated with a first coreset, based on at least one of: a first quantity of CCEs of the first coreset; a first hashing number determined based on a first coreset index of the first coreset; an index of the first search space candidate; or an aggregation level associated with the first coreset. The wireless device may determine one or more second CCEs, for a second search space candidate associated with a second coreset, based on at least one of: a second quantity of CCEs of the second coreset; a second hashing number determined based on a second coreset index of the second coreset, wherein the second hashing number is different from the first hashing number; an index of the second search space candidate; or an aggregation level associated with the second coreset. The plurality of coresets overlap in time domain, and wherein first resource blocks of a first coreset and second resource blocks of a second coreset are configured in different frequency resources.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that might not comply with the disclosed methods, for example, because those wireless devices and/or base stations may perform based on older releases of LTE, 5G, or other 3GPP or non-3GPP technology.

One or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, Wi-Fi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:
   determining, by a base station, one or more configuration parameters associated with a plurality of control resource sets (coresets) by synchronizing, by the base station and based on the plurality of coresets being linked for a plurality of repetitions of downlink control information (DCI), the one or more configuration parameters to indicate;
   presence or absence of a transmission configuration indicator (TCI) field to be the same for the plurality of coresets,
   a monitoring periodicity to be the same for the plurality of coresets, and
   a coreset pool index to be the same for the plurality of coresets;
   sending, by the base station to a wireless device, the one or more configuration parameters; and
   sending, by the base station to the wireless device via the plurality of coresets, the plurality of repetitions of the DCI.

2. The method of claim 1, further comprising:
   sending, by the base station to the wireless device, one or more second configuration parameters indicating:
   a first physical downlink control channel (PDCCH) candidate of a first search space; and
   a second PDCCH candidate of a second search space;
   sending, via a first monitoring occasion of the first PDCCH candidate, a first repetition of the DCI indicating a scheduling offset;
   skipping a second repetition of the DCI via a second monitoring occasion of the second PDCCH candidate; and
   sending, to the wireless device, a transport block.

3. The method of claim 1, wherein the one or more configuration parameters further indicate:
   a first coreset, of the plurality of coresets, associated with a first repetition of the DCI;
   a second coreset, of the plurality of coresets, associated with a second repetition of the DCI; and
   presence of the TCI field in the first repetition of the DCI and the second repetition of the DCI.

4. The method of claim 1, wherein the sending the plurality of repetitions of the DCI comprises:
   sending a first repetition of the DCI via a first monitoring occasion associated with a first coreset of the plurality of coresets; and
   sending a second repetition of the DCI via a second monitoring occasion associated with a second coreset of the plurality of coresets.

5. The method of claim 1, further comprising:
   determining one or more first control channel elements (CCEs), for a first search space candidate associated with a first coreset of the plurality of coresets, based on at least one of:
   a first quantity of CCEs of the first coreset;
   a first hashing number determined based on a first coreset index of the first coreset;
   a first index of the first search space candidate; or
   a first aggregation level associated with the first coreset; and
   determining one or more second CCEs, for a second search space candidate associated with a second coreset of the plurality of coresets, based on at least one of:
   a second quantity of CCEs of the second coreset;
   a second hashing number determined based on a second coreset index of the second coreset, wherein the second hashing number is different from the first hashing number;
   a second index of the second search space candidate; or
   a second aggregation level associated with the second coreset.

6. The method of claim 1, wherein the plurality of coresets overlap in a time domain, and wherein first resource blocks of a first coreset of the plurality of coresets and second resource blocks of a second coreset of the plurality of coresets are configured in different frequency resources.

7. A method comprising:
   receiving, by a wireless device from a base station, one or more configuration parameters for a plurality of repetitions of downlink control information (DCI), wherein the one or more configuration parameters indicate:
   a first physical downlink control channel (PDCCH) candidate of a first search space; and
   a second PDCCH candidate of a second search space;
   receiving, via a first monitoring occasion of the first PDCCH candidate, a first repetition of the DCI indicating a scheduling offset;
   determining, based on a second repetition of the DCI not being received via a second monitoring occasion of the second PDCCH candidate, a symbol for radio resources at the scheduling offset relative to the second monitoring occasion of the second PDCCH candidate; and
   receiving, based on the symbol, a transport block.

8. The method of claim 7, wherein the one or more configuration parameters have been synchronized by the base station to indicate that presence or absence of a transmission configuration indicator (TCI) is the same for the plurality of repetitions of the DCI.

9. The method of claim 7, wherein the one or more configuration parameters further indicate at least one of:
   a first periodicity of the first search space, wherein the wireless device determines a plurality of first monitoring occasions of the first search space based on the first periodicity; or
   a second periodicity of the second search space, wherein the wireless device determines a plurality of second monitoring occasions of the second search space based on the second periodicity.

10. The method of claim 7, wherein a first index of the first PDCCH candidate is the same as a second index of the second PDCCH candidate.

11. The method of claim 7, further comprising:
    determining one or more first control channel elements (CCEs) of the first PDCCH candidate based on at least one of:
    a first coreset index of a first coreset, of a plurality of coresets, associated with the first PDCCH candidate;
    a first quantity of CCEs of the first coreset;
    a first candidate index of the first PDCCH candidate; or
    a first aggregation level of the first PDCCH candidate; and
    determining one or more second CCEs of the second PDCCH candidate based on at least one of:
    a second coreset index of a second coreset, of the plurality of coresets, associated with the second PDCCH candidate, wherein the second coreset index is different from the first coreset index;

a second quantity of CCEs of the second coreset, wherein the second quantity of CCEs is different from the first quantity of CCEs;

a second candidate index of the second PDCCH candidate; or a second aggregation level of the second PDCCH candidate.

12. The method of claim 7, further comprising determining, based on an earliest control channel element (CCE) index of one or more control channel elements (CCEs) of the second PDCCH candidate, a feedback resource corresponding to the transport block.

13. The method of claim 7, wherein the second PDCCH candidate starts later than the first PDCCH candidate.

14. The method of claim 7, wherein the one or more configuration parameters further indicate:

a third PDCCH candidate comprising the first PDCCH candidate and the second PDCCH candidate.

15. A method comprising:

receiving, by a wireless device from a base station, one or more configuration parameters associated with a plurality of control resource sets (coresets) for a plurality of repetitions of downlink control information (DCI), wherein the one or more configuration parameters have been synchronized, by the base station and based on the plurality of coresets being linked for the plurality of repetitions of DCI, to indicate that:

presence or absence of a transmission configuration indicator (TCI) field is the same for the plurality of coresets, a monitoring periodicity is the same for the plurality of coresets, and a coreset pool index is the same for the plurality of coresets; and receiving, by the wireless device from the base station via the plurality of coresets, the plurality of repetitions of the DCI.

16. The method of claim 15, further comprising:

receiving, by the wireless device from the base station, one or more second configuration parameters indicating:

a first physical downlink control channel (PDCCH) candidate of a first search space; and a second PDCCH candidate of a second search space;

receiving, via a first monitoring occasion of the first PDCCH candidate, a repetition of the DCI indicating a scheduling offset between the receiving the repetition of the DCI and a time slot for radio resources;

determining, based on the scheduling offset and a second monitoring occasion of the second PDCCH candidate, and further based on no repetition of the DCI being received via the second monitoring occasion of the second PDCCH candidate, the time slot; and receiving, via the radio resources and based on the time slot, a transport block.

17. The method of claim 15, wherein the one or more configuration parameters further indicate:

a first coreset, of the plurality of coresets, associated with a first repetition of the DCI;

a second coreset, of the plurality of coresets, associated with a second repetition of the DCI; and presence of the TCI field in the first repetition of the DCI and the second repetition of the DCI.

18. The method of claim 15, wherein the receiving the plurality of repetitions of the DCI comprises:

receiving a first repetition of the DCI via a first monitoring occasion associated with a first coreset of the plurality of coresets; and receiving a second repetition of the DCI via a second monitoring occasion associated with a second coreset of the plurality of coresets.

19. The method of claim 15, further comprising:

determining one or more first control channel elements (CCEs), for a first search space candidate associated with a first coreset of the plurality of coresets, based on at least one of:

a first quantity of CCEs of the first coreset;

a first hashing number determined based on a first coreset index of the first coreset;

a first index of the first search space candidate; or a first aggregation level associated with the first coreset; and determining one or more second CCEs, for a second search space candidate associated with a second coreset of the plurality of coresets, based on at least one of:

a second quantity of CCEs of the second coreset;

a second hashing number determined based on a second coreset index of the second coreset, wherein the second hashing number is different from the first hashing number;

a second index of the second search space candidate; or a second aggregation level associated with the second coreset.

20. The method of claim 15, wherein the plurality of coresets overlap in a time domain, and wherein first resource blocks of a first coreset of the plurality of coresets and second resource blocks of a second coreset of the plurality of coresets are configured in different frequency resources.

* * * * *